(12) United States Patent
Kawaguchi et al.

(10) Patent No.: US 12,486,239 B2
(45) Date of Patent: Dec. 2, 2025

(54) BENZOTRIAZOLE COMPOUND, LIGHT ABSORBER, AND RESIN COMPOSITION

(71) Applicants: MITSUI CHEMICALS, INC., Tokyo (JP); YAMAMOTO CHEMICALS, INC., Yao (JP)

(72) Inventors: Masaru Kawaguchi, Fukuoka (JP); Shinsuke Ito, Omuta (JP); Yoshiyuki Totani, Ichihara (JP); Yusuke Matsui, Omuta (JP); Yojirou Kumagae, Yao (JP); Daisuke Kakio, Yao (JP); Bunji Sawano, Yao (JP); Hiroshi Naruse, Yao (JP); Ryoji Yamaguchi, Yao (JP)

(73) Assignees: MITSUI CHEMICALS, INC., Tokyo (JP); YAMAMOTO CHEMICALS, INC., Yao (JP)

( * ) Notice: Subject to any disclaimer, the term of this patent is extended or adjusted under 35 U.S.C. 154(b) by 677 days.

(21) Appl. No.: 17/760,991

(22) PCT Filed: Sep. 18, 2020

(86) PCT No.: PCT/JP2020/035556
§ 371 (c)(1),
(2) Date: Mar. 16, 2022

(87) PCT Pub. No.: WO2021/054459
PCT Pub. Date: Mar. 25, 2021

(65) Prior Publication Data
US 2022/0363650 A1    Nov. 17, 2022

(30) Foreign Application Priority Data

Sep. 18, 2019   (JP) .................................. 2019-169402
Sep. 18, 2019   (JP) .................................. 2019-169403

(51) Int. Cl.
*C07D 249/20*     (2006.01)
*C08K 5/3475*    (2006.01)

(52) U.S. Cl.
CPC .......... *C07D 249/20* (2013.01); *C08K 5/3475* (2013.01)

(58) Field of Classification Search
CPC .. C07D 401/04; C07D 495/04; C07D 403/12; G02B 5/223; G02B 1/04; G02B 5/22; G02C 7/108; G02C 7/10; C08K 5/357; C08L 101/00; C09K 3/00
See application file for complete search history.

(56) References Cited

U.S. PATENT DOCUMENTS

| | | | |
|---|---|---|---|
| 3,159,646 A | 12/1964 | Milionis et al. | |
| 5,298,380 A | 3/1994 | Leppard | |
| 5,500,332 A | 3/1996 | Vishwakarma et al. | |
| 5,683,861 A * | 11/1997 | Vishwakarma | G03C 1/8155 |
| | | | 548/260 |
| 5,766,834 A | 6/1998 | Chen et al. | |
| 5,977,219 A | 11/1999 | Ravichandran et al. | |
| 10,316,024 B2 * | 6/2019 | Kawai | C08K 5/372 |
| 2010/0103352 A1 | 4/2010 | Suzuki et al. | |
| 2017/0217937 A1 | 8/2017 | Kawai et al. | |
| 2018/0134872 A1 | 5/2018 | Shishino et al. | |
| 2020/0325107 A1 | 10/2020 | Kaneko et al. | |
| 2022/0073702 A1 | 3/2022 | Kawai et al. | |

FOREIGN PATENT DOCUMENTS

| | | |
|---|---|---|
| CN | 102618108 B | 4/2014 |
| CN | 106149408 A | 11/2016 |
| EP | 0 751 134 A1 | 1/1997 |
| EP | 2 206 748 A1 | 7/2010 |
| FR | 1324898 A | 4/1963 |
| GB | 980886 A | 1/1965 |
| GB | 2319035 A | 5/1998 |
| JP | H05-197075 A | 8/1993 |
| JP | H06-505743 A | 6/1994 |
| JP | H09-048768 A | 2/1997 |
| JP | H09127649 A | 5/1997 |
| JP | H10-140089 A | 5/1998 |
| JP | H10158251 A | 6/1998 |
| JP | 2000-321718 A | 11/2000 |
| JP | 2002040232 A | 2/2002 |
| JP | 2003-149605 A | 5/2003 |
| JP | 2007-031516 A | 2/2007 |
| JP | 2008268337 A | 11/2008 |
| JP | 2012123291 A | 6/2012 |
| JP | 2018-122449 A | 8/2018 |
| JP | 6383754 B | 8/2018 |
| JP | 2020-105022 A | 7/2020 |
| WO | 92/14717 A1 | 9/1992 |
| WO | 92/14718 A1 | 9/1992 |
| WO | 2016/021664 A1 | 2/2016 |
| WO | 2016/174788 A1 | 11/2016 |
| WO | 2019/087983 A1 | 5/2019 |
| WO | 2020/137819 A1 | 7/2020 |

OTHER PUBLICATIONS

PubChem CID 4170397, National Center for Biotechnology Information. PubChem Compound Summary for CID 4170397, 5-Amino-2-(benzotriazol-2-yl)phenol. https://pubchem.ncbi.nlm.nih.gov/compound/5-Amino-2-_benzotriazol-2-yl_phenol. Accessed Sep. 18, 2024, create date Sep. 13, 2005. (Year: 2005).*

Freeman H.S et al., "An Approach to the Design of Lightfast Disperse Dyes—Analogs Of Disperse Yellow 42", Dyes and Pigments, vol. 20, No. 3, Jan. 1, 1992 (Jan. 1, 1992), pp. 171-195, XP000323189. (Cited in Extended European Search Report issued on Jan. 24, 2024, for EP Application No. 20 864 625.7).

(Continued)

*Primary Examiner* — James H Alstrum-Acevedo
*Assistant Examiner* — Pierre Paul Eleniste
(74) *Attorney, Agent, or Firm* — BUCHANAN INGERSOLL & ROONEY PC

(57) ABSTRACT

Provided is a benzotriazole compound represented by Formula (1). In Formula (1), $R_1$ to $R_4$ represent substituents. In Formula (1), n1 represents an integer from 0 to 4, and n2 represents an integer from 0 to 3.

11 Claims, 9 Drawing Sheets

(56) References Cited

OTHER PUBLICATIONS

Written Submission of Publications issued on Feb. 16, 2023, for Japanese Patent Application No. JP 2021-546994, and English translation of the Written Submission. (10 pages).

Registry (STN) [online], Nov. 16, 2004, pp. 1-12. (Cited in Office Action issued May 31, 2023, in corresponding Chinese Patent Application No. 202080064607.X).

Doub et al., "The Ultraviolet Absorption Spectra of Simple Unsaturated Compounds. II. m- and o-Disubstituted Benzene Derivatives", Journal of the American Chemical Society, 1949, vol. 71, No. 7, pp. 2414-2420.

Nakagaki, "Substituent Effects in Aromatic and Heterocyclic Compounds as Revealed by Ultraviolet Photoelectron, Electronic Absorption, and Overtone Vibrational Spectroscopy—Physical Properties and Chemical Reactivity-", Journal of Organic Synthetic Chemistry, 1986, vol. 44, No. 12, pp. 1169-1176.

Okazaki, "The Trend of Recent UV-absorber Development", Journal of the Color Material Association, 1992, vol. 65, No. 5, pp. 298-307.

Notice of Reasons for Rejection issued Apr. 25, 2023, by the Japan Patent Office in corresponding Japanese Patent Application No. 2021-546994 and an English translation of the Notice. (7 pages).

Registry (STN) [online], Nov. 16, 2004, [retrieved on Nov. 4, 2020], CAS Registry No. 782393-00-4, etc. (18 pages).

\* cited by examiner

BENZOTRIAZOLE COMPOUND, LIGHT ABSORBER, AND RESIN COMPOSITION

TECHNICAL FIELD

The present disclosure relates to benzotriazole compounds, light absorbers, and resin compositions.

BACKGROUND ART

Benzotriazole compounds have been used in various technical fields from before.

For example, Patent Document 1 describes a transparent plastic substrate containing a benzotriazole compound represented by a specific structural formula for the purpose of providing a transparent plastic substrate having a high cut rate of blue light.

Patent Document 1: Japanese Patent Publication (JP-B) No. 6383754

SUMMARY OF INVENTION

Technical Problem

However, when the content of the light absorber is increased in order to obtain a transparent plastic substrate having a high cut rate of blue light, the color tone and appearance of the transparent plastic substrate is affected in some cases. Therefore, in some cases, a light absorber capable of reducing the transmittance of blue light in a resin composition with a small content is required.

The problem to be solved by the first embodiment and the problem to be solved by the second embodiment of the present disclosure are to provide a light absorber capable of reducing the transmittance of blue light with a small content, a resin composition containing the light absorber, and a benzotriazole compound useful as a light absorber.

Solution to Problem

The means for solving the above problems include the following aspects.

<1> A benzotriazole compound represented by the following Formula (1):

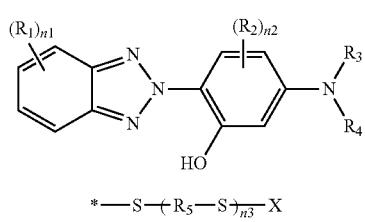

(1)

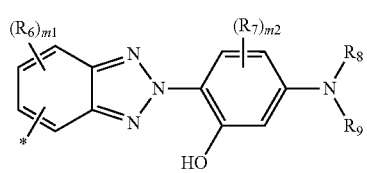

(2)

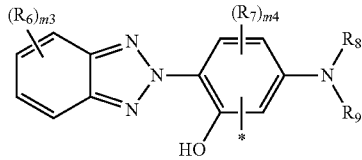

(X2)

wherein, in Formula (1), each of $R_1$ and $R_2$ independently represents a halogen atom, a cyano group, a hydroxyl group, a sulfone group, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, a substituted or unsubstituted amino group, a substituted or unsubstituted alkylcarbonyl group, a substituted or unsubstituted arylcarbonyl group, a carboxylic acid ester group, a sulfonic acid ester group, or a structure represented by the following Formula (2);

wherein, in Formula (1), in a case in which a plurality of $R_1$ is present, each of the plurality of $R_1$ may be the same or different, or may be bonded to each other to form a ring;

wherein, in Formula (1), in a case in which a plurality of $R_2$ is present, each of the plurality of $R_2$ may be the same or different, or may be bonded to each other to form a ring;

wherein, in Formula (1), each of $R_3$ and $R_4$ independently represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkylcarbonyl group, a substituted or unsubstituted arylcarbonyl group, or a substituted or unsubstituted carbamoyl group, and $R_3$ and $R_4$ may be bonded to each other to form a ring; and wherein, in Formula (1), n1 represents an integer from 0 to 4, and n2 represents an integer from 0 to 3;

wherein, in Formula (2), $R_5$ represents a linear or branched alkylene group, an arylene group, or a divalent group in which an alkylene group and an arylene group are bonded to each other, and the alkylene group, the arylene group, and the divalent group in which an alkylene group and an arylene group are bonded to each other may contain an oxygen atom;

wherein, in Formula (2), * represents a binding position, and n3 represents an integer from 0 to 3; and wherein, in Formula (2), X represents a structure represented by the following Formula (X1) or a structure represented by the following Formula (X2):

wherein, in Formula (X1) and Formula (X2), each of $R_6$ and $R_7$ independently represents a halogen atom, a cyano group, a hydroxyl group, a sulfone group, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, a substituted or unsubstituted amino group, a substituted or unsubstituted alkylcarbonyl group, a substituted or unsubstituted arylcarbonyl group, a carboxylic acid ester group, or a sulfonic acid ester group;

wherein, in Formula (X1) and Formula (X2), in a case in which a plurality of $R_6$ is present, each of the plurality of $R_6$ may be the same or different, or may be bonded to each other to form a ring;

wherein, in Formula (X1) and Formula (X2), in a case in which a plurality of $R_7$ is present, each of the plurality of $R_7$ may be the same or different, or may be bonded to each other to form a ring;

wherein, in Formula (X1) and Formula (X2), each of $R_8$ and $R_9$ independently represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkylcarbonyl group, a substituted or unsubstituted arylcarbonyl group, or a substituted or unsubstituted carbamoyl group, and $R_8$ and $R_9$ may be bonded to each other to form a ring, where * represents a binding position;

wherein, in Formula (X1), m1 represents an integer from 0 to 3, and m2 represents an integer from 0 to 3; and wherein, in Formula (X2), m3 represents an integer from 0 to 4, and m4 represents an integer from 0 to 2.

<2> The benzotriazole compound according to <1>, wherein at least one of $R_3$ or $R_4$ is a substituted or unsubstituted alkyl group, a substituted or unsubstituted alkylcarbonyl group, or a substituted or unsubstituted arylcarbonyl group.

<3> The benzotriazole compound according to <1> or <2>, wherein $R_3$ is a hydrogen atom and $R_4$ is a substituted or unsubstituted alkyl group or a substituted or unsubstituted alkylcarbonyl group.

<4> The benzotriazole compound according to any one of <1> to <3>, wherein $R_1$ is a halogen atom, a substituted or unsubstituted alkoxy group, a substituted or unsubstituted alkylthio group, a substituted or unsubstituted arylthio group, or a structure represented by Formula (2).

<5> The benzotriazole compound according to any one of <1> to <4>, having a maximum absorption wavelength of from 330 nm to 430 nm.

<6> A light absorber containing the benzotriazole compound according to any one of <1> to <5>.

<7> A resin composition, comprising:
(A) a thermoplastic resin or a thermosetting resin; and
(B) the benzotriazole compound according to any one of <1> to <5>.

<8> The resin composition according to <7>, wherein a content of the benzotriazole compound is from 500 ppm to 9000 ppm with respect to a total mass of the resin composition.

<9> The resin composition according to <7> or <8>, wherein a* is from −9 to 1 and b* is from −1 to 19 in a CIE 1976 (L*, a*, b*) color space in a case in which the resin composition is measured at a thickness of 2 mm.

<10> The resin composition according to any one of <7> to <9>, wherein:
the thermoplastic resin is at least one selected from a polycarbonate resin, a polyamide resin, an acrylic resin, or a polyester resin, and the thermosetting resin is at least one selected from a polyurethane resin, a polythiourethane resin, or an allyldiglycol carbonate resin.

<1A> A benzotriazole compound represented by the following Formula (1A).

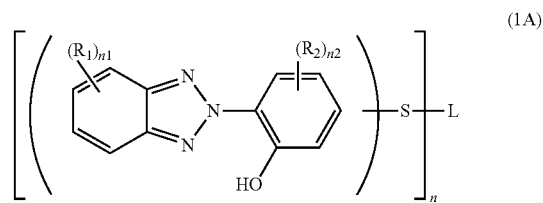

In Formula (1A), each of $R_1$ and $R_2$ independently represents a halogen atom, a cyano group, a hydroxyl group, a sulfone group, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, a substituted or unsubstituted amino group, a substituted or unsubstituted alkylcarbonyl group, a substituted or unsubstituted arylcarbonyl group, a carboxylic acid ester group, or a sulfonic acid ester group.

In Formula (1A), n represents an integer from 2 or more, and L represents a linking group of n valence.

In Formula (1A), n1 represents an integer from 0 to 4, n2 represents an integer from 0 to 4, and n1+n2 is from 0 to 7.

In a case in which a plurality of $R_1$ are present in Formula (1A), the plurality of $R_1$ may be the same or different, or may be bound together to form a ring.

In a case in which a plurality of $R_2$ are present in Formula (1A), the plurality of $R_2$ may be the same or different, or may be bound together to form a ring.

<2A> The benzotriazole compound according to <1A>, wherein L is a hydrocarbon group that may contain an oxygen atom, a nitrogen atom, or a sulfur atom.

<3A> The benzotriazole compound according to <2A>, wherein the hydrocarbon group which may contain an oxygen atom, a nitrogen atom, or a sulfur atom has from 1 to 15 carbon atoms.

<4A> The benzotriazole compound according to any one of <1A> to <3A>, wherein n is 2 or 3.

<5A> The benzotriazole compound according to <4A>, wherein n is 2 and L is a linking group represented by the following Formula (a) or a linking group represented by the following Formula (b), or n is 3 and L is a linking group represented by the following Formula (c).

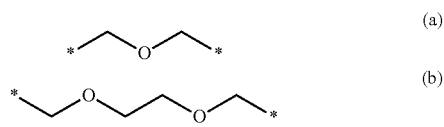

-continued

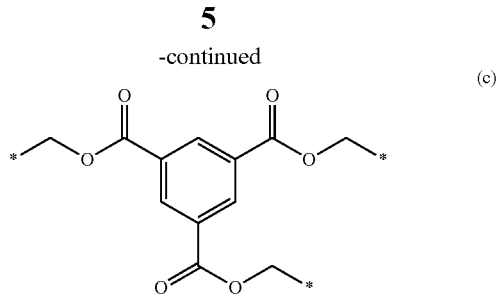
(c)

In Formula (a), Formula (b), and Formula (c), * represents a binding position.

<6A> The benzotriazole compound according to any one of <1A> to <5A>, which has a maximum absorption wavelength of from 330 nm to 430 nm.

<7A> A light absorber containing the benzotriazole compound according to any one of <1A> to <6A>.

<8A> A resin composition including (A) a thermoplastic resin or a thermosetting resin, and (B) the benzotriazole compound according to any one of <1A> to <6A>.

<9A> The resin composition according to <8A>, wherein a content of the benzotriazole compound is from 500 ppm to 15000 ppm with respect to the total mass of the resin composition.

<10A> The resin composition according to <8A> or <9A>, wherein a* is from −5 to −1 and b* is from 2 to 10 in a CIE 1976 (L*, a*, b*) color space in a case in which the resin composition is measured at a thickness of 2 mm.

<11A> The resin composition according to any one of <8A> to <10A>, wherein the thermoplastic resin is at least one selected from a polycarbonate resin, a polyamide resin, an acrylic resin, or a polyester resin, and the thermosetting resin is at least one selected from a polyurethane resin, a polythiourethane resin, or an allyldiglycol carbonate resin.

Advantageous Effects of Invention

The first embodiment and the second embodiment of the present disclosure can provide a light absorber capable of reducing the transmittance of blue light with a small content, a resin composition containing the light absorber, and a benzotriazole compound useful as a light absorber.

DESCRIPTION OF EMBODIMENTS

Figure 1:
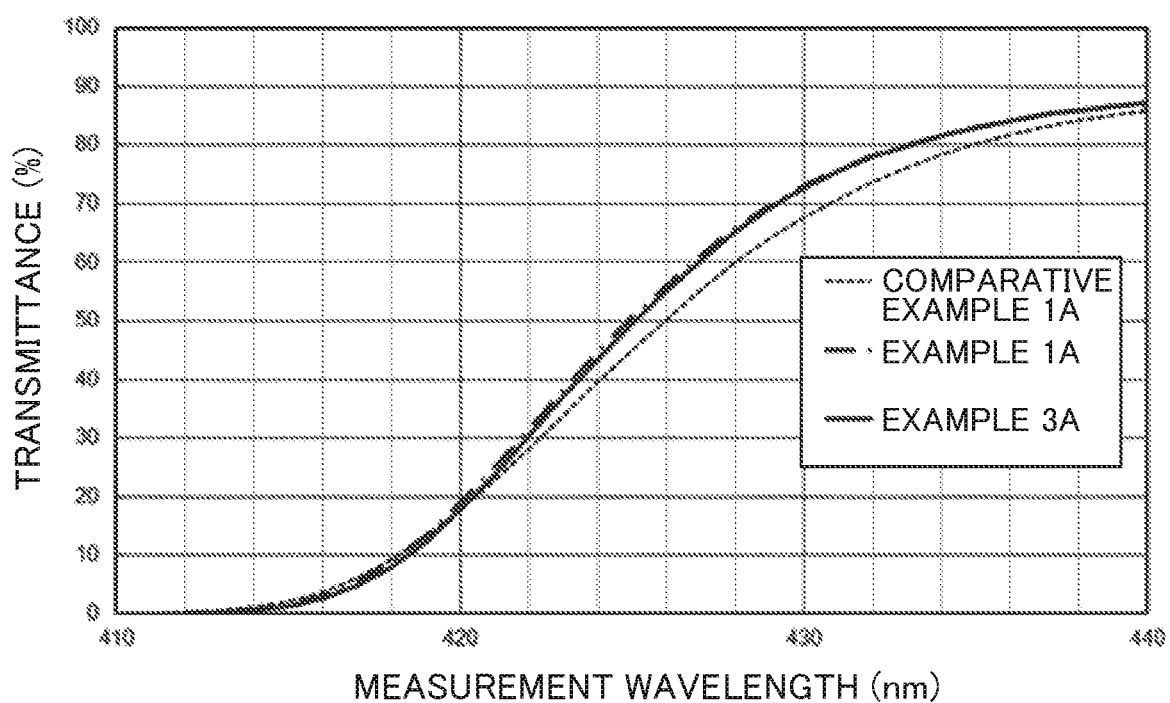
FIG. 1 is a graph showing transmittance curves of resin compositions in Example 1A, Example 3A, and Comparative Example 1A.

The numerical range indicated by using "to" in the disclosure means a range including the numerical values before and after "to" as the minimum value and the maximum value, respectively.

In the numerical range described in a stepwise manner in the disclosure, the upper limit value or the lower limit value described in a certain numerical range may be replaced with the upper limit value or the lower limit value of another numerical range described in a stepwise manner. In the numerical range described in the disclosure, the upper limit value or the lower limit value described in a certain numerical range may be replaced with the values shown in Examples.

In the disclosure, any combination of two or more preferred embodiments is a more preferred embodiment.

In the disclosure, the amount of each component means the total amount of a plurality of kinds of substances when a plurality of kinds of substances corresponding to each component are present, unless otherwise specified.

Benzotriazole Compound of First Embodiment

The benzotriazole compound of the first embodiment is represented by the following Formula (1).

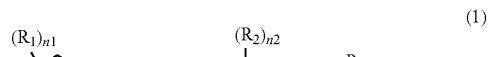
(1)

(2)

(X1)

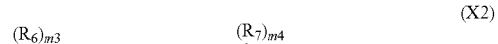
(X2)

The benzotriazole compound of the first embodiment can reduce the transmittance of light from the ultraviolet region having a wavelength of 400 nm or less to the blue light region (for example, a wavelength region of from 400 nm to 420 nm) by having the structure represented by Formula (1). In a case in which a light absorber containing the benzotriazole compound of the first embodiment and a resin composition containing the benzotriazole compound of the first embodiment are produced, the light absorber and the resin composition can reduce the transmittance of light with a relatively small amount of the content of the benzotriazole compound.

Hereinafter, Formula (1), Formula (2), Formula (X1), and Formula (X2) will be described in detail.

<Formula (1)>

In Formula (1), each of $R_1$ and $R_2$ independently represents a halogen atom, a cyano group, a hydroxyl group, a sulfone group, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, a substituted or unsubstituted amino group, a substituted or unsubstituted alkylcarbonyl group, a substituted or unsubstituted arylcarbonyl group, a carboxylic acid ester group, a sulfonic acid ester group, or a structure represented by Formula (2).

In a case in which a plurality of $R_1$ are present in the Formula (1), the plurality of $R_1$ may be the same or different, or may be bound together to form a ring.

In a case in which a plurality of $R_2$ are present in the Formula (1), the plurality of $R_2$ may be the same or different, or may be bound together to form a ring.

In Formula (1), each of $R_3$ and $R_4$ independently represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkylcarbonyl group, a substituted or unsubstituted arylcarbonyl group, or a substituted or unsubstituted carbamoyl group, or $R_3$ to $R_4$ may be bound together to form a ring.

In Formula (1), n1 represents an integer from 0 to 4, and n2 represents an integer from 0 to 3.

In Formula (1), it is more preferable that each of $R_1$ and $R_2$ independently represents a halogen atom, a cyano group, a hydroxyl group, a sulfone group, a substituted or unsubstituted alkyl group having from 1 to 20 carbon atoms, a substituted or unsubstituted alkenyl group having from 2 to 20 carbon atoms, a substituted or unsubstituted alkynyl group having from 2 to 20 carbon atoms, a substituted or unsubstituted aralkyl group having from 7 to 25 carbon atoms, a substituted or unsubstituted aryl group having from 6 to 24 carbon atoms, a substituted or unsubstituted alkoxy group having from 1 to 18 carbon atoms, a substituted or unsubstituted aryloxy group having from 6 to 24 carbon atoms, a substituted or unsubstituted alkylthio group having from 1 to 18 carbon atoms, a substituted or unsubstituted arylthio group having from 6 to 24 carbon atoms, a substituted or unsubstituted amino group having from 1 to 24 carbon atoms, a substituted or unsubstituted alkylcarbonyl group having from 2 to 13 total carbon atoms, a substituted or unsubstituted arylcarbonyl group having from 7 to 25 total carbon atoms, an ester group, or a sulfonic acid ester group.

In Formula (1), it is still more preferable that each of $R_1$ and $R_2$ independently represents a halogen atom, a substituted or unsubstituted alkyl group having from 1 to 12 carbon atoms, a substituted or unsubstituted aralkyl group having from 7 to 19 carbon atoms, a substituted or unsubstituted aryl group having from 6 to 24 carbon atoms, a substituted or unsubstituted alkoxy group having from 1 to 8 carbon atoms, a substituted or unsubstituted aryloxy group having from 6 to 18 carbon atoms, a substituted or unsubstituted alkylthio group having from 1 to 8 carbon atoms, a substituted or unsubstituted arylthio groups having from 6 to 18 carbon atoms, or a substituted or unsubstituted amino group having from 1 to 16 carbon atoms.

In Formula (1), it is preferable that $R_1$ is contained in at least one of the 5-position or the 6-position of the benzotriazole ring in Formula (X1).

In Formula (1), it is more preferable that $R_1$ is contained in at least one of the 5-position or the 6-position of the benzotriazole ring in Formula (X1), and $R_1$ is a substituted or unsubstituted arylthio group.

In Formula (1), it is still more preferable that $R_1$ is contained in at least one of the 5-position or the 6-position of the benzotriazole ring in Formula (X1), and $R_1$ is a 4-tert-butylarylthio group.

The 5-position and 6-position of the benzotriazole ring are specifically as shown in the following Formula.

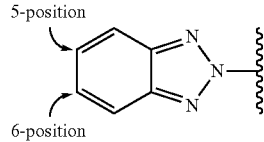

In the benzotriazole compound of the first embodiment, it is preferable that $R_1$ is a halogen atom, a substituted or unsubstituted alkoxy group, a substituted or unsubstituted alkylthio group, a substituted or unsubstituted arylthio group, or a structure represented by Formula (2).

In the benzotriazole compound of the first embodiment, it is preferable that at least one of $R_3$ or $R_4$ is a substituted or unsubstituted alkyl group, a substituted or unsubstituted alkylcarbonyl group, or a substituted or unsubstituted arylcarbonyl group.

In the benzotriazole compound of the first embodiment, it is preferable that $R_3$ is a hydrogen atom and $R_4$ is a substituted or unsubstituted alkyl group or a substituted or unsubstituted alkyl carbonyl group.

Examples of the halogen atom include a chlorine atom, a fluorine atom, a bromine atom, and an iodine atom. Among the above, a chlorine atom and a fluorine atom are preferable.

Examples of the unsubstituted alkyl group include a linear or branched unsubstituted alkyl group such as a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, a 1-methylpentyl group, a 4-methyl-2-pentyl group, a 2-ethylbutyl group, an n-heptyl group, a 1-methylhexyl group, an n-octyl group, 1-methylheptyl group, or a 2-ethylhexyl group.

Examples of the substituted alkyl group include, an alkyl group having an alkyloxy group such as a methoxymethyl group, an ethoxymethyl group, an n-butoxymethyl group, an n-hexyloxymethyl group, or a (2-ethylbutyloxy)methyl group;

an alkyl group having an alkenyloxy group such as a 2-(4'-pentenyloxy)ethyl group;

an alkyl group having an aralkyloxy group such as a benzyloxymethyl group or 2-(benzyloxymethoxy)ethyl group;

an alkyl group having an aryloxy group such as a phenyloxymethyl group, a 4-chlorophenyloxymethyl group, or 4-(2'-phenyloxyethoxy)butyl group;

an alkyl group having a thioalkyl group such as n-butylthiomethyl group or a 2-n-octylthioethyl group; and an alkyl group having a halogen atom such as a fluoromethyl group, a trifluoromethyl group, a perfluoroethyl group, a 4-fluorocyclohexyl group, a dichloromethyl group, a 4-chlorocyclohexyl group, or a 7-chloroheptyl group.

Examples of the substituted or unsubstituted alkenyl group include a vinyl group, a propenyl group, a 1-butenyl group, an isobutenyl group, a 1-pentenyl group, a 2-pentenyl group, a 2-methyl-1-butenyl group, a 2-cyclopentenyl group, a 1-vinylhexyl group, a styryl group, a styrylmethyl group, and 2-styrylethyl group.

Examples of the substituted or unsubstituted alkynyl group include an acetylenyl group, a propynyl group, a 1-butynyl group, a 1-pentynyl group, a 2-pentynyl group, a 2-methyl-1-pentynyl group, and a phenylacetylenyl group.

Examples of the substituted or unsubstituted aralkyl group include an unsubstituted aralkyl group and an aralkyl group having an alkyl group such as a benzyl group, an α-methylbenzyl group, a phenethyl group, an α-methylphenethyl group, an α,α-dimethylbenzyl group, an α,α-dimethylphenethyl group, a 4-methylphenethyl group, a 4-methylbenzyl group, or a 4-isopropylbenzyl group;

an aralkyl group having an aryl group or an aralkyl group such as a 4-benzylbenzyl group, a 4-phenethylbenzyl group, or a 4-phenylbenzyl group, for example, an aralkyl group having a substituted oxy group such as a 4-methoxybenzyl group, a 4-n-tetradecyloxybenzyl group, a 4-n-heptadecyloxybenzyl group, a 3,4-dimethoxybenzyl group, a 4-methoxymethylbenzyl group, a 4-vinyloxymethylbenzyl group, a 4-benzyloxybenzyl group, or 4-phenethyloxybenzyl group;

an aralkyl group having a hydroxyl group such as a 4-hydroxybenzyl group or a 4-hydroxy-3-methoxybenzyl group, for example, an aralkyl group having a halogen atom such as a 4-fluorobenzyl group, a 3-chlorobenzyl group, or a 3,4-dichlorobenzyl group;

a 2-furfuryl group, a diphenylmethyl group, a 1-naphthylmethyl group, and a 2-naphthylmethyl group.

Examples of the substituted or unsubstituted aryl group include an unsubstituted aryl group such as a phenyl group, a 1-naphthyl group, a 2-naphthyl group, a 2-anthracenyl group, a 1-phenanthryl group, a 2-phenanthryl group, a 3-phenanthryl group, a 1-pyrenyl group, a 2-pyrenyl group, a 2-perylenyl group, a 3-perylenyl group, a 2-fluoranthenyl group, a 3-fluoranthenyl group, a 7-fluoranthenyl group, or a 8-fluoranthenyl group;

an aryl group having an alkyl group such as a 1-methyl-2-pyrenyl group, a 2-methylphenyl group, a 4-ethylphenyl group, a 4-(4'-tert-butylcyclohexyl)phenyl group, a 3-cyclohexylphenyl group, a 2-cyclohexylphenyl group, a 4-ethyl-1-naphthyl group, a 6-n-butyl-2-naphthyl group, or a 2,4-dimethylphenyl group;

an aryl group having an alkoxy group or an aryloxy group such as a 4-methoxyphenyl group, a 3-ethoxyphenyl group, a 2-ethoxyphenyl group, a 4-n-propoxyphenyl group, a 3-n-propoxyphenyl group, a 4-isopropoxyphenyl group, a 3-isopropoxyphenyl group, a 2-isopropoxyphenyl group, a 2-sec-butoxyphenyl group, a 4-n-pentyl oxyphenyl group, a 4-isopentyloxyphenyl group, a 2-methyl-5-methoxyphenyl group, or 2-phenyloxyphenyl group;

an aryl group having an aryl group such as a 4-phenylphenyl group, a 3-phenylphenyl group, a 2-phenylphenyl group, a 2,6-diphenylphenyl group, a 4-(2'-naphthyl) phenyl group, a 2-phenyl-1-naphthyl group, a 1-phenyl-2-naphthyl group, or a 7-phenyl-1-pyrenyl group;

an aryl group having a halogen atom such as a 4-fluorophenyl group, a 3-fluorophenyl group, a 2-fluorophenyl group, a 4-chlorophenyl group, a 4-bromophenyl group, a 2-chloro-5-methylphenyl group, a 2-chloro-6-methylphenyl group, a 2-methyl-3-chlorophenyl group, a 2-methoxy-4-fluorophenyl group, or a 2-fluoro-4-methoxyphenyl group;

a 2-trifluoromethylphenyl group, a 3-trifluoromethylphenyl group, a 4-trifluoromethylphenyl group, a 3,5-bistrifluoromethylphenyl group, a 4-perfluoroethylphenyl group, a 4-methylthiophenyl group, a 4-ethylthiophenyl group, a 4-cyanophenyl group, and a 3-cyanophenyl group.

As the substituted or unsubstituted alkoxy group, a substituted or unsubstituted alkoxy group having from 1 to 18 carbon atoms is preferable, and a substituted or unsubstituted alkoxy group having from 1 to 8 carbon atoms is more preferable.

Examples of the unsubstituted alkoxy group include a linear, branched, or cyclic unsubstituted alkoxy group such as a methoxy group, an ethoxy group, an n-propyloxy group, an isopropyloxy group, an n-butyloxy group, an isobutyloxy group, a tert-butyloxy group, a sec-butyloxy group, n-pentyloxy group, an isopentyloxy group, an n-hexyloxy group, a 2-methylpentyloxy group, a 1,1-dimethylbutyloxy group, a 1,2,2-trimethylpropyloxy group, a 2-ethylbutyloxy group, a 1,3-dimethylhexyloxy group, a cyclohexyloxy group, a methylcyclopentyloxy group, an n-heptyloxy group, an n-heptyloxy group, an n-octyloxy group, a 3,5,5-trimethylhexyloxy group, an n-decyloxy group, an n-undecyloxy group, an n-dodecyloxy group, a 1-adamantyloxy group, or an n-pentadecyloxy group.

Examples of the substituted alkoxy groups include an alkoxy group having an alkoxy group such as a methoxymethoxy group, an ethoxymethoxy group, an n-propyloxymethoxy group, an n-butyloxymethoxy group, an isobutyloxymethoxy group, a tert-butyloxymethoxy group, an n-pentyloxymethoxy group, a 2-methoxyethoxy group, a 2-ethoxyethoxy group, a 2-n-propyloxyethoxy group, a 2-isopropyloxyethoxy group, a 2-n-butyloxyethoxy group, a 2-isobutyloxyethoxy group, a 2-tert-butyloxyethoxy group, a 2-sec-butyloxyethoxy group, a 2-n-pentyloxyethoxy group, a 2-isopentyloxyethoxy group, a 2-tert-pentyloxyethoxy group, a 2-sec-pentyloxyethoxy group, a 2-cyclopentyloxyethoxy group, a 2-n-hexyloxyethoxy group, a 2-(4-ethylcyclohexyloxy)ethoxy group, a 2-n-nonyloxyethoxy group, a 2-(3,5,5-trimethylhexyloxy)ethoxy group, a 2-n-decyloxyethoxy group, a 2-n-dodecyloxyethoxy group, a 3-methoxypropyloxy group, a 3-ethoxypropyloxy group, a 3-(n-propyloxy)propyloxy group, a 2-isopentyloxypropyloxy group, a 2-methoxybutyloxy group, a 4-ethoxybutyloxy group, a 4-(n-propyloxy)butyloxy group, a 4-isopropyloxybutyloxy group, a 5-methoxypentyloxy group, a 5-ethoxymethoxy group, or a 6-n-propylhexyloxy group;

an alkoxy group having an alkoxyalkoxy group such as a methoxymethoxymethoxy group, an ethoxymethoxymethoxy group, a propyloxymethoxymethoxy group, a butyloxymethoxymethoxy group, a methoxyethoxymethoxy group, an ethoxyethoxymethoxy group, a propyloxyethoxymethoxy group, a methoxymethoxyethoxy group, an ethoxymethoxyethoxy group, a propyloxymethoxyethoxy group, a butyloxymethoxyethoxy group, a propyloxyethoxyethoxy group, a butyloxyethoxyethoxy group, a propyloxybutyloxyethoxy group, a methoxymethoxypropyloxy group, an ethoxymethoxypropyloxy group, a butyloxymethoxypropyloxy group, a methoxymethoxybutyloxy group, an ethoxymethoxybutyloxy group, a butyloxymethoxybutyloxy group, an ethoxyethoxybutyloxy group, a (4-ethylcyclohexyloxy)ethoxyethoxy group, or a [4-(3,5,5-trimethylhexyloxy)butyloxy]ethoxy group;

an alkoxy group having an alkoxycarbonyl group such as a methoxycarbonylmethoxy group, an ethoxycarbonylmethoxy group, an n-propyloxycarbonylmethoxy group, an isopropyloxycarbonylmethoxy group, or a (4'-ethylcyclohexyloxy)carbonylmethoxy group;

an alkoxy group having an alkoxycarbonyl group such as a methoxycarbonylethoxy group, an ethoxycarbonylethoxy group, an n-propyloxycarbonylethoxy group, or an ethoxycarbonylpropyloxy group;

an alkoxy group having an alkylamino group such as a methylaminomethoxy group, a 2-methylaminoethoxy group, a 2-(2-methylaminoethoxy)ethoxy group, a 4-methylaminobutyloxy group, a 1-methylaminopropane-2-yloxy group, a 3-methylaminopropyloxy group, a 2-methylamino-2-methylpropyloxy group, a 2-ethylaminoethoxy group, a 2-(2-ethylaminoethoxy)ethoxy group, a 3-ethylaminopropyloxy group, a 1-ethylaminopropyloxy group, a 2-isopropylaminoethoxy group, a 2-(n-butylamino)ethoxy group, a 3-(n-hexylamino)propyloxy group, or a 4-(cyclohexylamino)butyloxy group;

an alkoxy group having a dialkylamino group such as a dimethylaminomethoxy group, a 2-dimethylaminoethoxy group, a 2-(2-dimethylaminoethoxy)ethoxy group, a 4-dimethylaminobutyloxy group, a 1-dimethylaminopropane-2-yloxy group, a 3-dimethylaminopropyloxy group, a 2-dimethylamino-2-methylpropyloxy group, a 2-diethylaminoethoxy group, a 2-(2-diethylaminoethoxy)ethoxy group, a 3-diethylaminopropyloxy group, a 1-diethylaminopropyloxy group, a 2-diisopropylaminoethoxy group, a 2-(di-n-butylamino)ethoxy group, a 2-piperidylethoxy group, or a 3-(di-n-hexyl amino) propyloxy group;

an alkoxy group having an alkylaminoalkoxy group such as a methylaminomethoxymethoxy group, a methylaminoethoxyethoxy group, a methylaminoethoxypropyl oxy group, an ethylaminoethoxypropyloxy group, or a 4-(2'-isobutylaminopropyloxy)butyloxy group;

an alkoxy group having a dialkylaminoalkoxy group such as a dimethylaminomethoxymethoxy group, a dimethylaminoethoxyethoxy group, a dimethylaminoethoxypropyloxy group, a diethylaminoethoxypropyloxy group, or a 4-(2'-diisobutylaminopropyloxy)butyloxy group;

an alkoxy group having an alkylthio group such as a methylthiomethoxy group, a 2-methylthioethoxy group, a 2-ethylthioethoxy group, a 2-n-propylthioethoxy group, a 2-isopropylthioethoxy group, a 2-n-butylthioethoxy group, a 2-isobutylthioethoxy group, or a (3,5,5-trim ethylhexylthio)hexyl oxy group; and an alkoxy group having a heterocyclic group such as a 2-N-morpholinylethoxy group, a 2-N-pyridylethoxy group, a 2-N-pyrrolylethoxy group, a 2-(2-furyl)ethoxy group, a 2-(1-indolyl)ethoxy group, a 2-(3-thienyl) ethoxy group, a 3-N-morpholinylpropyloxy group, a 3-N-pyridylpropyloxy group, a 3-N-pyrrolylpropyloxy group, or a 3-(1-indolyl)propyloxy group.

Examples of the substituted or unsubstituted aryloxy group include a heteroaryloxy group, and examples thereof include a phenyloxy group, a 2-methylphenyloxy group, a 4-methylphenyloxy group, a 4-ethylphenyloxy group, and a 4-isopropylphenoxy group, a 4-isobutylphenyloxy group, a 4-n-pentylphenyloxy group, a 4-tert-pentylphenyloxy group, a 4-cyclohexylphenyloxy group, a 4-n-octylphenyloxy group, a 4-n-decylphenyloxy group, a 4-n-dodecylphenyloxy group, a 4-n-hexadecylphenyloxy group, a 2,3-dimethylphenyloxy group, a 2,5-dimethylphenyloxy group, a 3,4-dimethylphenyloxy group, a 3,4,5-trimethylphenyloxy group, a 5-indanyloxy group, a 1,2,3,4-tetrahydro-6-naphthyloxy group, a 3-methoxyphenyloxy group, a 3-ethoxyphenyloxy group, a 4-n-propoxyphenyloxy group, a 4-n-butoxyphenyloxy group, a 4-n-pentyloxyphenyloxy group, a 4-cyclohexyloxyphenyloxy group, a 4-n-octyloxyphenyloxy group, a 4-n-decyloxyphenyloxy group, a 4-n-dodecyloxyphenyloxy group, a 4-n-hexadecyloxyphenyloxy group, a 2,3-dimethoxyphenyl oxy group, a 2,5-dimethoxyphenyloxy group, a 3,5-dimethoxyphenyloxy group, a 2-methoxy-4-methylphenyloxy group, a 3-methoxy-4-methylphenyloxy group, a 3-methyl-4-methoxyphenyloxy group, a 2-fluorophenyloxy group, a 4-fluorophenyloxy group, a 3-chlorophenyloxy group, a 4-bromophenyloxy group, a 3-trifluoromethylphenyloxy group, a 3,5-difluorophenyloxy group, a 3,4-dichlorophenyl oxy group, a 2-methyl-4-chlorophenyloxy group, a 3-chloro-4-methylphenyloxy group, a 3-methoxy-4-fluorophenyloxy group, a 3-fluoro-4-methoxyphenyloxy group, a 4-phenylphenyloxy group, a 3-phenylphenyloxy group, a 4-(4'-methylphenyl)phenyloxy group, a 4-(4'-methoxyphenyl)phenyloxy group, a 1-naphthyloxy group, a 4-methyl-1-naphthyloxy group, a 6-n-butyl-2-naphthyloxy group, a 7-ethoxy-2-naphthyloxy group, a 2-thienyloxy group, a 2-pyridyloxy group, and a 4-pyridyloxy group.

Examples of the unsubstituted alkylthio group include a linear, branched, or cyclic unsubstituted alkylthio group such as a methylthio group, an ethylthio group, an n-propylthio group, an isopropylthio group, an n-butylthio group, an isobutylthio group, a tert-butylthio group, a sec-butylthio group, an n-pentylthio group, an isopentylthio group, an n-hexylthio group, a 2-methylpentylthio group, a 1,1-dimethylbutylthio group, a 1,2,2-trimethylpropylthio group, a 2-ethylbutylthio group, a 1,3-dimethylhexylthio group, a cyclohexylthio group, a methylcyclopentylthio group, an n-heptylthio group, an n-heptylthio group, an n-octylthio group, a 3,5,5-trimethylhexylthio group, an n-decylthio group, an n-undecylthio group, an n-dodecylthio group, a 1-adamantylthio group, or an n-pentadecylthio group.

Examples of the substituted alkylthio group include an alkylthio group having an alkoxy group such as a methoxymethylthio group, an ethoxymethylthio group, an n-propyloxymethylthio group, an n-butyloxymethylthio group, an isobutyloxymthylthio group, a tert-butyloxymethylthio group, an n-pentyloxymethylthio group, a 2-methoxyethylthio group, a 2-ethoxyethylthio group, a 2-n-propyloxyethylthio group, a 2-isopropyloxyethylthio group, a 2-n-butyloxyethylthio group, a 2-isobutyloxyethylthio group, a 2-tert-butyloxyethylthio group, a 2-sec-butyloxyethylthio group, a 2-n-pentyloxyethylthio group, a 2-isopentyloxyethylthio group, a 2-sec-pentyloxyethylthio group, a 2-n-hexyloxyethylthio group, a 2-(4-ethylcyclohexyloxy)ethylthio group, a 2-n-nonyloxyethylthio group, a 2-(3,5,5-trimethylhexyloxy)ethylthio group, a 2-n-decyloxyethylthio group, a 2-n-dodecyloxyethylthio group, a 3-methoxypropylthio group, a 3-ethoxypropylthio group, a 3-(n-propylthio)propylthio group, a 2-isopentyloxypropylthio group, a 2-methoxybutylthio group, a 4-ethoxybutylthio group, a 4-(n-propyloxy)butylthio group, a 5-methoxypentylthio group, a 5-ethoxypentylthio group, or a 6-n-propyloxyhexylthio group;

an alkylthio group having an alkoxyalkoxy group such as a methoxymethoxymethylthio group, an ethoxymethoxymethylthio group, a propyloxymethoxymethylthio group, a butyloxymethoxymethylthio group, an ethoxyethoxymethylthio group, a propyloxyethoxymethylthio group, a methoxymethoxyethylthio group, an ethoxymethoxyethylthio group, a propyloxymethoxyethylthio group, a butyloxymethoxyethylthio group, a propyloxyethoxyethylthio group, a butyloxyethoxyethylthio group, a propyloxybutyloxyethylthio group, a methoxymethoxypropylthio group, an ethoxymethoxypropylthio group, a butyloxymethoxypropylthio group, a butyloxymethoxybutylthio group, an ethoxyethoxybutylthio group, a cyclohexyloxyethoxyethylthio group, or a [4-(3,5,5-trimethylhexyloxy)butyloxy]ethylthio group;

an alkylthio group having an alkoxycarbonyl group such as a methoxycarbonylmethylthio group, an ethoxycarbonylmethylthio group, an n-propyloxycarbonylmethylthio group, a methoxycarbonylethylthio group, an ethoxycarbonylethylthio group, an n-propyloxycarbonylethylthio group, or an ethoxycarbonylpropylthio group;

an alkylthio group having an alkylamino group such as a methylaminomethylthio group, a 2-methylaminoethylthio group, a 2-(2-methylaminoethoxy)ethylthio group, a 4-methylaminobutylthio group, a 1-methylaminopropane-2-yloxy group, a 3-methylaminopropylthio group, a 2-ethylaminoethylthio group, a 2-(2-ethylaminoethoxy)ethylthio group, a 3-ethylaminopropylthio group, a 1-ethylaminopropylthio group, a 2-isopropylaminoethylthio group, a 2-(n-butylamino)ethylthio group, a 3-(n-hexylamino)propylthio group, or a 4-(cyclohexylamino)butylthio group;

an alkylthio group having a dialkylamino group such as a dimethylaminomethylthio group, a 2-dimethylaminoethylthio group, a 4-dimethylaminobutylthio group, a 1-dimethylaminopropane-2-ylthio group, a 3-dimethylaminopropylthio group, a 2-diethylaminoethylthio group, a 3-diethylaminopropylthio group, a 2-diisopropylaminoethylthio group, a 2-(di-n-butylamino)ethylthio group, a 2-piperidylethylthio group, or a 3-(di-n-hexylamino)propylthio group;

an alkylthio group having an alkylthio group such as a methylthiomethylthio group, a 2-methylthioethylthio group, a 2-ethylthioethylthio group, a 2-n-propylthioethylthio group, a 2-isopropylthioethylthio group, a 2-n-butylthioethylthio group, a 2-isobutylthioethylthio group, or a (3,5,5-trimethylhexylthio)hexylthio group; and an alkylthio group having a heterocyclic group such as a 2-N-morpholinylethylthio group, a 2-N-pyridylethylthio group, a 2-N-pyrrolylethylthio group, a 2-(2-furyl)ethylthio group, a 2-(1-indolyl)ethylthio group, a 2-(3-thienyl)ethylthio group, a 3-N-morpholinylpropylthio group, a 3-N-pyridylpropylthio group, a 3-N-pyrrolylpropylthio group, or a 3-(1-indolyl)propylthio group.

Examples of the substituted or unsubstituted arylthio group include a heteroarylthio group, and examples thereof include a phenylthio group, a 2-methylphenylthio group, a 4-methylphenylthio group, a 3-ethylphenylthio group, a 4-n-propylphenylthio group, a 4-isopropylphenylthio group, a 4-n-butylphenylthio group, a 4-isobutylphenylthio group, a 4-tert-butylphenylthio group, a 4-n-pentylphenylthio group, a 4-n-hexylphenylthio group, a 4-cyclohexylphenylthio group, a 4-n-octylphenylthio group, a 4-n-dodecylphenylthio group, a 4-n-octadecylphenylthio group, a 2,5-dimethylphenylthio group, a 3,4-dimethylphenylthio group, a 5-indanylthio group, a 1,2,3,4-tetrahydro-6-naphthylthio group, a 2-methoxyphenylthio group, a 3-methoxyphenylthio group, a 4-ethoxyphenylthio group, a 4-n-propoxyphenylthio group, a 2,4-dimethoxyphenylthio group, a 3,5-diethoxyphenylthio group, a 2-methoxy-4-methylphenylthio group, a 2-methyl-4-methoxyphenylthio group, a 2-fluorophenylthio group, a 4-fluorophenylthio group, a 2-chlorophenylthio group, a 4-bromophenylthio group, a 4-trifluoromethylphenylthio group, a 3-trifluoromethylphenylthio group, a 2,4-difluorophenylthio group, a 2,4-dichlorophenylthio group, a 2-chloro-4-methoxyphenylthio group, a 2-naphthylthio group, a 4-methyl-1-naphthylthio group, a 4-ethoxy-1-naphthylthio group, a 2-pyridylthio group, a 4-aminophenylthio group, a 4-(N,N-dimethylamino)phenylthio group, a 4-(N,N-diethylamino)-1-naphthylthio group, a 4-[N,N-di(4'-methylphenyl)amino]phenylthio group, and a 4-(N-phenoxadiyl)phenylthio group.

As the substituent of the substituted amino group, a substituted or unsubstituted alkyl group, a substituted or unsubstituted aryl group, or a substituted or unsubstituted aralkyl group is preferable.

Examples of the substituted amino group include a monoalkylamino group such as a methylamino group, an ethylamino group, a propylamino group, a butylamino group, a pentylamino group, a hexylamino group, a heptylamino group, an octylamino group, a 2-ethylhexylamino group, a cyclohexylamino group, a 3,5,5-trimethylhexylamino group, a nonylamino group, or a decylamino group;

a dialkylamino group such as a dimethylamino group, a diethylamino group, a methylethylamino group, a di-n-propylamino group, a di-n-butylamino group, a di-n-pentylamino group, an N-methyl-N-ethylamino group, an N-ethyl-N-isopropylamino group, an N-ethyl-N-cyclohexylamino group, or an N-methyl-N-n-octylamino group;

an amino group having an aryl group such as an N-methyl-N-phenylamino group, an N-ethyl-N-phenylamino group, an N-ethyl-N-(2,4-dimethylphenyl)amino group, an N-n-propyl-N-(2-ethoxyphenyl)amino group, an N-methyl-N-(3-chlorophenyl)amino group, a diphenylamino group, a di-(p-tolyl)amino group, or an N-methyl-N-(2-naphthyl)amino group;

an amino group having an aralkyl group such as a benzylamino group, a phenethylamino group, a 3-phenylpropylamino group, a 4-ethylbenzylamino group, a 4-isopropylbenzylamino group, a dibenzylamino group, a diphenethylamino group, a bis(4-ethylbenzyl)amino group, a bis(4-isopropylbenzyl)amino group, an N-ethyl-N-benzylamino group, or an N-methyl-N-phenethylamino group.

Examples of the substituted or unsubstituted alkylcarbonyl group include an acetyl group, a propionyl group, a butyryl group, a valeryl group, an iso-valeryl group, a sec-valeryl group, a trimethylacetyl group, a hexanoyl group, a t-butylacetyl group, a heptanoyle group, octanoyl group, a 2-ethylhexanoyl group, a nonanoyl group, a decanoyl group, an undecanoyl group, a lauroyl group, a tridecanoyl group, a tetradecanoyl group, a pentadecanoyl group, a hexadecanoyl group, a heptadecanoyl group, an octadecanoyl group, an oleyl group, a cyclopentanecarbonyl group, a cyclohexanecarbonyl group, a 6-chlorohexanoyl group, a 6-bromohexanoyl group, a trifluoroacetyl group, a pentafluoropropionyl group, a perfluorooctanoyl group, a 2,2,4,4,5,5,7,7,7-nonafluoro-3,6-dioxaheptanoyl group, a methoxyacetyl group, a 3,6-dioxaheptanoyl group, and a cinnamoyl group.

Examples of the substituted or unsubstituted arylcarbonyl group include a benzoyl group, a 2-methylbenzoyl group, a 3-methylbenzoyl group, a 4-methylbenzoyl group, a 4-ethylbenzoyl group, a 4-n-propylbenzoyl group, a 4-tert-butylbenzoyl group, a 2,4-dimethylbenzoyl group, a 2,4,6-trimethylbenzoyl group, a 2,4,5-trimethylbenzoyl group, a 4-ethylbenzoyl group, a 4-isopropylbenzoyl group, a 4-n-butylbenzoyl group, a 4-isobutylbenzoyl group, a 4-sec-butylbenzoyl group, a 4-tert-butylbenzoyl group, a 4-n-pentylbenzoyl group, a 4-isopentylbenzoyl group, a 4-neopentylbenzoyl group, a 4-isohexylbenzoyl group, a 4-cyclohexylbenzoyl group, a 4-octylbenzoyl group, a 4-cyanobenzoyl group, a 4-nitrobenzoyl group, a 4-trifluoromethylbenzoyl group, a 3-bromobenzoyl group, a 2-fluorobenzoyl group, a 4-clorobenzoyl group, a 2,6-dichlorobenzoyl group, a 2,4-difluorobenzoyl group, a naphthylcarbonyl-1-yl group, and a naphthylcarbonyl-2-yl group.

Examples of the carboxylic acid ester group include a carboxylic acid methyl ester group, a carboxylic acid ethyl ester group, a carboxylic acid n-propyl ester group, a carboxylic acid isopropyl ester group, a carboxylic acid n-butyl ester group, a carboxylic acid tert-butyl ester group, a carboxylic acid n-pentyl ester group, a carboxylic acid isopentyl ester group, a carboxylic acid cyclohexyl ester group, a carboxylic acid n-octyl ester group, a carboxylic acid trifluoropropyl ester group, a carboxylic acid benzyl ester group, a carboxylic acid phenyl ester group, and a carboxylic acid tolyl ester group.

Examples of the sulfonic acid ester group include a sulfonic acid methyl ester group, a sulfonic acid ethyl ester group, a sulfonic acid n-propyl ester group, a sulfonic acid isopropyl ester group, a sulfonic acid n-butyl ester group, a sulfonic acid tert-butyl ester group, a sulfonic acid n-pentyl ester group, a sulfonic acid isopentyl ester group, a sulfonic acid cyclohexyl ester group, a sulfonic acid n-octyl ester group, a sulfonic acid trifluoropropyl ester group, a sulfonic acid benzyl ester group, a sulfonic acid phenyl ester group, and a sulfonic acid tolyl ester group.

Preferable ranges and specific examples of the substituent or unsubstituted alkyl group, substituted or unsubstituted alkenyl group, substituted or unsubstituted alkynyl group, substituted or unsubstituted aralkyl group, substituted or unsubstituted aryl group, substituted or unsubstituted alkylcarbonyl group, and substituted or unsubstituted arylcarbonyl group in $R_3$ and $R_4$ are the same as in the case of $R_1$ and $R_2$ described above.

Examples of the unsubstituted or substituted carbamoyl group in $R_3$ and $R_4$ include a carbamoyl group, a dimethylcarbamoyl group, a diethylcarbamoyl group, a dipropylcarbamoyl group, a diisopropylcarbamoyl group, a dibutylcarbamoyl group, a dioctylcarbamoyl group, a diphenylcarbamoyl group, a carbazole-9-carbamoyl group, and a 4-morpholinocarbamoyl group.

In a case in which $R_3$ and $R_4$ are bound to each other to form a ring, specific examples of the ring include a pyrrolidino group, a piperidino group, a 4-methylpiperidino group, a 4-isopropylpiperidino group, a pyrrolidino group, a 3-methylpyrrolidino group, and a morpholino group.

<Formula (2)>

In Formula (1), each of $R_1$ and $R_2$ may independently represent the structure represented by the following Formula (2).

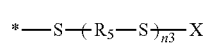

(2)

In Formula (2), $R_5$ represents a linear or branched alkylene group, arylene group, or a divalent group in which an alkylene group and an arylene group are bound, and the alkylene group, the arylene group, and the divalent group formed by binding an alkylene group and an arylene group may contain an oxygen atom.

In Formula (2), * represents a binding position, and n3 represents an integer from 0 to 3.

In Formula (2), X represents a structure represented by Formula (X1) or a structure represented by Formula (X2).

In the divalent group in which an alkylene group and an arylene group are bound, a plurality of alkylene groups and a plurality of arylene groups may be bound, or the alkylene group and the arylene group may be bound alternately.

Examples of the divalent group in which an alkylene group and an arylene group are bound include an alkylene arylene group, an alkylene arylene alkylene group, and an arylene alkylene arylene group.

$R_5$ in Formula (2) is preferably an alkylene group having from 1 to 16 carbon atoms, or a substituted or unsubstituted arylene group having from 6 to 24 carbon atoms. $R_5$ is more preferably an alkylene group having from 1 to 12 carbon atoms, an unsubstituted arylene group having from 6 to 18 carbon atoms, or an arylene group having an alkyl group, an alkenyl group, a halogen atom, a cyano group, or an acyl group as a substituent group and having from 6 to 18 carbon atoms.

Examples of the alkylene group include a methylene group, an ethylene group, a propane-1,3-diyl group, a propane-1,2-diyl group, a propane-1,1-diyl group, a propane-2,2-diyl group, a butane-1,4-diyl group, a butane-2,3-diyl group, a 1,1,2,2-tetramethylethane-1,2-diyl group, a butane-1,2-diyl group, a pentan-1,5-diyl group, a pentan-1,2-diyl group, a 2,4-diethylpentane-1,5-diyl group, a 3-methylpentane-1,5-diyl group, a sicyclopentane-1,3-diyl group, a hexane-1,6-diyl group, a hexane-1,4-diyl group, a hexane-2,4-diyl group, a cyclohexane-1,4-diyl group, a cyclohexane-1,3-diyl group, a cyclohexane-1,2-diyl Group, a 2,2,3,3,4,4,5,5-octafluorohexane-1,6-diyl group, a heptane-1,7-diyl group, an adamantan-1,3-diyl group, an octane-1,8-diyl group, a nonan-1,9-diyl group, a decane-1,10-diyl group, and a 1H,1H, 10H,10H-hexadecafluorodecane-1,10-diyl group. In particular, an alkylene group having from 1 to 12 carbon atoms is preferable, and an alkylene group having from 1 to 4 carbon atoms is more preferable.

Examples of the substituted or unsubstituted arylene group include a heteroarylene group.

As the substituted arylene group, an arylene group having an alkyl group, an alkenyl group, a halogen atom, a cyano group, or an acyl group is preferable, and an arylene group having an alkyl group is more preferable.

Examples of the substituted or unsubstituted arylene group include a benzene-1,4-diyl group, a benzene-1,3-diyl group, a benzene-1,2-diyl group, a 2-methylbenzene-1,4-diyl group, a 3-methylbenzene-1,4-diyl group, a 2,6-dimethylbenzene-1,4-diyl group, a 2,3,5,6-tetramethylbenzene-1,4-diyl group, a 2-allylbenzene-1,4-diyl group, a 2-isopropylbenzene-1,4-diyl group, a 2,3-dipropylbenzene-1,4-diyl group, a 2-t-butylbenzene-1,4-diyl group, a 3-t-butylbenzene-1,4-diyl group, a 2-t-butyl-5-methylbenzene-1,4-diyl group, a 2,5-di-t-butylbenzene-1,4-diyl group, a 2-cyclohexylbenzene-1,4-diyl group, a 3-cyclohexylbenzene-1,4-diyl group, a 2-phenylbenzene-1,4-diyl group, a 3-phenylbenzene-1,4-diyl group, a 2-methoxybenzene-1,4-diyl group, a 3-methoxybenzene-1,4-diyl group, a 2-chlorobenzene-1,4-diyl group, a 3-chlorobenzene-1,4-diyl group, a 2-fluorobenzene-1,4-diyl group, a 3-fluorobenzene- 1,4-diyl Group, a 2,3,5,6-Tetrafluorobenzene-1,4-diyl group, a 2,3-dicyanobenzene-1,4-diyl group, a 2-acylbenzene-1,4-diyl group, a naphthalene-1,5-diyl group, an anthraquinone-2,6-diyl group, and a benzonorbornene-3,6-diyl group. In particular, a benzene-1,4-diyl group, a benzene-1,3-diyl group, a benzene-1,2-diyl group, a 2-methylbenzene-1,4-diyl group, a 3-methylbenz ene-1,4-yl group, a 2,6-dimethylbenzene-1,4-diyl group, a 2-chlorobenzene-1,4-diyl group, a 3-chlorobenzene-1,4-diyl group, a 2-fluorobenzene-1,4-diyl group, a 3-fluorobenzene-1,4-diyl group, and a 2,3,5,6-tetrafluorobenzene-1,4-diyl group are preferable, a benzene-1,4-diyl group, a 2-methylbenzene-1,4-diyl group, a 3-methylbenzene-1,4-yl group, a 2-fluorobenzene-1,4-diyl group, or a 3-fluorobenzene-1,4-diyl group is more preferable.

<Formula (X1) and Formula (X2)>

In Formula (2), X may represent a structure represented by the following Formula (X1) or a structure represented by the following Formula (X2).

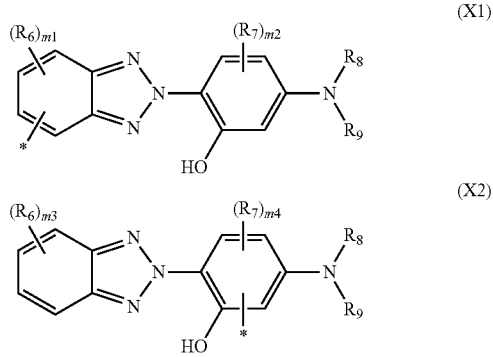

In Formula (X1) and Formula (X2), $R_6$ is the same as $R_1$ described above, and $R_7$ is the same as $R_2$ described above.

In a case in which a plurality of $R_6$ are present in Formula (X1) and Formula (X2), the plurality of $R_6$ may be the same or different, or may be bound together to form a ring.

In a case in which a plurality of $R_7$ are present in Formula (X1) and Formula (X2), the plurality of $R_7$ may be the same or different, or may be bound together to form a ring.

In Formula (X1) and Formula (X2), $R_8$ is the same as $R_3$ described above, and $R_9$ is the same as $R_4$ described above. In Formula (X1) and Formula (X2), * represents a binding position.

In Formula (X1), m1 and m2 represent integers from 0 to 3.

In Formula (X2), m3 represents an integer from 0 to 4, and m4 represents an integer from 0 to 2.

In Formula (X1), the binding position represented by * is preferably at least one of the 5-position or the 6-position of the benzotriazole ring in Formula (X1).

In Formula (X1) and (X2), preferable ranges and specific examples of the substituted or unsubstituted alkyl groups, substituted or unsubstituted alkenyl groups, substituted or unsubstituted alkynyl groups, substituted or unsubstituted aralkyl groups, substituted or unsubstituted aryl group, substituted or unsubstituted alkoxy group, substituted or unsubstituted aryloxy group, substituted or unsubstituted alkylthio group, substituted or unsubstituted arylthio group, substituted or unsubstituted amino group, substituted or unsubstituted alkylcarbonyl group, substituted or unsubstituted aryl-carbonyl group, carboxylic acid ester group, and sulfonic acid ester group in $R_6$ and $R_7$ are the same as in the case of $R_1$ and $R_2$ described above.

$R_8$ and $R_9$ in Formula (X1) and Formula (X2) are the same as $R_3$ and $R_4$ described above, and the preferable ranges are also the same.

The specific examples of the ring in a case in which $R_8$ and $R_9$ are bound to each other to form a ring are the same as the specific examples in a case in which $R_3$ and $R_4$ are bound to each other to form a ring.

Preferable ranges and specific examples of the substituent or unsubstituted alkyl group, substituted or unsubstituted alkenyl group, substituted or unsubstituted alkynyl group, substituted or unsubstituted aralkyl group, substituted or unsubstituted aryl group, substituted or unsubstituted alkylcarbonyl group, substituted or unsubstituted arylcarbonyl group, and substituted or unsubstituted carbamoyl group in $R_8$ and $R_9$ are the same as in the case of $R_3$ and $R_4$ described above.

The benzotriazole compound of the first embodiment preferably has a maximum absorption wavelength of from 330 nm to 430 nm.

This allows the transmittance of blue light to be reduced more favorably when a light is shielded by using the benzotriazole compound of the first embodiment.

From the same viewpoint as the above, the benzotriazole compound of the first embodiment more preferably has a maximum absorption wavelength of from 370 nm to 420 nm, and still more preferably has a maximum absorption wavelength of from 385 nm to 415 nm.

The maximum absorption wavelength of the benzotriazole compound of the first embodiment is measured using a spectrophotometer (for example, Shimadzu Spectrophotometer UV-1600 manufactured by Shimadzu Corporation) at an optical path length of 10 mm using a toluene solution having a concentration of 0.01 g/L.

Specific examples of the benzotriazole compound represented by Formula (1) are shown below, but the benzotriazole compound of the first embodiment is not limited to these ranges.

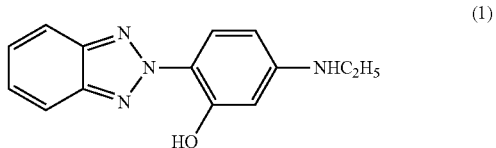

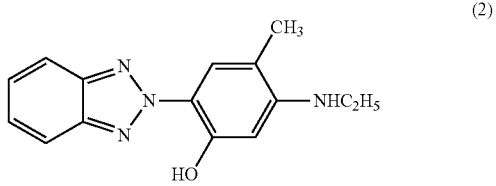

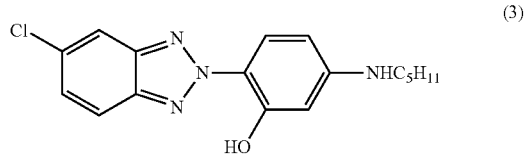

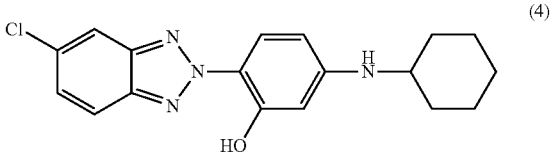

-continued
(5)
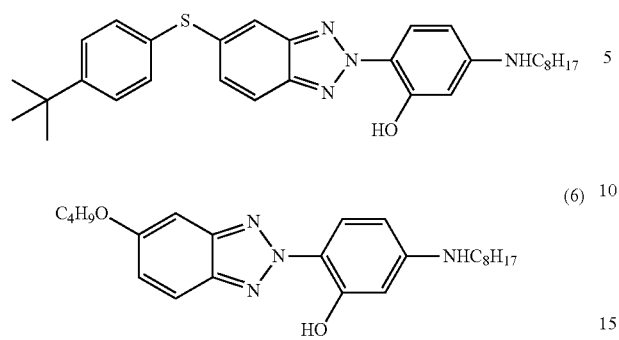
(6)
(7)
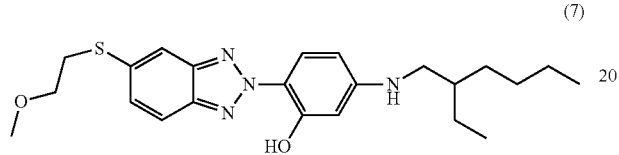
(8)
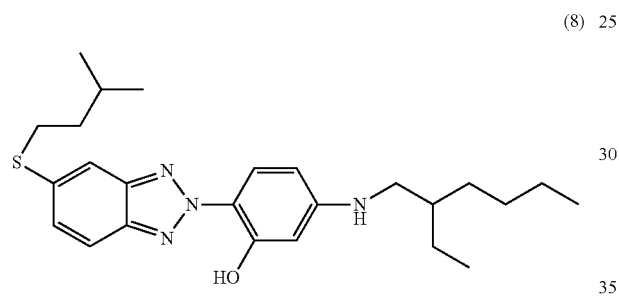
(9)
(10)
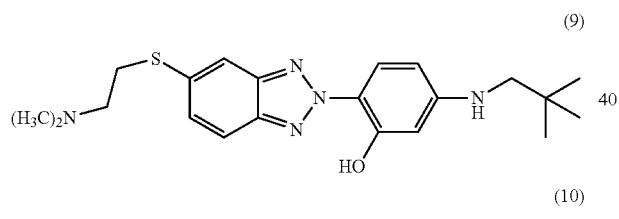
(11)
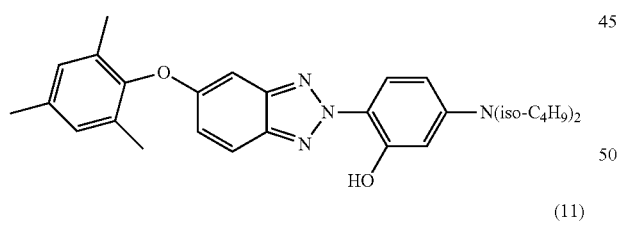
(12)
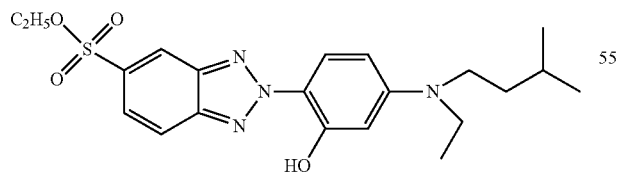
-continued
(13)
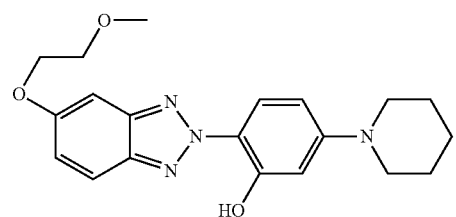
(14)
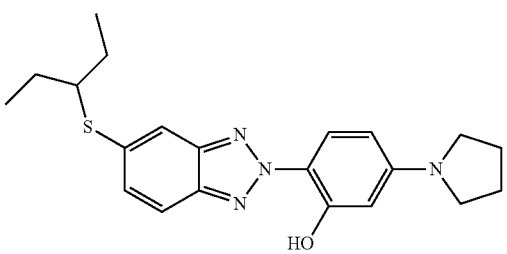
(15)
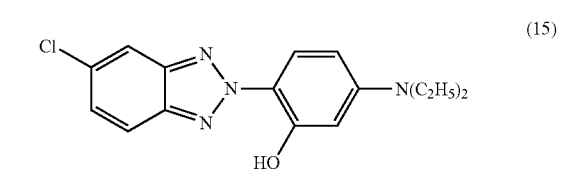
(16)
(17)
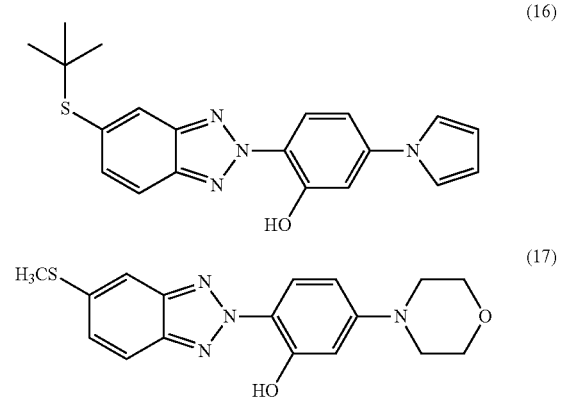
(18)
(19)
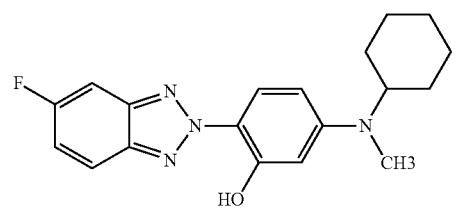

(20)
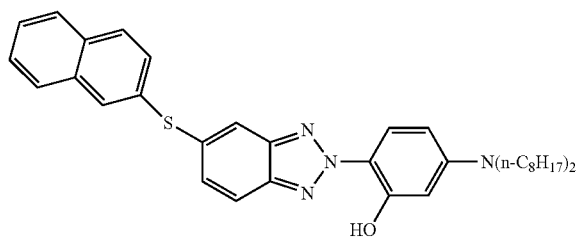
(21)
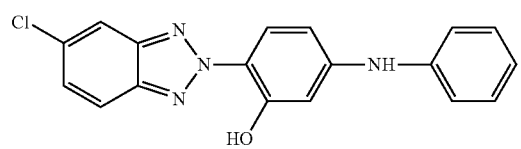
(22)
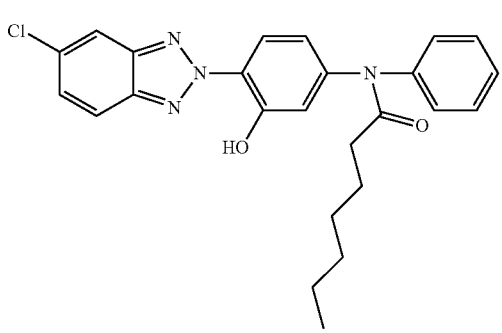
(23)
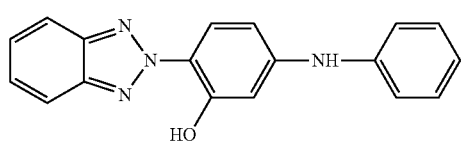
(24)
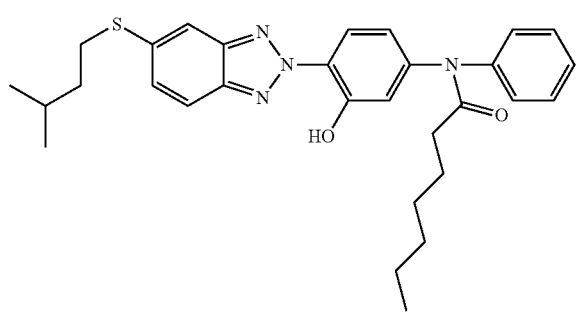
(25)
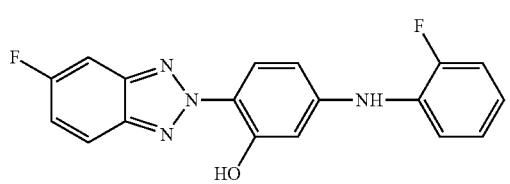
(26)
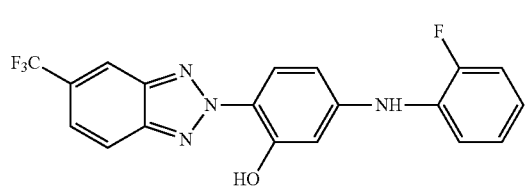
(27)
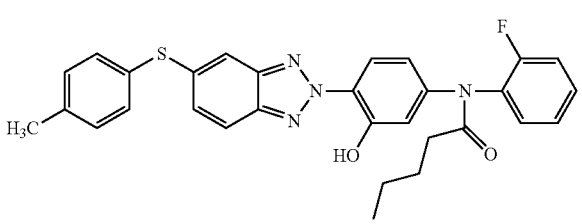
(28)
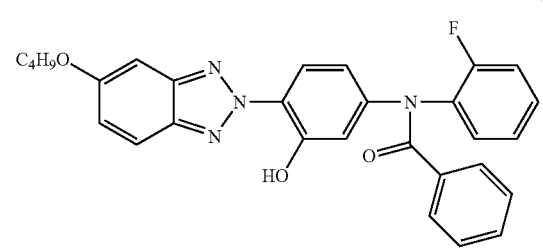
(29)
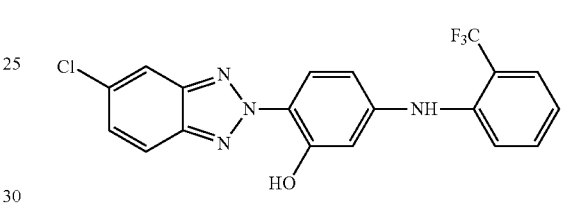
(30)
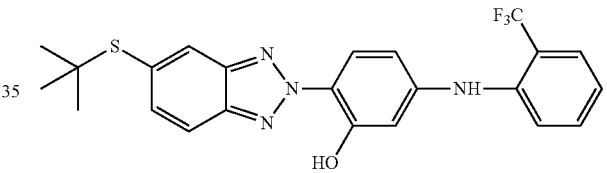
(31)
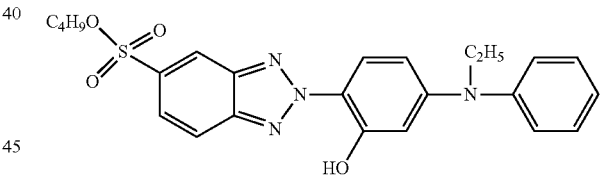
(32)
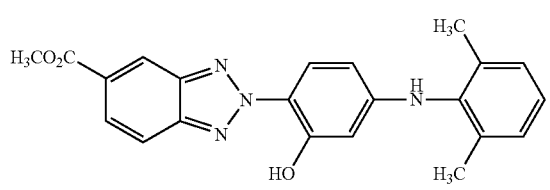
(33)
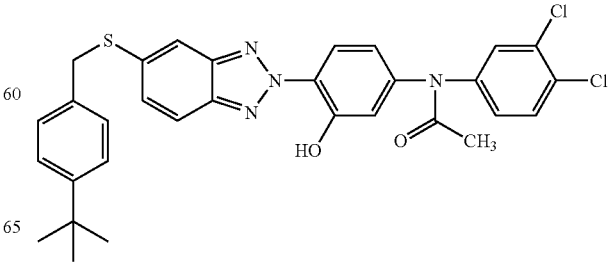

(34)
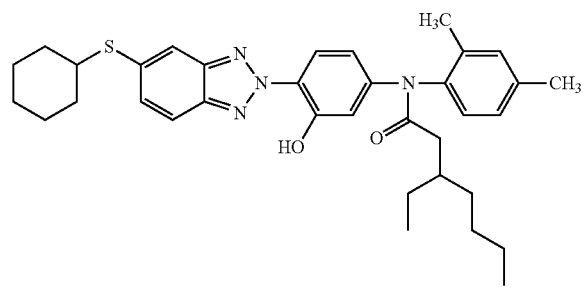
(35)
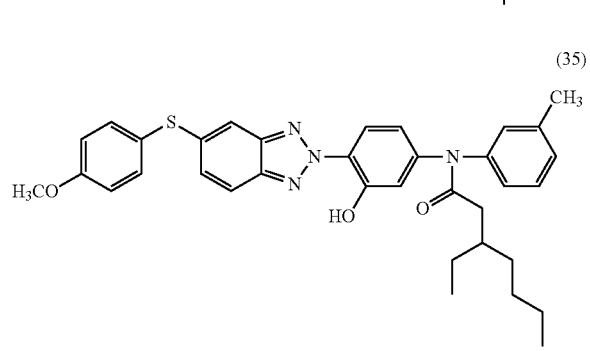
(36)
(37)
(38)
(39)
(40)
(41)
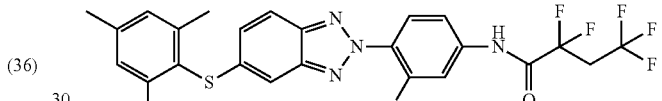
(42)
(43)
(44)
(45)
(46)
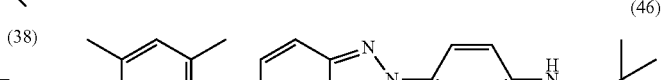
(47)
(48)

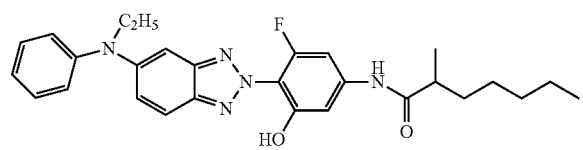 (49)
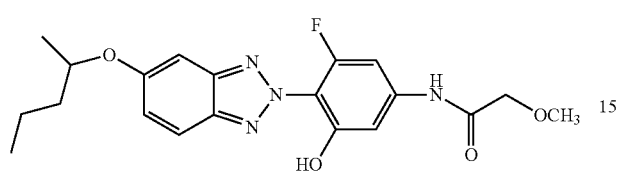 (50)
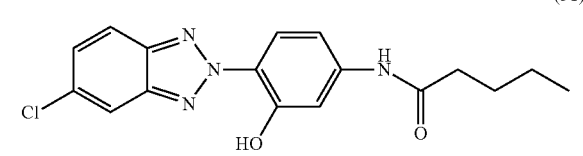 (51)
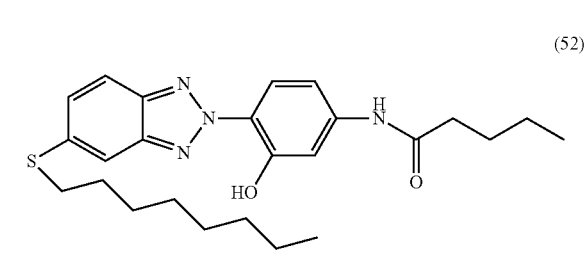 (52)
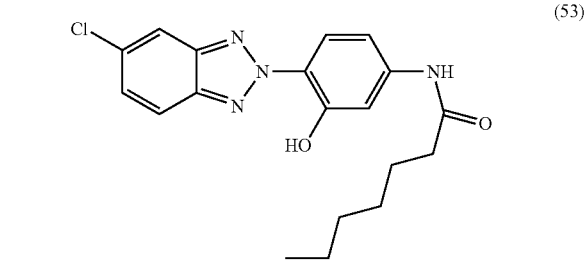 (53)
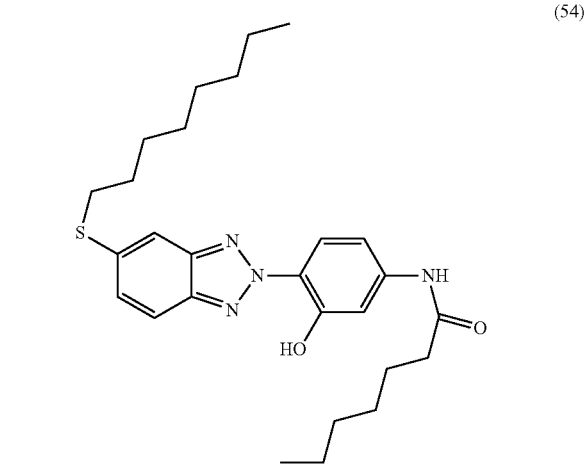 (54)
(55)
(56)
(57)
(58)
(59)
(60)

-continued
(61)
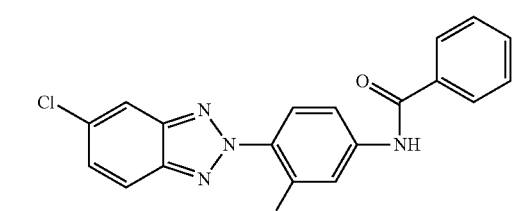
(62)
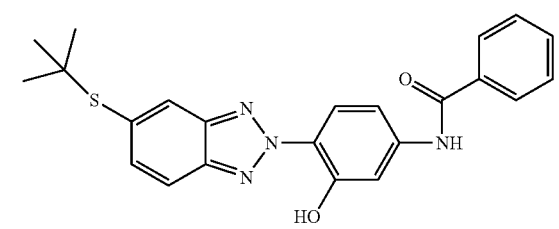
(63)
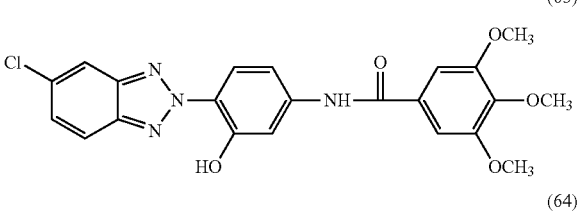
(64)
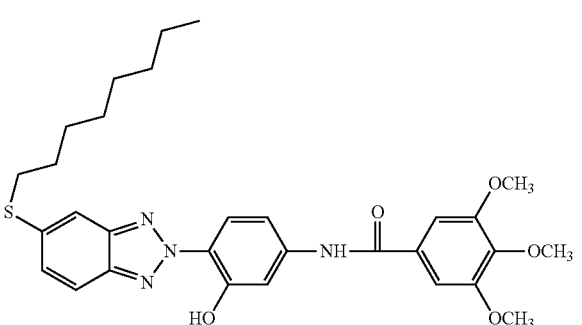
(65)
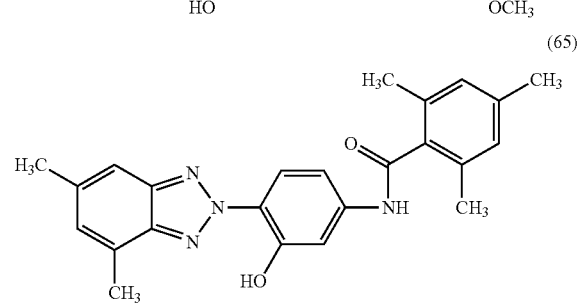
(66)
-continued
(67)
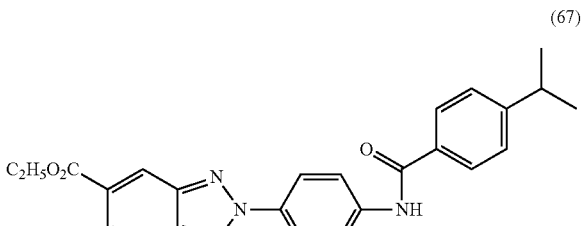
(68)
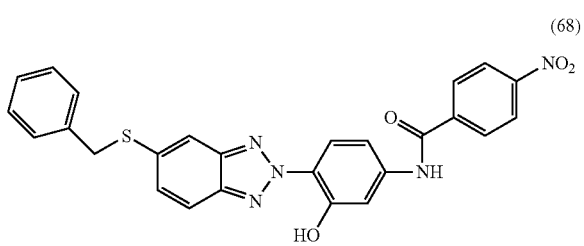
(69)
(70)
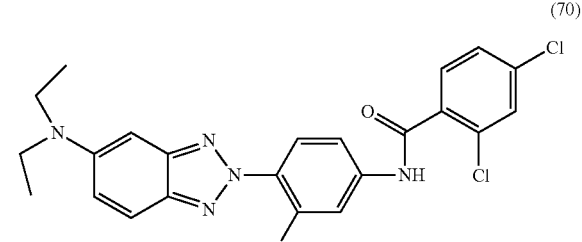
(71)

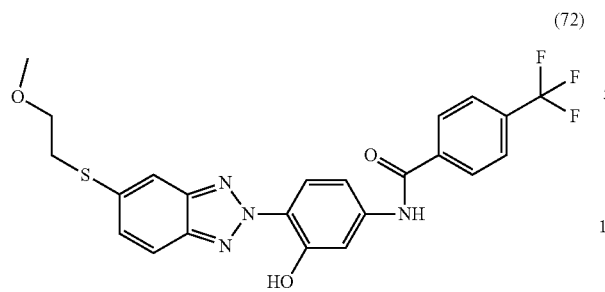
(72)
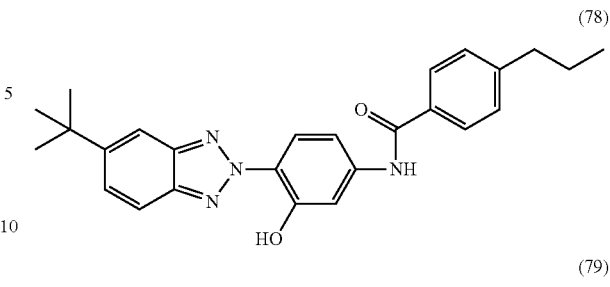
(78)
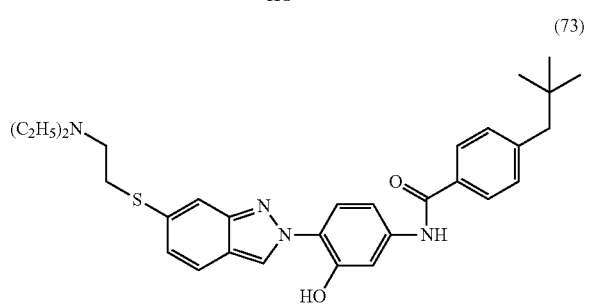
(73)
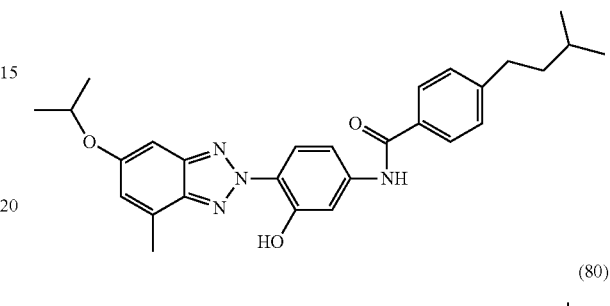
(79)
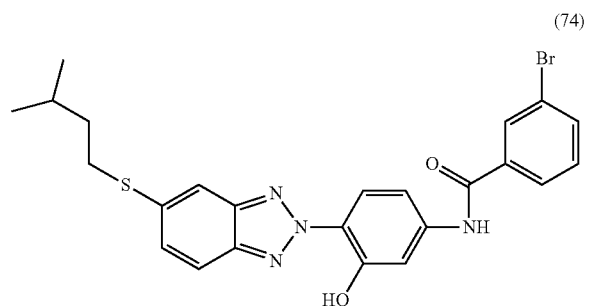
(74)
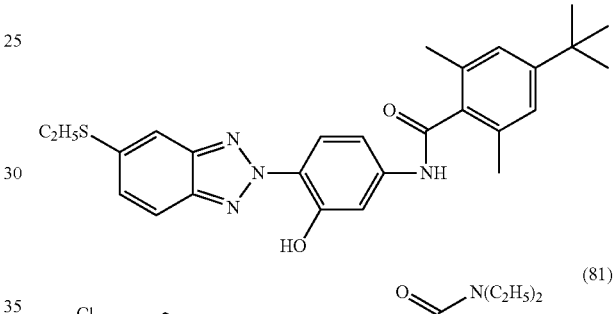
(80)
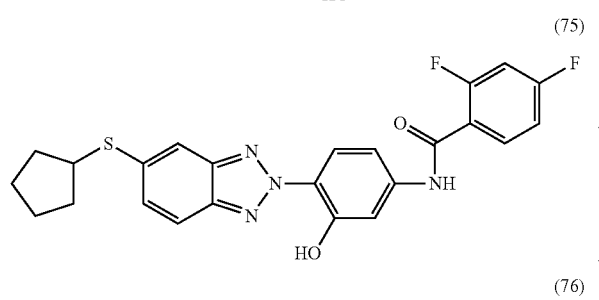
(75)
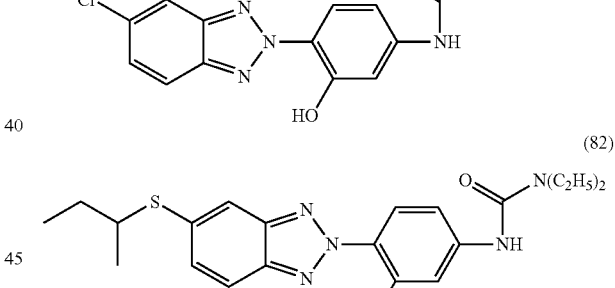
(81)
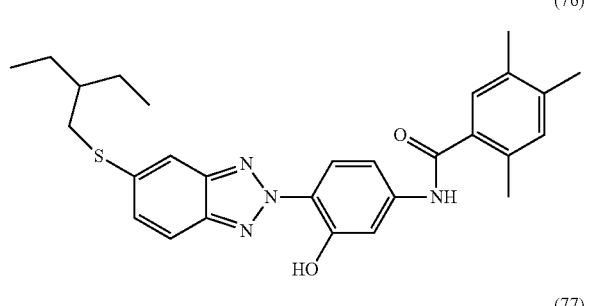
(76)
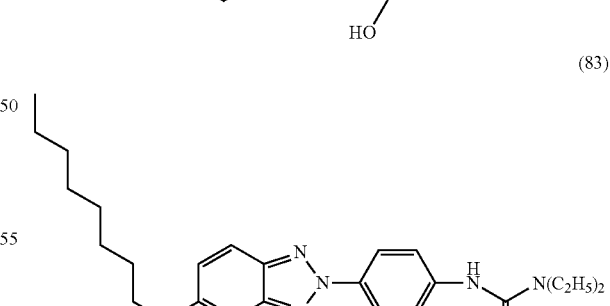
(82)
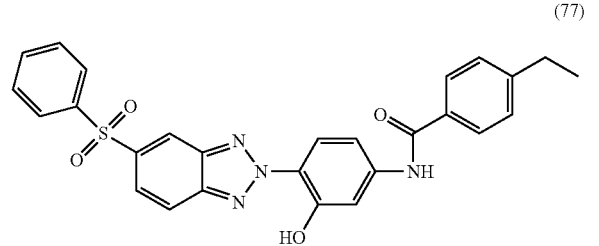
(77)
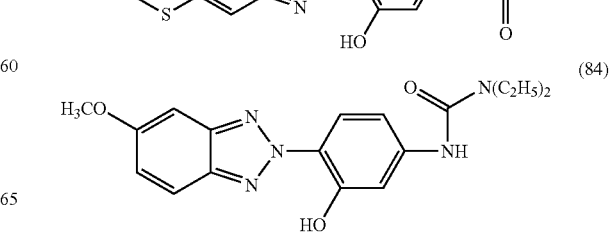
(83)
(84)

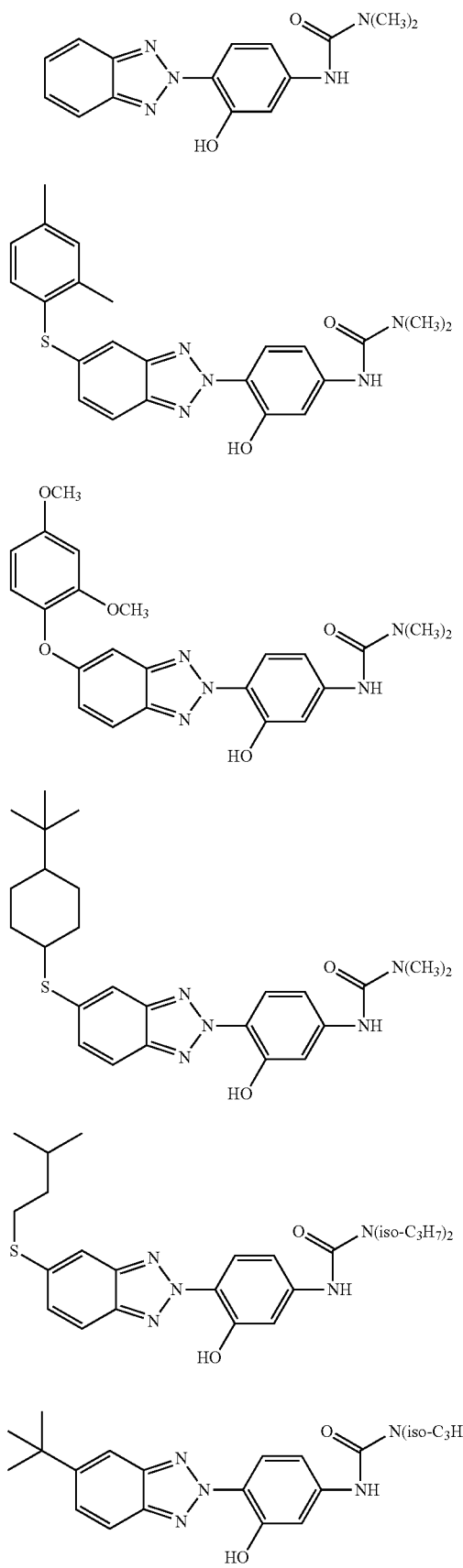
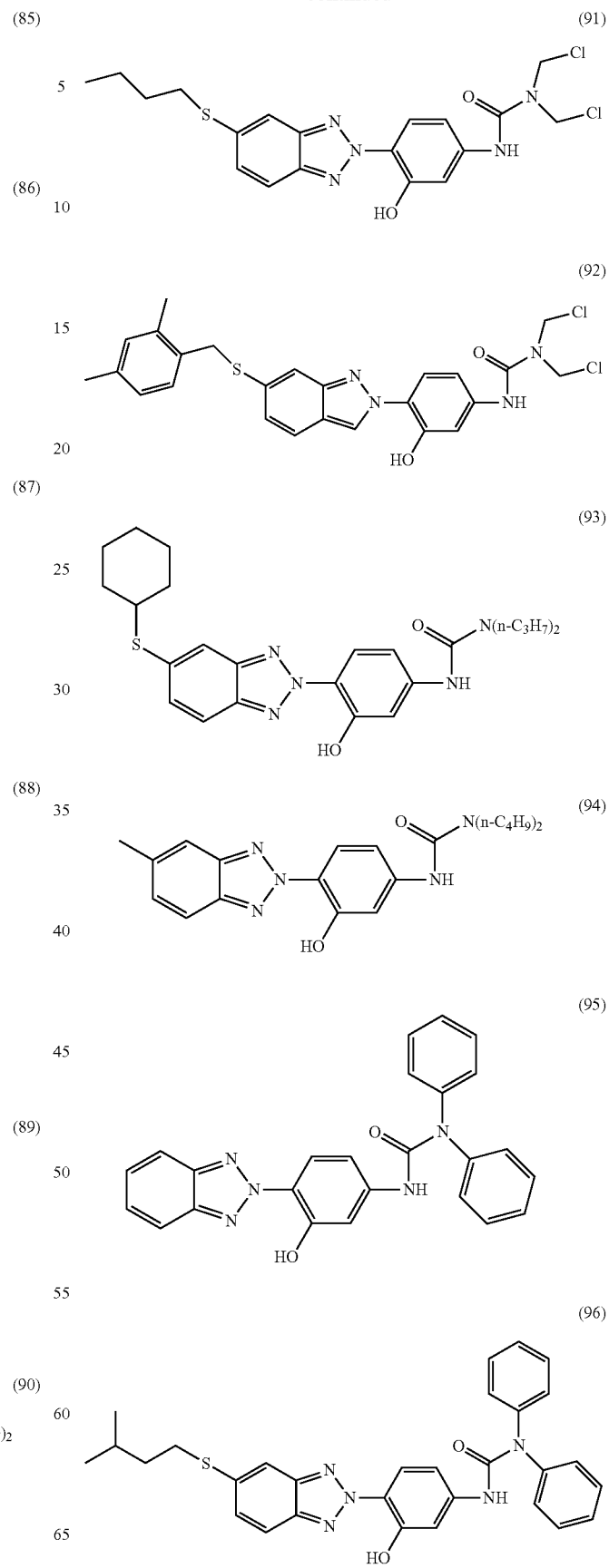

(97)
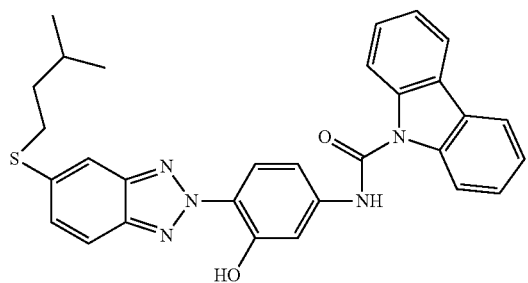
(98)
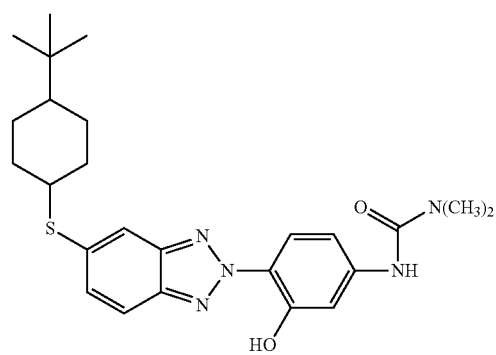
(99)
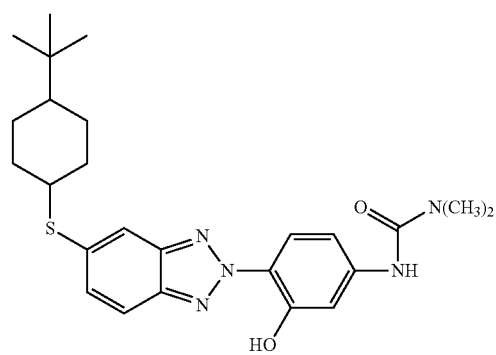
(100)
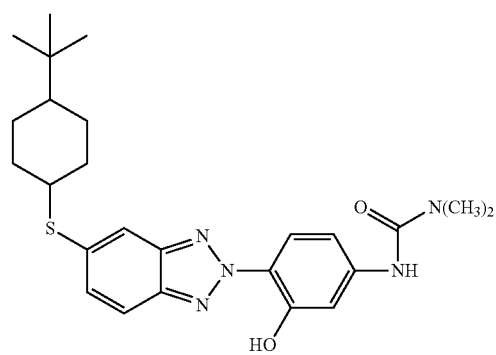
(101)
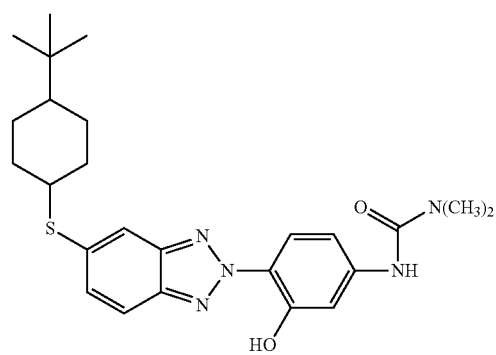
(102)
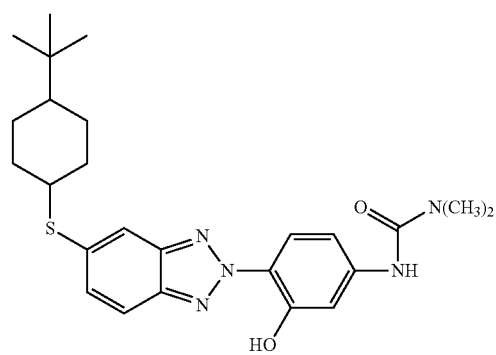
(103)
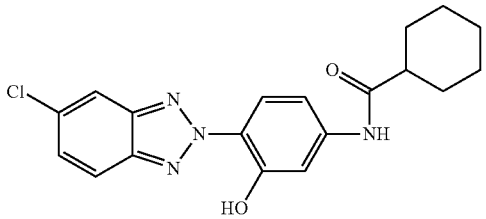
(104)
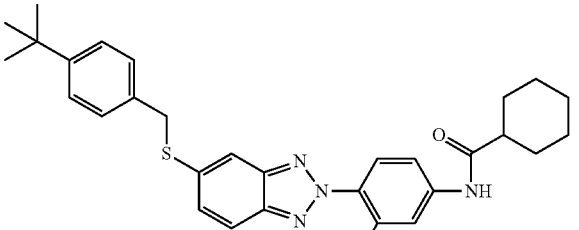
(105)
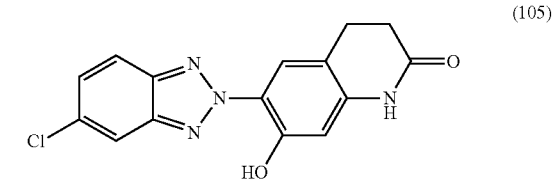
(106)
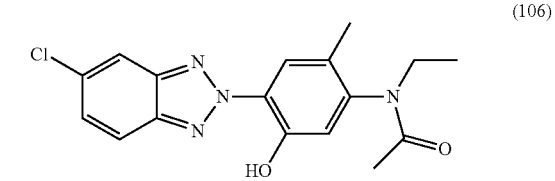
(107)
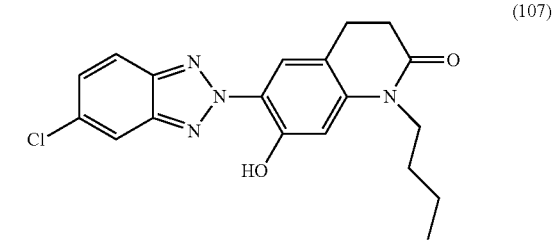
(108)
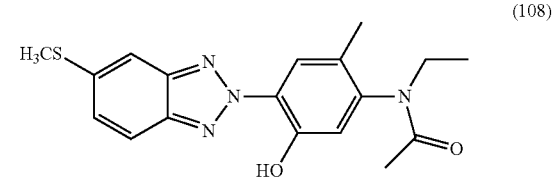
(109)
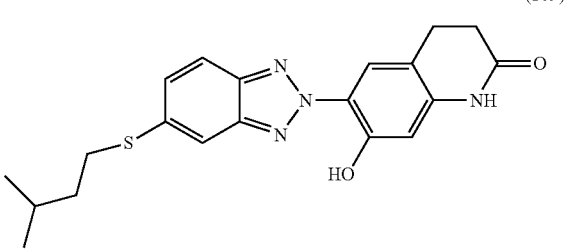

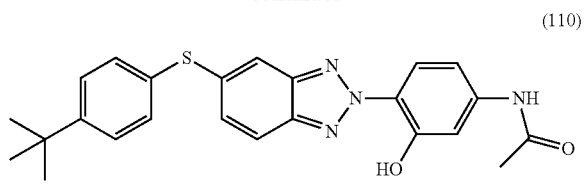
(110)

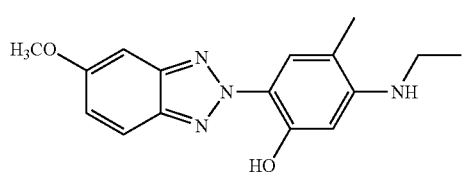
(111)

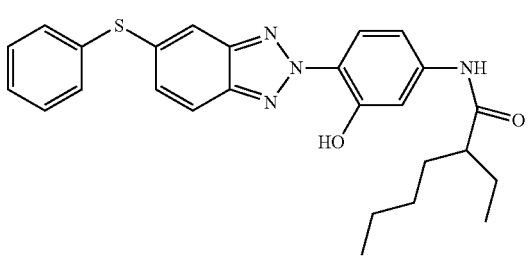
(112)

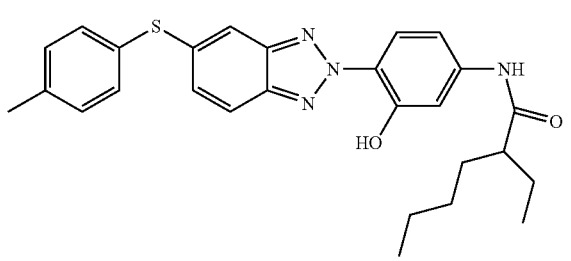
(113)

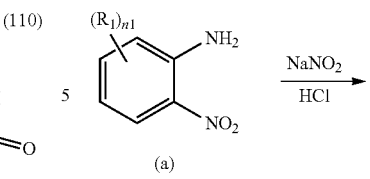

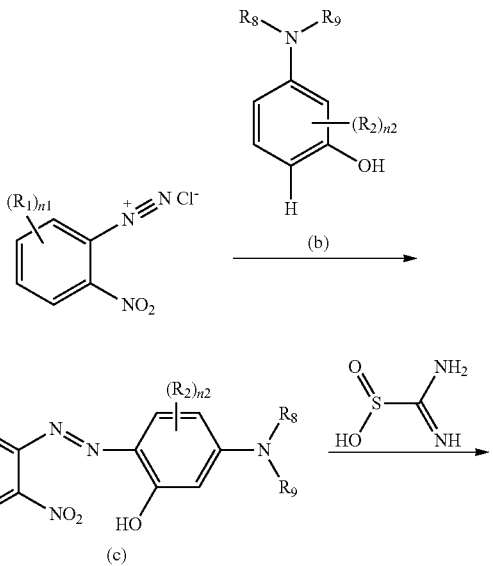

The benzotriazole compound represented by Formula (1) of the first embodiment may be produced by a known method.

For example, the benzotriazole compound can be manufactured by the method described in Japanese Patent Application Laid-Open (JP-A) No. S61-218577, Japanese Patent Publication (JP-B) No. 5588676, and the like.

As an example, as shown below, an aniline derivative of the following Formula (a) is diazotized and reacted with a 3-aminophenol derivative of the following Formula (b) to obtain an azo dye of the following Formula (c). Next, the azo dye of the following Formula (c) is reduced with thiourea dioxide, whereby the benzotriazole compound of Formula (1) is produced.

A benzotriazole compound of the following Formula (f) can be produced by reacting a benzotriazole compound of the following Formula (d) with an acid halide of the following Formula (e).

A benzotriazole compound of the following Formula (i) can be produced by reacting a benzotriazole compound of the following Formula (g) with a mercaptan of the following Formula (h).

-continued

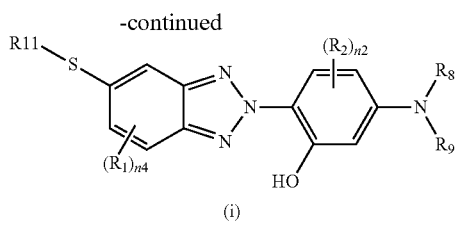

(i)

In Formula (a) to Formula (c), Formula (d), Formula (f), Formula (g), and Formula (i), $R_1$ and n1 are the same as $R_1$ and n1 in Formula (1).

In Formula (b) to Formula (d), Formula (f), Formula (g), and Formula (i), $R_2$ and n2 are the same as $R_2$ and n2 in Formula (1).

In Formula (g) and Formula (i), n4 represents an integer from 0 to 3.

In Formula (g), X represents a halogen atom, $R_{10}$ in Formula (e) and $R_{11}$ in Formula (h) and Formula (i) represent —$(R_5—S)_{n3}$—X.

<Light Absorber>

The light absorber of the first embodiment contains the benzotriazole compound of the first embodiment.

That is, the benzotriazole compound of the first embodiment can be used as a light absorber.

The light absorber of the first embodiment can favorably reduce the transmittance of blue light at a relatively small amount by containing the benzotriazole compound of the first embodiment.

<Resin Composition>

The resin composition of the first embodiment contains (A) a thermoplastic resin or a thermosetting resin, and (B) a benzotriazole compound of the first embodiment.

This allows the resin composition of the first embodiment to obtain a light (ultraviolet light, blue light, etc.) absorbing action.

The resin composition of the first embodiment can keep the content of the benzotriazole compound to be a relatively small amount from the viewpoint of favorably reducing the transmittance of blue light.

When the amount of the light absorber is large, the resin composition tends to be easily colored. Because the content of the benzotriazole compound as the light absorber contained in the resin composition can be kept to be relatively small, coloring of the resin composition can be suppressed.

In the resin composition of the first embodiment, the transmittance of blue light can be favorably reduced while the content of the benzotriazole compound is kept to be a small amount.

In a case in which a large amount of the light absorber is contained, it is considered that the resin composition is easily colored. Because the content of the benzotriazole compound as the light absorber is relatively small, coloring of the resin composition can be suppressed.

In the resin composition of the first embodiment, it is preferable that the content of the benzotriazole compound is from 500 ppm to 9000 ppm with respect to the total mass of the resin composition.

The resin composition of the first embodiment can favorably reduce the transmittance of blue light by having a content of the benzotriazole compound of 500 ppm or more with respect to the total mass of the resin composition.

From the same viewpoint as the above, the content of the benzotriazole compound is more preferably 1000 ppm or more, and still more preferably 1500 ppm or more.

The resin composition of the first embodiment can suppress coloring of the resin composition by having a content of the benzotriazole compound of 9000 ppm or less with respect to the total mass of the resin composition.

From the same viewpoint as the above, the content of the benzotriazole compound is more preferably 7000 ppm or less, still more preferably 5000 ppm or less, and particularly preferably 3000 ppm or less.

In the first embodiment, ppm refers to mass-based ppm.

In the resin composition of the first embodiment, it is preferable that a* is from −9 to 1, and b* is from −1 to 19 in a CIE 1976 (L*, a*, b*) color space in a case in which the resin composition is measured at a thickness of 2 mm.

This allows the color of the optical material to be kept favorable. That is, the optical material of the first embodiment can be suitably used for light-shielding eyeglasses such as sunglasses.

From the viewpoint of maintaining favorable hue of the optical material, it is more preferable that a* is from −8 to −2 as the hue in the CIE 1976 (L*, a*, b*) color space.

From the same viewpoint, the hue in the CIE 1976 (L*, a*, b*) color space is more preferably from 2 to 14, and still more preferably from 3 to 13.5.

In the first embodiment, the hue in the CIE 1976 (L*, a*, b*) color space is measured using a spectrophotometer (for example, CM-5 manufactured by Konica Minolta, Inc.) at a flat plate lens having a thickness of 2 mm.

(Thermoplastic Resin or Thermosetting Resin)

The thermoplastic resin or thermosetting resin of (A) will be described below.

The thermoplastic resin or thermosetting resin used in the resin composition of the first embodiment is preferably a resin having transparency.

Examples of the thermoplastic resin include a polycarbonate resin, a polyamide resin, a polyester resin, an acrylic resin, a polyurethane resin, a polystyrene resin, an acrylonitrile-styrene resin, a norbornene resin, and a cellulose-based resin.

Among them, from the viewpoint of the strength of the molded body obtained by molding the resin composition, it is preferable that the thermoplastic resin is at least one selected from a polycarbonate resin, a polyamide resin, an acrylic resin, or a polyester resin.

The thermosetting resin is preferably at least one selected from a polyurethane resin, a polythiourethane resin, or an allyldiglycol carbonate resin from the viewpoint of the refractive index of the molded body obtained by molding the resin composition.

In the resin composition of the first embodiment, it is preferable that the thermoplastic resin is at least one selected from a polycarbonate resin, a polyamide resin, an acrylic resin, or a polyester resin, and the thermosetting resin is at least one selected from a polyurethane resin, a polythiourethane resin, or an allyldiglycol carbonate resin from the viewpoint of the strength or the refractive index of the molded body obtained by molding the resin composition.

From the same viewpoint as the above, the resin composition of the first embodiment is more preferably a polycarbonate resin as the thermoplastic resin or a polythiourethane resin as the thermosetting resin.

The polycarbonate resin is a polymer obtained mainly by a phosgene method in which a dihydroxydiaryl compound is reacted with phosgene, or an ester exchange method in which a dihydroxydiaryl compound is reacted with a carbonic acid ester such as diphenyl carbonate.

The polycarbonate resin may be a polycarbonate resin produced from 2,2-bis(4-hydroxyphenyl)propane (also called bisphenol A), a polycarbonate resin produced from 1,1-bis(4-hydroxyphenyl)cyclohexane, a polycarbonate resin produced from 1,1-bis(4-hydroxyphenyl)-3,3,5-trimethylcyclohexane, a polycarbonate resin produced from 9,9-bis(4-hydroxyphenyl)fluorene, a polycarbonate resin produced from 9,9-bis[4-(2-hydroxyethyloxy)phenyl]fluorene, a copolymerized polycarbonate resin produced from a mixture of the above dihydroxy compounds, or a mixture of the above polycarbonate resins.

Examples of the dihydroxydiaryl compound include, in addition to bisphenol A, a (hydroxyaryl)alkane such as bis(4-hydroxyphenyl)methane, 1,1-bis(4-hydroxyphenyl) ethane, 2,2-bis(4-hydroxyphenyl)butane, 2,2-bis(4-hydroxyphenyl)octane, 2,2-bis(4-hydroxyphenyl)phenylmethane, 2,2-bis(4-hydroxy-3-methylphenyl)propane, 2,2-bis(4-hydroxy-3-tertbutylphenyl)propane, 1,1-bis(4-hydroxy-3-tertbutylphenyl)propane, 2,2-bis(4-hydroxy-3-bromophenyl)propane, 2,2-bis(4-hydroxy-3,5-dibromophenyl)propane, or 2,2-bis(4-hydroxy-3,5-dichlorophenyl)propane, a (hydroxyaryl)cycloalkane such as 1,1-bis(4-hydroxyphenyl)cyclopentane or 1,1-bis(4-hydroxyphenyl)cyclohexane, a dihydroxydiaryl ether such as 4,4'-dihydroxydiphenyl ether or 4,4'-dihydroxy-3,3'-dimethyldiphenyl ether, a dihydroxydiaryl sulfide such as 4,4'-dihydroxydiphenylsulfide, a dihydroxydiarylsulfoxide such as 4,4'-dihydroxydiphenylsulfoxide or 4,4'-dihydroxy-3,3'-dimethyldiphenylsulfoxide, a dihydroxydiaryl sulfone such as 4,4'-dihydroxydiphenyl sulfone or 4,4'-dihydroxy-3,3'-dimethyldiphenyl sulfone.

These may be used singly or selected from two or more kinds thereof.

The dihydroxydiaryl compound may be used in combination with piperazine, dipiperidyl hydroquinone, resorcin, 4,4'-dihydroxydiphenyl, or the like.

The viscosity average molecular weight of the polycarbonate resin is usually from 10000 to 100000, preferably from 10000 to 400000.

The dihydroxydiaryl compound may be used in combination with a phenol compound of trivalence or more as shown below. Examples of the phenol of trivalence or more include phloroglucin, 1,3,5-tri-(4-hydroxyphenyl)-benzol, and 1,1,1-tri-(4-hydroxyphenyl)-ethane.

The polyamide resin is a resin having a structure of a dehydrated polycondensation product of a diamine compound containing an aromatic or aliphatic group and a dicarboxylic acid compound containing an aromatic or aliphatic group. Here, the aliphatic group also includes an alicyclic aliphatic group. The resin having a structure of a dehydrated polycondensation product of the diamine compound and the dicarboxylic acid compound is not necessarily limited to the one obtained from the dehydration polycondensation reaction, and the resin can be obtained from ring-opened polymerization of one or more kinds of lactam compound or the like.

Examples of the diamine compound include hexamethylenediamine, m-xylylenediamine, bis(4-aminocyclohexyl) methane, bis(4-amino-3-methyl cyclohexyl)methane, trimethylhexamethylenediamine, bis(aminomethyl)norbornan, and bis(aminomethyl)tetrahydrodicyclopentadiene, and one or two or more kinds of these diamine compounds may be selected and used.

Examples of the dicarboxylic acid compound include adipic acid, dodecanedicarboxylic acid, isophthalic acid, terephthalic acid, bis(hydroxycarbonylmethyl)norbornane, and bis(hydroxycarbonylmethyl)tetrahydrodicyclopentadiene, and one or two or more kinds of these dicarboxylic acid compounds may be selected and used.

An amorphous polyamide resin is particularly preferable from the viewpoint of transparency, and is typically called transparent nylon. Examples thereof include Grilamide TR-55, Grilamide TR-90, and Grilamide TR-XE3805 of EMS-CHEMIE AG, and TROGAMID CX-7323 of Hills AG.

The acrylic resin is a polymer mainly formed from alkyl methacrylate, and may be a homopolymer of alkyl methacrylate, a copolymer using two or more kinds of alkyl methacrylate, or a copolymer of 50% by mass or more of alkyl methacrylate and 50% by mass or less of a monomer other than alkyl methacrylate. As the alkyl methacrylate, an alkyl methacrylate in which an alkyl group has from 1 to 4 carbon atoms is usually used, and methyl methacrylate is preferably used.

The monomer other than alkyl methacrylate may be a monofunctional monomer having one polymerizable carbon-carbon double bond in the molecule, or a polyfunctional monomer having two or more polymerizable carbon-carbon double bond in the molecule. In particular, the monofunctional monomer is preferably used. Examples thereof include an alkyl acrylate such as methyl acrylate or ethyl acrylate, a styrene-based monomer such as styrene or alkylstyrene, and an unsaturated nitrile such as acrylonitrile or methacrylonitrile.

The acrylic resin is preferably a polymer in which the monomer is substantially composed only of alkyl methacrylate, or a copolymer of alkyl methacrylate occupying, for example 70% by mass or more, preferably 90% by mass or more of the monomer composition and substantially only a monomer selected from an alkyl acrylate, a styrene-based monomer, or an unsaturated nitrile. In particular, a polymer in which the monomer is substantially composed only of alkyl methacrylate is most preferable, and a polymethyl methacrylate resin (PMMA) is typically exemplified. Many commercially available polymethylmethacrylate resins such as MX150 manufactured by Soken Chemical & Engineering Co., Ltd., EPOSTAR MA manufactured by NIPPON SHOKUBAI CO., LTD, and MBX series manufactured by Sekisui Kasei Co., Ltd. are available.

Among acrylic resins, poly(meth)acrylic acid ester-based resins having a low glass transition temperature, for example, a glass transition temperature of less than 0° C., preferably −20° C. or less, are used as pressure-sensitive adhesives, adhesives, and the like. For example, they are widely used for attaching each layer of an optical filter for a thin display, or for adhering an optical filter and a display screen.

The resin composition of the first embodiment may be a resin composition containing the quinophthalone-based compound and the tetraazaporphyrin-based compound as the organic dye in the pressure-sensitive adhesive of the poly(meth)acrylic acid ester-based resin.

As the poly(meth)acrylic acid ester-based resin used as the pressure-sensitive adhesive, those obtained by using 50% by mass or more of a (meth)acrylic acid ester having an alkyl group having from 1 to 14 carbon atoms as a monomer are preferable.

Examples of the (meth)acrylic acid ester having an alkyl group having from 1 to 14 carbon atoms include methyl (meth)acrylate, ethyl(meth)acrylate, n-butyl(meth)acrylate, 2-ethylhexyl(meth)acrylate, n-octyl(meth)acrylate, i-octyl (meth)acrylate, benzyl(meth)acrylate, dicyclopentenyl (meth)acrylate, phenoxyethyl(meth)acrylate, and phenoxydiethylene glycol(meth)acrylate.

Other examples of the copolymerizable monomer include a (meta)acrylate such as hydroxyethyl(meth)acrylate, hydroxypropyl(meth)acrylate, methoxyethyl(meth)acrylate, ethoxyethyl(meth)acrylate, or ethoxyethoxyethyl(meth) acrylate; a styrene-based monomer represented by α-methylstyrene, vinyltoluene, styrene, or the like; a vinyl ether-based monomer represented by methylvinyl ether, ethylvinyl ether, isobutylvinyl ether, or the like; fumaric acid, monoalkyl ester of fumaric acid, dialkyl ester of fumaric acid; maleic acid, monoalkyl ester of maleic acid, dialkyl ester of maleic acid, itaconic acid, monoalkyl ester of itaconic acid, dialkyl ester of itaconic acid, (meth)acrylonitrile, vinyl chloride, vinylidene chloride, vinyl acetate, vinyl ketone, vinyl pyridine, and vinyl carbazole.

Typical examples of polyester resin include a homopolyester such as poly $C_{2-4}$ alkylene terephthalate or poly $C_{2-4}$ alkylene naphthalate, and a copolyester contains a $C_{2-4}$ alkylene allylate unit ($C_{2-4}$ alkylene terephthalate and/or $C_{2-4}$ alkylene naphthalate unit) as a main component. The examples also include a polyarylate resin, an aliphatic polyester using an aliphatic dicarboxylic acid such as adipic acid, and a lactone alone such as ε-caprolactone or a copolymer thereof.

Examples of the copolyester include a copolyester in which, among the constituent units of the poly $C_{2-4}$ alkylene allylate, a part of $C_{2-4}$ alkylene glycol is substituted by a polyoxy $C_{2-4}$ alkylene glycol, a $C_{6-10}$ alkylene glycol, an alicyclic diol (cyclohexanedimethanol, hydrogenated bisphenol A, etc.), a diol having an aromatic ring (9,9-bis(4-(2-hydroxyethoxy)phenyl)fluorene having a fluorenone side chain, bisphenol A, bisphenol A-alkylene oxide adduct, etc.), or the like, and a copolyester in which a part of aromatic dicarboxylic acid is substituted by an asymmetric aromatic dicarboxylic acid such as phthalic acid or isophthalic acid, an aliphatic $C_{6-12}$ dicarboxylic acid such as adipic acid, or the like.

As the polyester resin, polyethylene terephthalate (PET), polytrimethylene terephthalate (PTT), polybutylene terephthalate (PBT), polyethylene naphthalate (PEN), and the like are preferable in terms of high transparency and the like. An amorphous copolyester such as $C_{2-4}$ alkylene allylate copolyester is also preferable because of its excellent workability. PET is particularly preferable because it is mass-produced and has excellent heat resistance, strength, and the like.

Examples of the polyurethane resin include a resin including a block-type polyisocyanate and a polyol as main components. Examples of the block-type polyisocyanate include an adduct of hexamethylene diisocyanate, xylylene diisocyanate, tetramethylxylylene diisocyanate, 4,4'-dicyclohexylmethane diisocyanate, isophorone diisocyanate, or hydrogenated xylylene diisocyanate in which the molecules are bound by their number, and a product in which isocyanurate or allophanate is blocked with acetoacetic acid or malonic acid. Examples of the polyol include a polyester having a hydroxyl group, a polyether, a polycarbonate, a polyacrylate, and a polycaptolactone.

The polythiourethane resin contains a structural unit derived from a polyisocyanate compound and a structural unit derived from a polythiol compound. The polythiourethane resin may contain a structural unit derived from a polyol compound in addition to a structural unit derived from a polyisocyanate compound and a structural unit derived from a polythiol compound.

Examples of the polymerizable compound for obtaining the polythiourethane resin include a polyisocyanate compound, a polythiol compound, and a polyol compound.

Examples of the polyisocyanate compound include an aliphatic isocyanate compound, an alicyclic isocyanate compound, an aromatic isocyanate compound, a heterocyclic isocyanate compound, and an aromatic aliphatic isocyanate compound, and one kind or a mixture of two or more kinds thereof is used. These isocyanate compounds may include dimers, trimers, and prepolymers. Examples of these isocyanate compounds include the compounds exemplified in WO2011/055540.

In the first embodiment, from the viewpoint of the effect in the present disclosure, the polyisocyanate compound is preferably at least one selected from 2,5-bis(isocyanatomethyl)bicyclo-[2.2.1]-heptane, 2,6-bis(isocyanatomethyl)bicyclo-[2.2.1]-heptane, m-xylylene diisocyanate, 2,4-tolylene diisocyanate, 2,6-tolylene diisocyanate, dicyclohexylmethane diisocyanate, 1,3-bis(isocyanatomethyl)cyclohexane, 1,4-bis(isocyanatomethyl)cyclohexane, isophorone diisocyanate, 1,6-hexamethylene diisocyanate, or 1,5-pentamethylene diisocyanate, more preferably at least one selected from 2,5-bis(isocyanatomethyl)bicyclo-[2.2.1]-heptane, 2,6-bis(isocyanatomethyl)bicyclo-[2.2.1]-heptane, m-xylylene diisocyanate, or 1,3-bis(isocyanatomethyl)cyclohexane.

The polythiol compound is a compound having two or more mercapto groups, and examples thereof include a compound exemplified in WO2016/125736.

In the first embodiment, the polythiol compound is preferably at least one selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithianeundecane, 4,8-dimercaptomethyl-1,11-dimercapto-3,6,9-trithianeundecane, pentaerythritol tetrakis(3-mercaptopropionate), bis(mercaptoethyl)sulfide, pentaerythritol tetrakis(2-mercaptoacetate), 2,5-bis(mercaptomethyl)-1,4-dithiane, 1,1,3,3-tetrakis(mercaptomethylthio)propane, 4,6-bis(mercaptomethylthio)-1,3-dithiane, or 2-(2,2-bis(mercaptomethylthio)ethyl)-1,3-dithietane, more preferably at least one selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), or pentaerythritol tetrakis(2-mercaptoacetate).

The polyol compound is one or more aliphatic or alicyclic alcohols, specific examples thereof include a linear or branched aliphatic alcohol, an alicyclic alcohol, or an alcohol in which these alcohols and ethylene oxide, propylene oxide, and ε-caprolactone are added.

Specifically, a compound exemplified in WO2016/125736 may be used.

The polyol compound is preferably at least one selected from ethylene glycol, diethylene glycol, triethylene glycol, propylene glycol, 1,3-propanediol, 1,2-cyclopentanediol, 1,3-cyclopentanediol, 1,2-cyclohexanediol, 1,3-cyclohexanediol, or 1,4-cyclohexanediol.

As the allyldiglycol carbonate resin, polydiethylene glycol bisallyl carbonate is preferable, and examples thereof include CR-39 resin (also referred to as ADC resin).

(Other Additives)

In addition to the resin and the organic dye, known ultraviolet absorbers, infrared absorbers, and various resin additives may be added to the resin composition of the first embodiment, if necessary. Examples of the various resin additives include phenolic antioxidants, mold release agents, dye pigments, phosphorus-based heat stabilizers, weather resistance improvers, antistatic agents, antifogging agents, lubricants, anti-blocking agents, flame retardants, fluidity improvers, plasticizers, dispersants, and antibacterial agents.
<Method of Producing Resin Composition>

The method of producing the resin composition of the first embodiment is not particularly limited. For example, a thermoplastic resin or a thermosetting resin and a benzotriazole compound are mixed in a desired ratio by a tumbler, and then melting and kneading are performed thereto with a single screw extruder or the like to form pellets.

The resin composition may be molded into a desired shape with an injection molding machine or the like using the produced pellets as a raw material.

The molding method differs depending on the kind of resin. In the case of a resin composition using a thermoplastic resin, for example, molding by a compression molding method, a transfer molding method, an extrusion molding method, an injection molding method, or the like may be used, and in the case of a resin composition using a thermosetting resin, for example, a casting polymerization method or the like may be used.

In the first embodiment, the resin composition after molding may be referred to as "molded body".

Hereinafter, the molded body will be described.
<Molded Body>

A molded body, which is one aspect of the resin composition of the first embodiment, will be described.

The molded body may be an optical article made of the resin composition, an optical article partially containing the resin composition, or an intermediate material for producing an optical article such as a powder, a pellet state, or a film.

Examples of the optical article include an antiglare optical article such as an antiglare coat or an antiglare film for a spectacle lens, a sun visor, a helmet shield, or a display device of information equipment, a filter, and a cover for a lighting device. Examples of the filter include an optical filter for the purpose of improving the life of an image display device such as a liquid crystal display device or an organic EL display and of improving the contrast in a bright room.

In the first embodiment, the optical article partially containing the resin composition includes a state of being contained in the inside such as various members or a film of the optical article and a state of being coated or attached to the surface of the member or each layer.
<Antiglare Optical Article>

The molded body is very useful as an antiglare optical article.

Examples of the antiglare optical article include an eyeglass lens, a sun visor, a helmet shield, a windshield film for an automobile and an airplane, a cover for an automobile headlight, a goggle for skis, an antiglare coat or film for a display device of information equipment, and a filter for LED lighting.

Depending on the functions required for the antiglare optical article, one or more of the antireflection function, the hard coat function (friction resistance function), the antistatic function, the antifouling function, the gas barrier function, and the ultraviolet ray blocking function may be provided.
<Optical Filter>

The resin composition of the first embodiment can be used as an optical filter.

The optical filter preferably contains the benzotriazole compound represented by Formula (1) in a substrate. Containing the benzotriazole compound in a substrate in the first embodiment means that it is contained inside a substrate, is applied to a surface of a substrate, or is sandwiched between substrates.

Examples of the substrate include a resin and a glass, and a resin is preferable. As the resin, various forms such as an adhesive, a sheet, a film, a binder resin, and a molded body may be used. The resin may be any combination of a plurality of forms such as having an adhesive on a sheet.
<<Benzotriazole Compound of Second Embodiment>>

The benzotriazole compound of the second embodiment is represented by the following Formula (1A).

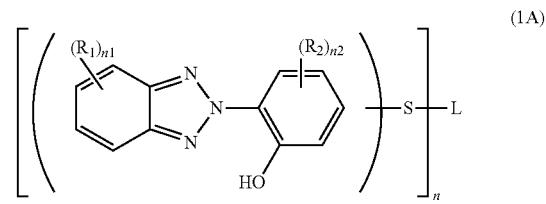

The benzotriazole compound of the second embodiment has a structure represented by Formula (1A), and whereby, it can be used as a light absorber.
<Formula (1A)>

In Formula (1A), each of $R_1$ and $R_2$ independently represents a halogen atom, a cyano group, a hydroxyl group, a sulfone group, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, a substituted or unsubstituted amino group, a substituted or unsubstituted alkylcarbonyl group, a substituted or unsubstituted arylcarbonyl group, a carboxylic acid ester group, or a sulfonic acid ester group.

In Formula (1A), n represents an integer from 2 or more, and L represents a linking group of n valence.

In Formula (1A), n1 represents an integer from 0 to 4, n2 represents an integer from 0 to 4, and n1+n2 is from 0 to 7.

In a case in which a plurality of $R_1$ are present in Formula (1A), the plurality of $R_1$ may be the same or different, or may be bound together to form a ring.

In a case in which a plurality of $R_2$ are present in Formula (1A), the plurality of $R_2$ may be the same or different, or may be bound together to form a ring.

In Formula (1A), it is more preferable that each of $R_1$ and $R_2$ independently represents a halogen atom, a cyano group, a hydroxyl group, a sulfone group, a substituted or unsubstituted alkyl group having from 1 to 20 carbon atoms, a substituted or unsubstituted alkenyl group having from 2 to 20 carbon atoms, a substituted or unsubstituted alkynyl group having from 2 to 20 carbon atoms, a substituted or unsubstituted aralkyl group having from 7 to 25 carbon atoms, a substituted or unsubstituted aryl group having from 6 to 24 carbon atoms, a substituted or unsubstituted alkoxy group having from 1 to 18 carbon atoms, a substituted or unsubstituted aryloxy group having from 6 to 24 carbon atoms, a substituted or unsubstituted alkylthio group having from 1 to 18 carbon atoms, a substituted or unsubstituted arylthio group having from 6 to 24 carbon atoms, a substituted or unsubstituted amino group having from 1 to 24 carbon atoms, a substituted or unsubstituted alkylcarbonyl group having from 2 to 13 total carbon atoms, a substituted or unsubstituted arylcarbonyl group having from 7 to 25 total carbon atoms, an ester group, or a sulfonic acid ester group.

In Formula (1A), it is still more preferable that each of $R_1$ and $R_2$ independently represents a halogen atom, a substituted or unsubstituted alkyl group having from 1 to 12 carbon atoms, a substituted or unsubstituted aralkyl group having from 7 to 19 carbon atoms, a substituted or unsubstituted aryl group having from 6 to 24 carbon atoms, a substituted or unsubstituted alkoxy group having from 1 to 8 carbon atoms, a substituted or unsubstituted aryloxy group having from 6 to 18 carbon atoms, a substituted or unsubstituted alkylthio group having from 1 to 8 carbon atoms, a substituted or unsubstituted arylthio groups having from 6 to 18 carbon atoms, or a substituted or unsubstituted amino group having from 1 to 16 carbon atoms.

In Formula (1A), the sulfur atom in Formula (1A) is preferably bound to at least one of the 5-position or the 6-position of the benzotriazole ring in Formula (1A).

Examples of the halogen atom include a chlorine atom, a fluorine atom, a bromine atom, and an iodine atom. Among the above, a chlorine atom and a fluorine atom are preferable.

Examples of the unsubstituted alkyl group include the same examples as the examples of the unsubstituted alkyl group given in the description of Formula (1) of the first embodiment.

Examples of the substituted alkyl group include the same examples as the examples of the substituted alkyl group given in Formula (1) of the first embodiment.

Examples of the substituted or unsubstituted alkenyl group include the same examples as the examples of the substituted or unsubstituted alkenyl group given in Formula (1) of the first embodiment.

Examples of the substituted or unsubstituted alkynyl group include the same examples as the examples of the substituted or unsubstituted alkynyl group given in Formula (1) of the first embodiment.

Examples of the substituted or unsubstituted aralkyl group include the same examples as the examples of the substituted or unsubstituted aralkyl group given in Formula (1) of the first embodiment.

Examples of the substituted or unsubstituted aryl group include the same examples as the examples of the substituted or unsubstituted aryl group given in Formula (1) of the first embodiment.

As the substituted or unsubstituted alkoxy group, a substituted or unsubstituted alkoxy group having from 1 to 18 carbon atoms is preferable, and a substituted or unsubstituted alkoxy group having from 1 to 8 carbon atoms is more preferable.

Examples of the unsubstituted alkoxy group include the same examples as the example of the unsubstituted alkoxy group given in Formula (1) of the first embodiment.

Examples of the substituted alkoxy group include the same examples as the examples of the substituted alkoxy group given in Formula (1) of the first embodiment.

Examples of the substituted or unsubstituted aryloxy group include a heteroaryloxy group, and the same examples as the examples of the substituted or unsubstituted aryloxy group given in Formula (1) of the first embodiment.

Examples of the unsubstituted alkylthio group include the same examples as the examples of the unsubstituted alkylthio group given in Formula (1) of the first embodiment.

Examples of the substituted alkylthio group include the same examples as the examples of the substituted alkylthio group given in Formula (1) of the first embodiment.

Examples of the substituted or unsubstituted arylthio group include a heteroarylthio group, and the same examples as the examples of the substituted or unsubstituted arylthio group given in Formula (1) of the first embodiment.

As the substituent of the substituted amino group, a substituted or unsubstituted alkyl group, a substituted or unsubstituted aryl group, or a substituted or unsubstituted aralkyl group is preferable.

Examples of the substituted amino group include the same examples as the examples of the substituted amino group given in Formula (1) of the first embodiment.

Examples of the substituted or unsubstituted alkylcarbonyl group include the same examples as the examples of the substituted or unsubstituted alkylcarbonyl group given in Formula (1) of the first embodiment.

Examples of the substituted or unsubstituted arylcarbonyl group include the same examples as the examples of the substituted or unsubstituted arylcarbonyl group given in Formula (1) of the first embodiment.

Examples of the carboxylic acid ester group include the same examples as the examples of the carboxylic acid ester group given in Formula (1) of the first embodiment.

Examples of the sulfonic acid ester group include the same examples as the examples of the sulfonic acid ester group given in Formula (1) of the first embodiment.

In a case in which a plurality of $R_1$ are bound to each other to form a ring, specific examples of the ring include, a pyrrolidino group, a piperidino group, a 4-methylpiperidino group, a 4-isopropylpiperidino group, a pyrrolidino group, 3-methylpyrrolidino group, and a morpholino group.

The specific examples of the ring in a case in which a plurality of $R_2$ are bound to each other to form a ring is the same as the specific examples of the ring in a case in which a plurality of $R_1$ are bound to each other to form a ring.

In Formula (1A), n is preferably from 2 to 4, more preferably 2 or 3.

In a case in which n is 2, the benzotriazole compound represented by Formula (1A) forms a dimer via the linking group L, and in a case in which n is 3, the benzotriazole compound represented by Formula (1A) forms a trimer via the linking group L, and in a case in which n is 4, the benzotriazole compound represented by Formula (1A) forms a tetramer via the linking group L.

In Formula (1A), L is preferably a hydrocarbon group that may contain an oxygen atom, a nitrogen atom, or a sulfur atom.

The hydrocarbon group that may contain an oxygen atom, a nitrogen atom, or a sulfur atom may contain a ring. As the ring, a heterocycle is preferable.

The number of carbon atoms of the hydrocarbon group containing at least one oxygen atom is preferably from 1 to 20, more preferably from 1 to 15, still more preferably from 1 to 10, and particularly preferably from 1 to 7.

The n-valent linking group L is preferably one linking group selected from the group A consisting of an n-valent unsubstituted hydrocarbon group, a carbonyl group, an ether group, a thioether group, and a —NR— group (where R represents a hydrogen atom or an alkyl group), or a linking group formed by bonding two or more kinds selected from the group A.

Examples of the n-valent unsubstituted hydrocarbon group include an n-valent unsubstituted aromatic group and an n-valent unsubstituted aliphatic group.

Examples of the n-valent unsubstituted aromatic group include a group represented by the following formula. In the following specific example, * represents a binding position and y represents from 0 to 4.

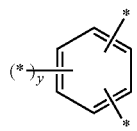

In the benzotriazole compound of the second embodiment, it is preferable that n is 2 and L is a linking group represented by the following Formula (a) or a linking group represented by the following Formula (b), or n is 3 and L is a linking group represented by the following Formula (c).

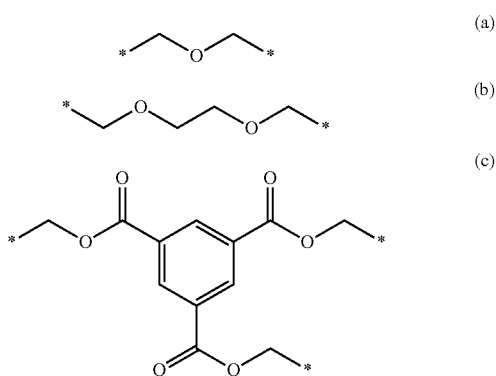

In Formula (a), Formula (b), and Formula (c), * represents a binding position.

Specific examples of the benzotriazole compound represented by Formula (1A) are shown below. The benzotriazole compound of the second embodiment is not limited to these ranges.

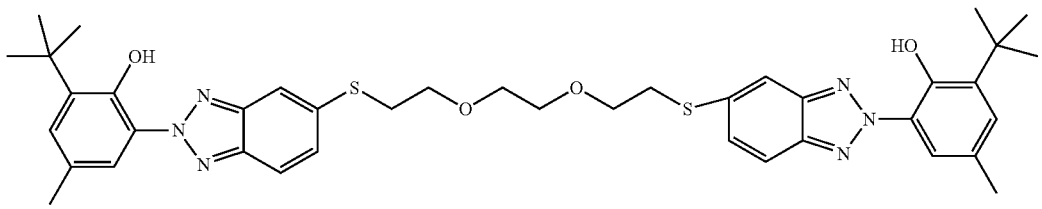

D1

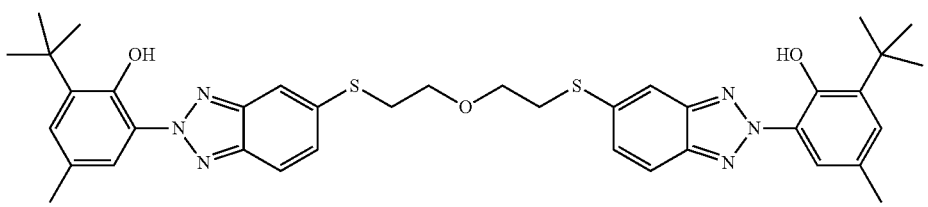

D2

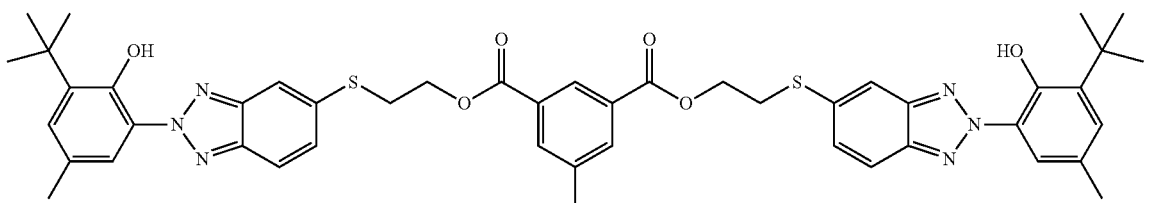

D3

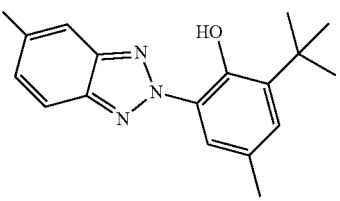

The benzotriazole compound of the second embodiment preferably has a maximum absorption wavelength of from 330 nm to 430 nm.

As a result, when the benzotriazole compound of the second embodiment is used for shielding a light, the glare can be further suppressed, and therefore the transmittance of blue light can be reduced more favorably.

From the same viewpoint as the above, the benzotriazole compound of the second embodiment more preferably has a maximum absorption wavelength of from 350 nm to 400 nm, and still more preferably of from 355 nm to 375 nm.

The maximum absorption wavelength of the benzotriazole compound of the second embodiment is measured using a spectrophotometer (for example, Shimadzu Spectrophotometer UV-1600 manufactured by Shimadzu Corporation) at optical path length of 10 mm using a toluene solution having a concentration of 0.002 g/L.

The method of producing the benzotriazole compound of the second embodiment is not particularly limited, and may be a method of producing the benzotriazole compound by reacting a plurality of compounds. The plurality of compounds may be appropriately selected depending on the structure of the intended benzotriazole compound.

For example, DMF (N,N-dimethylformamide), 2-(5-chloro-2-benzotriazol)-6-tert-butyl-p-cresol, and 3,6-dioxa-1,8-octanethiol, and t-butoxypotassium are charged and stirred to react each compound, whereby a reaction mixture is obtained. Toluene and water are added to the reaction mixture, and extraction and washing with water are repeated to neutralize the reaction mixture. Then, the obtained toluene solution is concentrated and thereafter purified, whereby the above D1 can be produced as the benzotriazole compound.

<Light Absorber>

The light absorber of the second embodiment contains the benzotriazole compound of the second embodiment.

That is, the benzotriazole compound of the second embodiment can be used as a light absorber.

The light absorber of the second embodiment can favorably reduce the transmittance of blue light at a relatively small amount by containing the benzotriazole compound of the second embodiment.

<Resin Composition>

The resin composition of the second embodiment contains (A) a thermoplastic resin or a thermosetting resin, and (B) a benzotriazole compound of the second embodiment.

This allows the resin composition of the second embodiment to obtain a light (ultraviolet ray, blue light, etc.) absorbing action.

The resin composition of the second embodiment can keep the content of the benzotriazole compound to be a relatively small amount from the viewpoint that the transmittance of blue light can be favorably reduced.

When the amount of the light absorber is large, the resin composition tends to be easily colored. Because the content of the benzotriazole compound as the light absorber contained in the resin composition can be kept to be relatively small, coloring of the resin composition can be suppressed.

In the resin composition of the second embodiment, it is possible to reduce the transmittance of light from the ultraviolet region having a wavelength of 400 nm or less to the blue light region (for example, a wavelength region of from 400 nm to 420 nm) while the content of the benzotriazole compound is kept to be a small amount. In a case in which a large amount of the light absorber is contained, it is considered that the resin composition is easily colored. Because the content of the benzotriazole compound as the light absorber is relatively small, coloring of the resin composition can be suppressed.

In the resin composition of the second embodiment it is preferable that the content of the benzotriazole compound is from 500 ppm to 15000 ppm with respect to the total mass of the resin composition.

The resin composition of the second embodiment can more favorably reduce the transmittance of blue light by having a content of the benzotriazole compound or 500 ppm or more with respect to the total mass of the resin composition.

From the same viewpoint as the above, the content of the benzotriazole compound is more preferably 1000 ppm or more, and still more preferably 4000 ppm or more.

The resin composition of the second embodiment can suppress coloring of the resin composition by having a content of the benzotriazole compound of 15000 ppm or less with respect to the total mass of the resin composition.

From the same viewpoint as the above, the content of the benzotriazole compound is more preferably 10000 ppm or less, still more preferably 8000 ppm or less, and particularly preferably 6000 ppm or less.

In the second embodiment, ppm refers to mass-based ppm.

In the resin composition of the second embodiment, it is preferable that a* is from −5 to −1, and b* is from 2 to 10 in the CIE 1976 (L*, a*, b*) color space in a case in which the resin composition is measured at a thickness of 2 mm.

This allows the color of the optical material to be kept favorable. That is, the optical material of the second embodiment can be suitably used for light-shielding eyeglasses such as sunglasses.

From the viewpoint of maintaining favorable hue of the optical material, a* is more preferably from −4.5 to −1.3 and still more preferably from −4 to −1.5 as the hue in the CIE 1976 (L*, a*, b*) color space in a case in which the resin composition is measured at a thickness of 2 mm.

From the same viewpoint, b* is more preferably from 6 to 9, and still more preferably from 7.5 to 9 in the CIE 1976 (L*, a*, b*) color space in a case in which the resin composition is measured at a thickness of 2 mm.

In the second embodiment, the hue in the CIE 1976 (L*, a*, b*) color space is measured using a spectrophotometer (for example, CM-5 manufactured by Konica Minolta, Inc.) at a flat plate lens having a thickness of 2 mm.

(Thermoplastic Resin or Thermosetting Resin)

The definition, examples, and preferred embodiment of the thermoplastic resin or thermosetting resin of (A) in the second embodiment are the same as the definition, examples, and preferred embodiment of the thermoplastic resin or thermosetting resin described in the first embodiment.

(Other Additives)

The other additives in the second embodiment are the same as the other additives described in the first embodiment.

<Method of Producing Resin Composition>

The method of producing the resin composition in the second embodiment is the same as the method of producing the resin composition described in the first embodiment.

<Molded Body>

The molded body in the second embodiment is the same as the molded body described in the first embodiment.

<Antiglare Optical Article>

The antiglare optical article in the second embodiment is the same as the antiglare optical article described in the first embodiment.

<Optical Filter>

The resin composition of the second embodiment can be used as an optical filter.

The optical filter preferably contains the benzotriazole compound represented by Formula (1A) in a substrate.

The optical filter in the second embodiment is the same as the optical filter described in the first embodiment.

EXAMPLES

Hereinafter, one embodiment of the present disclosure will be described in more detail with reference to Examples. The disclosure is not limited to the following Examples as long as the scope of the present disclosure is not exceeded. "Part" is based on mass unless otherwise specified.

Example According to the First Embodiment

In Examples according to the first embodiment, the maximum absorption wavelength and the gram absorption coefficient of the benzotriazole compound were measured using a Shimadzu Spectrophotometer UV-1600 manufactured by Shimadzu Corporation at an optical path length of 10 mm using a toluene solution having a concentration of 0.01 g/L.

Example 1

Production of Compound (3)

4-Chloro-2-nitroaniline in an amount of 8.6 g, 37.5 mL of water, and 16.5 g of 62.5% sulfuric acid were cooled to a temperature of from 0° C. to 5° C. After 34.5 g of a 36% sodium nitrite aqueous solution was dropped, the mixture was stirred for 1 hour. The obtained solution was added dropwise to 9.41 g of 3-n-pentylaminophenol, 3.84 g of sodium hydroxide, 3.46 g of potassium carbonate, 30 mL of methanol, and 10 mL of water at a temperature of from 0° C. to 5° C., and 10.4 g of potassium carbonate was added simultaneously in portions, then stirred for 1 hour. After the supernatant was removed, 25 mL of 2-propanol was added and the intermediate was collected by filtration. The intermediate was stirred with 50 mL of water, 25.5 mL of a 25% aqueous sodium hydroxide solution and 8.23 g of zinc powder were added, and the mixture was stirred at 80° C. for 4 hours.

The reaction mixture was cooled to room temperature and by-products were filtered off. To the obtained solution, 80 g of ice was added and the pH was adjusted to 8 with 35% hydrochloric acid. Thereafter, the precipitate was collected by filtration, washed with water, and dried.

The dried product was purified by silica gel column chromatography (eluent: toluene) to obtain 7 g of Compound (3) having the following structural Formula as a pale yellow powder.

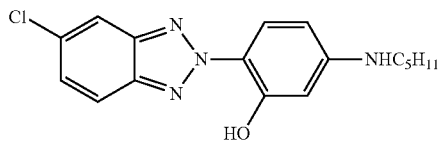

(3)

It was confirmed from the following analysis results that the obtained compound was an intended compound.

ESI-Mass: 331(M+H)$^+$

Elemental analysis value: Measured value (C: 61.76%, H: 5.82%, N: 16.90%); Theoretical value (C: 61.72%, H: 5.79%, N: 16.94%)

The toluene solution of the compound thus obtained showed the maximum absorption at 387 nm, and had a gram absorption coefficient of 9.77×10$^4$ g/mL·cm.

Example 2

Production of Compound (15)

4-Chloro-2-nitroaniline in an amount of 8.6 g, 50 mL of water, and 12.5 mL of 35% hydrochloric acid were cooled to a temperature of from 0° C. to 5° C. After 34.5 g of a 36% sodium nitrite aqueous solution was dropped, the mixture was stirred for 1 hour. The obtained solution was added dropwise to 8.65 g of 3-diethylaminophenol, 2.5 mL of 35% hydrochloric acid, and 100 mL of water at a temperature of from 0° C. to 5° C., and the mixture was stirred for 1 hour.

The intermediate was collected by filtration, stirred with 50 mL of water, then 12.5 mL of a 25% aqueous sodium hydroxide solution and 9.68 g of zinc powder were added, and the mixture was stirred at 80° C. for 4 hours.

The reaction mixture was cooled to room temperature and by-products were filtered off. To the obtained solution, 80 g of ice was added and the pH was adjusted to 8 with 35% hydrochloric acid. The precipitate was collected by filtration, washed with water, and dried.

The dried product was purified by silica gel column chromatography (eluent: toluene) to obtain 11.2 g of Compound (15) having the following structural formula as a pale yellow powder.

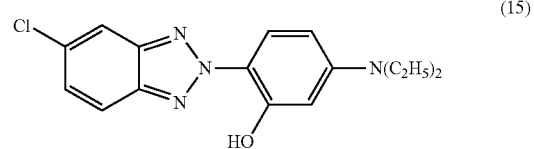

(15)

It was confirmed from the following analysis results that the obtained compound was an intended compound.

ESI-Mass: 317(M+H)$^+$

Elemental analysis value: Measured value (C: 60.63%, H: 5.37%, N: 17.71%); Theoretical value (C: 60.66%, H: 5.41%, N: 17.69%)

The toluene solution of the compound thus obtained showed the maximum absorption at 409 nm, and had a gram absorption coefficient of 6.66×10$^4$ g/mL·cm.

Example 3

Production of Compound (21)

Compound (21) having the following structural formula in an amount of 12.1 g was obtained as a pale yellow powder in the same manner as in Example 1 except that 9.69 g of 3-hydroxydiphenylamine was used instead of 9.41 g of 3-n-pentylaminophenol.

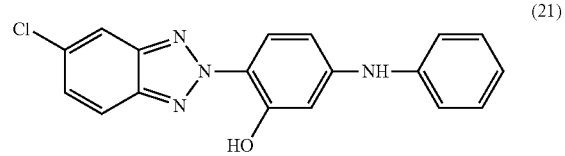 [SMILES: Oc1cc(Nc2ccccc2)ccc1-n1nc2ccc(Cl)cc2n1]

(21)

It was confirmed from the following analysis results that the obtained compound was an intended compound.

ESI-Mass: 337(M+H)$^+$

Elemental analysis value: Measured value (C: 64.16%, H: 3.87%, N: 16.67%); Theoretical value (C: 64.20%, H: 3.89%, N: 16.64%)

The toluene solution of the compound thus obtained showed the maximum absorption at 388.5 nm, and had a gram absorption coefficient of $1.05 \times 10^5$ g/mL·cm.

Example 4

Production of Compound (22)

To 6 g of Compound (21) and 60 mL of pyridine, 3.36 g of n-heptaroyl chloride was added, and the mixture was stirred at 100° C. for 3 hours.

Toluene in an amount of 300 mL was added to the reaction mixture, and the mixture was washed with dilute hydrochloric acid and then with water.

The solvent was distilled off and the residue was purified by silica gel column chromatography (eluent: toluene) to obtain 11 g of Compound (22) having the following structural formula as a pale yellow powder.

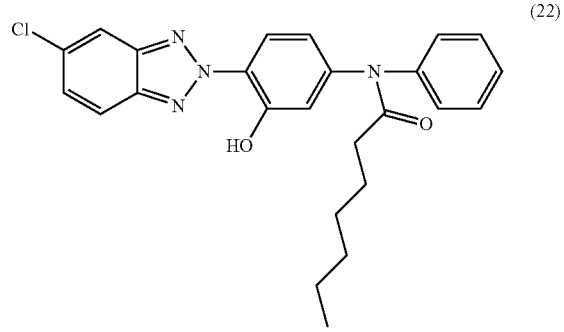 [SMILES: CCCCCCC(=O)N(c1ccccc1)c1ccc(-n2nc3ccc(Cl)cc3n2)c(O)c1]

(22)

It was confirmed from the following analysis results that the obtained compound was an intended compound.

ESI-Mass: 449(M+H)$^+$

Elemental analysis value: Measured value (C: 66.85%, H: 5.59%, N: 12.51%); Theoretical value (C: 66.88%, H: 5.61%, N: 12.48%)

The toluene solution of the compound thus obtained showed the maximum absorption at 355 nm, and had a gram absorption coefficient of $6.1 \times 10^4$ g/mL·cm.

Example 5

Production of Compound (4)

Compound (4) having the following structural formula in an amount of 13.3 g was obtained as a pale yellow powder in the same manner as in Example 1 except that 10.0 g of 3-cyclohexylphenol was used instead of 8.65 g of 3-diethylaminophenol.

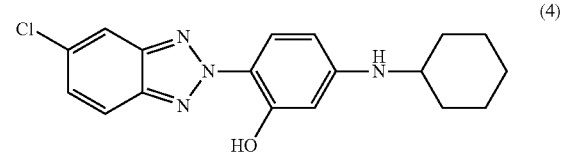

(4)

It was confirmed from the following analysis results that the obtained compound was an intended compound.

ESI-Mass: 343(M+H)$^+$

Elemental analysis value: Measured value (C: 63.02%, H: 5.55%, N: 16.37%); Theoretical value (C: 63.06%, H: 5.59%, N: 16.34%)

The toluene solution of the compound thus obtained showed the maximum absorption at 389.5 nm, and had a gram absorption coefficient of $9.76 \times 10^4$ g/mL·cm.

Example 6

Production of Compound (53)

To 5.2 g of 5-amino-2-(5-chloro-2H-benzotriazole-2-yl) phenol and 60 mL of pyridine, 3.16 g of n-heptaroyl chloride was added, and the mixture was stirred at 100° C. for 3 hours.

Toluene in an amount of 300 mL was added to the reaction mixture, and the mixture was washed with dilute hydrochloric acid and then with water.

The solvent was concentrated and cooled, and the precipitate was collected by filtration and dried to obtain 5.1 g of Compound (53) having the following structural formula as a pale yellow powder.

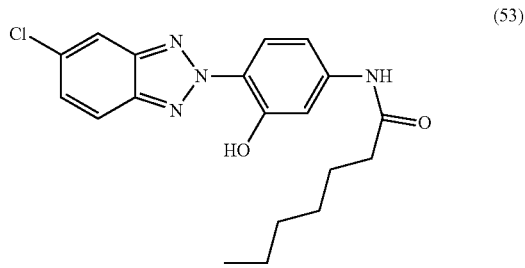 [SMILES: CCCCCCC(=O)Nc1ccc(-n2nc3ccc(Cl)cc3n2)c(O)c1]

(53)

It was confirmed from the following analysis results that the obtained compound was an intended compound.

ESI-Mass: 373(M+H)$^+$

Elemental analysis value: Measured value (C: 61.18%, H: 5.66%, N: 15.07%); Theoretical value (C: 61.21%, H: 5.68%, N: 15.03%)

The toluene solution of the compound thus obtained showed the maximum absorption at 359.0 nm, and had a gram absorption coefficient of $7.9 \times 10^4$ g/mL·cm.

Example 7

Production of Compound (55)

Compound (53) in an amount of 2.8 g, 2.5 g of t-butylthiophenol, 2.3 g of potassium carbonate, 0.1 g of potassium iodide, and 13 mL of dimethylformamide were stirred at a temperature of from 125° C. to 130° C. for 24 hours. After cooling, the reaction mixture was discharged into 300 mL of water, 200 mL of toluene was added, and the mixture was extracted. The toluene layer was separated, washed with hot water, and concentrated, and the precipitate was collected by filtration and dried to obtain 3.1 g of Compound (55) having the following structural formula as a pale yellow powder.

(55)

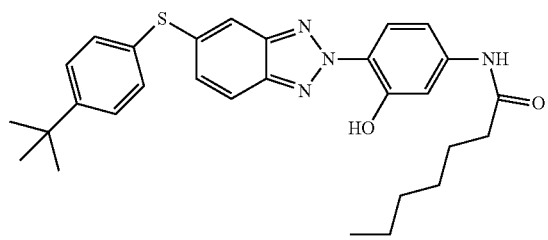

It was confirmed from the following analysis results that the obtained compound was an intended compound.
ESI-Mass: 503(M+H)$^+$
Elemental analysis value: Measured value (C: 69.26%, H: 6.78%, N: 11.17%); Theoretical value (C: 69.29%, H: 6.82%, N: 11.15%)
The toluene solution of the compound thus obtained showed the maximum absorption at 371.0 nm, and had a gram absorption coefficient of $6.9 \times 10^4$ g/mL·cm.

Example 8

Production of Compound (54)
Compound (54) having the following structural formula in an amount of 3.0 g was obtained as a pale yellow powder in the same manner as in Example 7 except that 2.2 g of 1-octanethiol was used instead of 2.5 g of t-butylthiophenol.

(54)

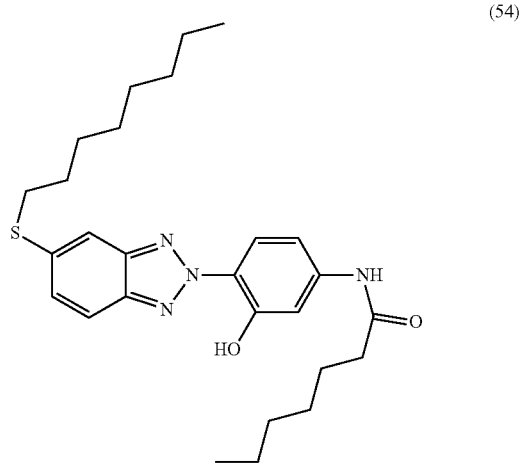 [SMILES: CCCCCCCCSc1ccc2nn(-c3ccc(NC(=O)CCCCCC)cc3O)nc2c1]

It was confirmed from the following analysis results that the obtained compound was an intended compound.
ESI-Mass: 483(M+H)$^+$
Elemental analysis value: Measured value (C: 67.16%, H: 7.90%, N: 11.63%); Theoretical value (C: 67.19%, H: 7.94%, N: 11.61%)
The toluene solution of the compound thus obtained showed the maximum absorption at 371.0 nm, and had a gram absorption coefficient of $7.10 \times 10^4$ g/mL·cm.

Example 9

Production of Compound (56)
Compound (56) having the following structural formula in an amount of 4.4 g was obtained as a pale yellow powder in the same manner as in Example 6 except that 3.9 g of 2-ethylhexanoyl chloride was used instead of 3.16 g of n-heptaroyl chloride.

(56)

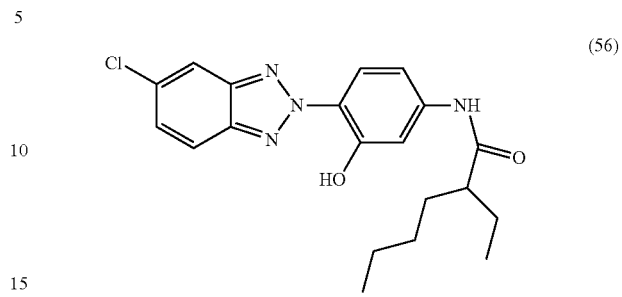

It was confirmed from the following analysis results that the obtained compound was an intended compound.
ESI-Mass: 387(M+H)$^+$
Elemental analysis value: Measured value (C: 62.06%, H: 5.97%, N: 14.52%); Theoretical value (C: 62.09%, H: 5.99%, N: 14.48%)
The toluene solution of the compound thus obtained showed the maximum absorption at 359.0 nm, and had a gram absorption coefficient of $7.48 \times 10^4$ g/mL·cm.

Example 10

Production of Compound (58)
Compound (58) having the following structural formula in an amount of 2.3 g was obtained as a pale yellow powder in the same manner as in Example 7 except that 2.9 g of Compound (56) was used instead of 2.8 g of Compound (53).

(58)

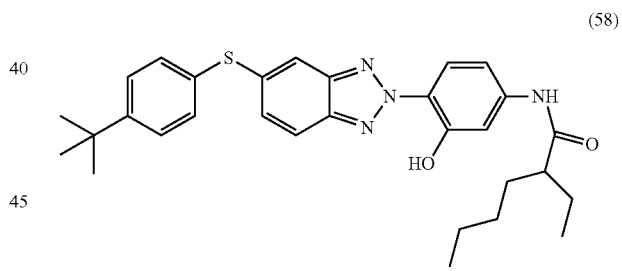

It was confirmed from the following analysis results that the obtained compound was an intended compound.
ESI-Mass: 517(M+H)$^+$
Elemental analysis value: Measured value (C: 69.70%, H: 6.99%, N: 10.87%); Theoretical value (C: 69.74%, H: 7.02%, N: 10.84%)
The toluene solution of the compound thus obtained showed the maximum absorption at 371.5 nm, and had a gram absorption coefficient of $6.61 \times 10^4$ g/mL·cm.

Example 11

Production of Compound (59)
Compound (59) having the following structural formula in an amount of 4.7 g was obtained as a pale yellow powder in the same manner as in Example 6 except that 2.86 g of 2,2-methylbutyryl chloride was used instead of 3.16 g of n-heptaroyl chloride.

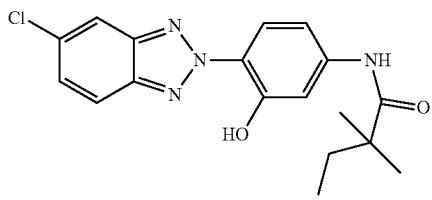

(59)

It was confirmed from the following analysis results that the obtained compound was an intended compound.

ESI-Mass: 359(M+H)$^+$

Elemental analysis value: Measured value (C: 60.22%, H: 5.30%, N: 15.66%); Theoretical value (C: 60.25%, H: 5.34%, N: 15.61%)

The toluene solution of the compound thus obtained showed the maximum absorption at 359.0 nm, and had a gram absorption coefficient of $8.40 \times 10^4$ g/mL·cm.

Example 12

Production of Compound (101)

Compound (101) having the following structural formula in an amount of 2.8 g was obtained as a pale yellow powder in the same manner as in Example 7 except that 2.7 g of Compound (58) was used instead of 2.8 g of Compound (53).

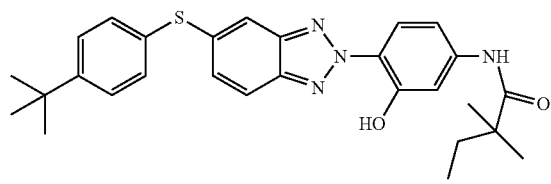

(101)

It was confirmed from the following analysis results that the obtained compound was an intended compound.

ESI-Mass: 489(M+H)$^+$

Elemental analysis value: Measured value (C: 68.78%, H: 6.57%, N: 11.50%); Theoretical value (C: 68.82%, H: 6.60%, N: 11.47%)

The toluene solution of the compound thus obtained showed the maximum absorption at 371.5 nm, and had a gram absorption coefficient of $7.02 \times 10^4$ g/mL·cm.

Example 13

Production of Compound (102)

Compound (102) having the following structural formula in an amount of 7.8 g was obtained as a pale yellow powder in the same manner as in Example 1 except that 7.94 g of 3-acetylaminophenol was used instead of 9.41 g of 3-n-pentylaminophenol.

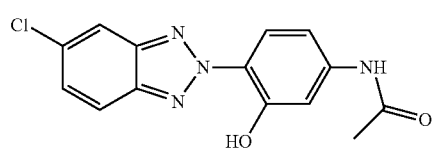

(102)

It was confirmed from the following analysis results that the obtained compound was an intended compound.

ESI-Mass: 303(M+H)$^+$

Elemental analysis value: Measured value (C: 55.52%, H: 3.63%, N: 18.53%); Theoretical value (C: 55.55%, H: 3.66%, N: 18.51%)

The toluene solution of the compound thus obtained showed the maximum absorption at 347.0 nm, and had a gram absorption coefficient of $5.19 \times 10^4$ g/mL·cm.

Example 14

Production of Compound (103)

Compound (103) having the following structural formula in an amount of 5.1 g was obtained as a pale yellow powder in the same manner as in Example 6 except that 3.1 g of cyclohexanecarbonyl chloride was used instead of 3.16 g of n-heptaroyl chloride.

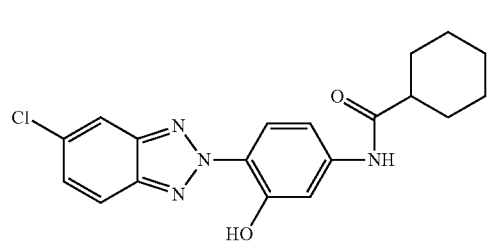

(103)

It was confirmed from the following analysis results that the obtained compound was an intended compound.

ESI-Mass: 371(M+H)$^+$

Elemental analysis value: Measured value (C: 61.51%, H: 5.13%, N: 15.15%); Theoretical value (C: 61.54%, H: 5.16%, N: 15.11%)

The toluene solution of the compound thus obtained showed the maximum absorption at 359.0 nm, and had a gram absorption coefficient of $8.48 \times 10^4$ g/mL·cm.

Example 15

Production of Compound (104)

Compound (104) having the following structural formula in an amount of 3.3 g was obtained as a pale yellow powder in the same manner as Example 7 except that 2.8 g of Compound (103) was used instead of 2.8 g of Compound (53) and 2.7 g of 4-t-butylphenylmethanethiol was used instead of 2.5 g of 4-t-butylthiophenol.

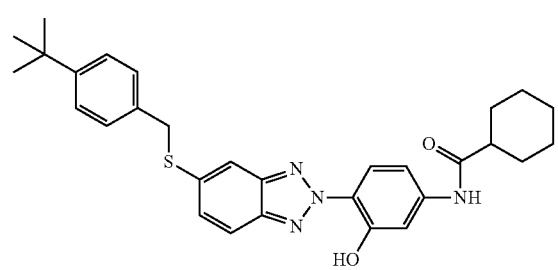

(104)

Example 16

Production of Compound (105)

Compound (105) having the following structural formula in an amount of 13.1 g was obtained as a pale yellow powder in the same manner as in Example 1 except that 8.6 g of 3,4-dihydro-7-hydroxy-2-(1H)-quinoline was used instead of 9.41 g of 3-n-pentylaminophenol.

(105)

It was confirmed from the following analysis results that the obtained compound was an intended compound.

ESI-Mass: 315(M+H)$^+$

Elemental analysis value: Measured value (C: 57.20%, H: 3.48%, N: 17.83%); Theoretical value (C: 57.24%, H: 3.52%, N: 17.80%)

The toluene solution of the compound thus obtained showed the maximum absorption at 365.5 nm, and had a gram absorption coefficient of $7.28 \times 10^4$ g/mL·cm.

Example 17

Production of Compound (61)

Compound (61) having the following structural formula in an amount of 4.9 g was obtained as a pale yellow powder in the same manner as in Example 6 except that 2.84 g of benzoyl chloride was used instead of 3.16 g of n-heptaroyl chloride.

(61)

It was confirmed from the following analysis results that the obtained compound was an intended compound.

ESI-Mass: 365(M+H)$^+$

Elemental analysis value: Measured value (C: 62.53%, H: 3.57%, N: 15.39%); Theoretical value (C: 62.56%, H: 3.59%, N: 15.36%)

The toluene solution of the compound thus obtained showed the maximum absorption at 360.0 nm, and had a gram absorption coefficient of $9.37 \times 10^4$ g/mL·cm.

Example 18

Production of Compound (111)

Compound (111) having the following structural formula in an amount of 8.5 g was obtained as a pale yellow powder in the same manner as in Example 2 except that 8.4 g of p-methoxy-o-nitroaniline was used instead of 8.6 g of 4-chloro-2-nitroaniline and 7.92 g of 3-ethylamino-p-cresol was used instead of 8.65 g of 3-diethylaminophenol.

(111)

It was confirmed from the following analysis results that the obtained compound was an intended compound.

ESI-Mass: 299(M+H)$^+$

Elemental analysis value: Measured value (C: 64.43%, H: 6.11%, N: 18.75%); Theoretical value (C: 64.41%, H: 6.08%, N: 18.78%)

The toluene solution of the compound thus obtained showed the maximum absorption at 378.5 nm, and had a gram absorption coefficient of $1.04 \times 10^5$ g/mL·cm.

Example 19

Production of Compound (81)

(Specific Example Compound (81)) having the following structural formula in an amount of 5.3 g was obtained as a pale yellow powder in the same manner as in Example 6 except that 4 g of diethylcarbamoyl chloride was used instead of 3.16 g of n-heptaroyl chloride.

(81)

It was confirmed from the following analysis results that the obtained compound was an intended compound.

ESI-Mass: 360(M+H)$^+$

Elemental analysis value: Measured value (C: 56.77%, H: 5.08%, N: 19.41%); Theoretical value (C: 56.75%, H: 5.04%, N: 19.46%)

The toluene solution of the compound thus obtained showed the maximum absorption at 372.5 nm, and had a gram absorption coefficient of $1.07 \times 10^5$ g/mL·cm.

Example 20

Production of Compound (112)

Compound (112) having the following structural formula in an amount of 2.3 g was obtained as a pale yellow powder in the same manner as in Example 7 except that 2.9 g of Compound (56) was used instead of 2.8 g of Compound (53) and 1.7 g of thiophenol was used instead of 2.5 g of t-butylthiophenol.

It was confirmed from the following analysis results that the obtained compound was an intended compound.

ESI-Mass: 515(M+H)$^+$

Elemental analysis value: Measured value (C: 70.04%, H: 6.68%, N: 10.85%); Theoretical value (C: 70.01%, H: 6.66%, N: 10.89%)

The toluene solution of the compound thus obtained showed the maximum absorption at 371.0 nm, and had a gram absorption coefficient of $6.90 \times 10^4$ g/mL·cm.

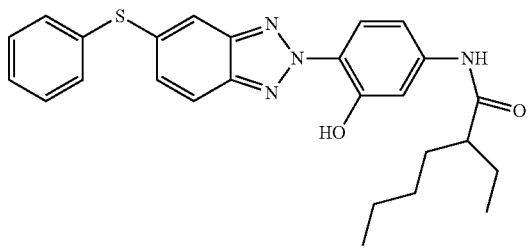
(112)

It was confirmed from the following analysis results that the obtained compound was an intended compound.

ESI-Mass: 461

Elemental analysis value: Measured value (C: 67.82%, H: 6.16%, N: 12.13%); Theoretical value (C: 67.80%, H: 6.13%, N: 12.16%)

The toluene solution of the compound thus obtained showed the maximum absorption at 370.0 nm, and had a gram absorption coefficient of $7.47\times10^4$ g/mL·cm.

Example 21

Production of Compound (113)

Compound (113) having the following structural formula in an amount of 2.9 g was obtained as a pale yellow powder in the same manner as in Example 7 except that 5.0 g of Compound (56) was used instead of 2.8 g of Compound (53) and 3.2 g of p-methylthiophenol was used instead of 2.5 g of t-butylthiophenol.

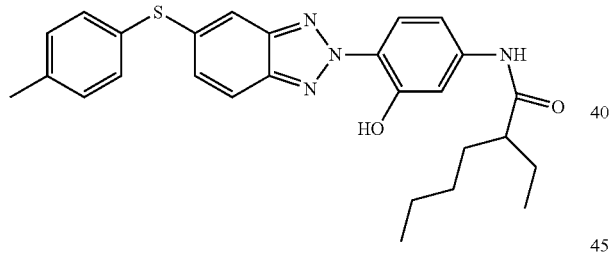
(113)

It was confirmed from the following analysis results that the obtained compound was an intended compound.

ESI-Mass: 475

Elemental analysis value: Measured value (C: 68.35%, H: 6.40%, N: 11.78%); Theoretical value (C: 68.33%, H: 6.37%, N: 11.80%)

The toluene solution of the compound thus obtained showed the maximum absorption at 371.5 nm, and had a gram absorption coefficient of $6.98\times10^4$ g/mL·cm.

(Solubility)

The solubility of the benzotriazole compounds obtained in Examples 6 to 12 was measured by the following method.

As Comparative Example 1, the solubility of TINUVIN326 (manufactured by BASF Japan Ltd.) represented by the following Formula (TI) was measured by the following method.

To 0.5 g of the benzotriazole compound, the various organic solvents shown in Table 1 were added such that the total mass was about 10 g, the mixture was irradiated with ultrasonic waves for about 30 minutes, and thereafter stirred at room temperature for 2 hours to prepare a dispersion of about 10% by mass.

The dispersion was filtered through a membrane filter (0.2 μm), and the obtained residue was dried in a dryer at 60° C. for 1 hour, and then the mass of the residue was measured.

The solubility of the benzotriazole compound to the solvent was expressed by the following formula.

Solubility (% by mass)=$(W0-W1)/W0$

W0 is the mass of the benzotriazole compound before the treatment, and W1 is the mass of the residue after drying (that is, the dissolution residue of the benzotriazole compound). In a case in which no residue remained on the filter, the solubility was determined as 5% by mass or more. The results are shown in Table 1.

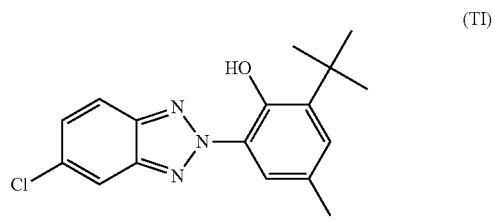 [SMILES: Cc1cc(-n2nc3ccc(Cl)cc3n2)c(O)c(C(C)(C)C)c1]
(TI)

TABLE 1

| | | Solubility to various organic solvents (% by mass) | | | | |
| --- | --- | --- | --- | --- | --- | --- |
| | Compound | Toluene | Ethyl acetate | MEK | PGMEA | MMA |
| Example 6 | (53) | 0.5 | 1 | 1 | 1 | 1 |
| Example 8 | (54) | 0.3 | 0.3 | 1 | 0.3 | 0.5 |
| Example 7 | (55) | 2 | 5 | 5 | 5 or more | 5 or more |
| Example 9 | (56) | 0.2 | 0.8 | 2 | 0.8 | 1.2 |
| Example 10 | (58) | 2 | 3 | 5 or more | 2 | 5 or more |
| Example 11 | (59) | 2 | 5 or more | 5 or more | 5 or more | 5 or more |
| Example 12 | (101) | 1 | 1.5 | 3 | 1 | 3 |
| Example 18 | (111) | 1 | 5 | 10 | 3 | 4 |
| Example 20 | (112) | 1 or more | 3 or more | 10 or more | 2 or more | 4 or more |
| Example 21 | (113) | 0.5 or more | 1 or more | 2.5 or more | 1 or more | 2 or more |
| Comparative Example 1 | TINUVIN326 | 5 or more | 3 | 3 | 1 | 5 |

In Table 1, MEK is methyl ethyl ketone, PGMEA is propylene glycol monomethyl ether, and MMA is methyl methacrylate.

(Heat Resistance)

In each Example and Comparative Example, the decomposition temperature was measured by the following method.

Using a thermal analyzer Rigaku ThermoPlus Evo TG8120, the TG5% decomposition temperature (T-5% by mass) was measured under a nitrogen atmosphere at a heating rate of 10° C./min and a temperature range of from room temperature to 500° C. The results are shown in Table 2.

The higher the T-5% by mass, the higher the heat resistance.

TABLE 2

| | Specific Example Compound | T-5% by mass (° C.) |
|---|---|---|
| Example 6 | (53) | 323.5 |
| Example 8 | (54) | 359.7 |
| Example 7 | (55) | 359.4 |
| Example 9 | (56) | 312.7 |
| Example 10 | (58) | 374.7 |
| Example 11 | (59) | 309.1 |
| Example 12 | (101) | 366.1 |
| Example 14 | (103) | 335.7 |
| Example 15 | (104) | 313.1 |
| Example 18 | (111) | 252.6 |
| Example 19 | (81) | 230.1 |
| Example 20 | (112) | 368.0 |
| Example 21 | (113) | 365.5 |
| Comparative Example 1 | TINUVIN326 | 219.2 |

As shown in Table 2, the benzotriazole compounds of the disclosure produced in Examples had higher heat resistances than TINUVIN326 of Comparative Example 1.

Examples 1A, 2A, 3A, 4A and Comparative Example 1A

Dibutyltin(II) dichloride in an amount of 0.035 parts by mass, 0.1 parts by mass of an internal mold release agent for MR manufactured by Mitsui Chemicals, Inc., the light absorber shown in Table 3 in the amount shown in Table 3, and 50.6 parts by mass of a mixture of 2,5-bis(isocyanatomethyl)bicyclo-[2.2.1]-heptane and 2,6-bis(isocyanatomethyl)bicyclo-[2.2.1]-heptane were mixed to produce a mixed solution.

After the mixed solution was stirred at 25° C. for 1 hour to completely dissolve each component, 25.5 parts by mass of 4-mercaptomethyl-1,8-dimercapto-3,6-dithiaoctane and 23.9 parts by mass of pentaerythritol tetrakis(3-mercaptopropionate) were charged and stirred at 25° C. for 30 minutes to obtain a uniform solution. The uniform solution was defoamed at 400 Pa for 1 hour, filtered through a 1 μm PTFE filter, and then poured into a flat glass mold having a center thickness of 2 mm or 9 mm and a diameter of 77 mm. Then, the temperature of the glass mold was raised from 25° C. to 120° C. over 16 hours. After that, the glass mold was cooled to room temperature, and a flat lens was removed from the glass mold. The obtained flat plate lens was further annealed at 120° C. for 2 hours to obtain a flat plate lens.

VIOSORB 583 in Table 3 is manufactured by KYODO CHEMICAL CO., LTD.

Examples 5A to 8A and Comparative Example 2A

A resin composition was produced in the same manner as in Example 1A except that
 the amount of Compound (101) added was changed from an amount to have a concentration of 2000 ppm to an amount to have a concentration of 1000 ppm,
 the amount of the dibutyltin(II) dichloride added was changed from 0.035 parts by mass to 0.015 parts by mass,
 50.6 parts by mass of the mixture of 2,5-bis(isocyanatomethyl)bicyclo-[2.2.1]-heptane and 2,6-bis(isocyanatomethyl)bicyclo-[2.2.1]-heptane was changed to 52 parts by mass of m-xylylene diisocyanate, and
 25.5 parts by mass of 4-mercaptomethyl-1,8-dimercapto-3,6-dithiaoctane and 23.9 parts by mass of pentaerythritol tetrakis(3-mercaptopropionate) were changed to 48 parts by mass of 4-mercaptomethyl-1,8-dimercapto-3,6-dithiaoctane,
 and a flat plate molded body having the same outer shape and thickness as in Example 1A was formed.

Examples 9A to 12A

A resin composition was produced in the same manner as in Example 1A except that
 the amount of Compound (101) added was changed from an amount to have a concentration of 2000 ppm to an amount to have a concentration of 1200 ppm,
 the amount of the dibutyltin(II) dichloride added was changed from 0.035 parts by mass to 0.008 parts by mass,
 50.6 parts by mass of the mixture of 2,5-bis(isocyanatomethyl)bicyclo-[2.2.1]-heptane and 2,6-bis(isocyanatomethyl)bicyclo-[2.2.1]-heptane was changed to 50.7 parts by mass of m-xylylene diisocyanate, and
 25.5 parts by mass of 4-mercaptomethyl-1,8-dimercapto-3,6-dithiaoctane and 23.9 parts by mass of pentaerythritol tetrakis(3-mercaptopropionate) were changed to 49.3 parts by mass of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane,
 and a flat plate molded body having the same outer shape and thickness as in Example 1A was formed.

—Evaluation—

The following evaluations were made on Examples 1A to 12A, Comparative Example 1A, and Comparative Example 2A.

(Measurement of Transmittance at a Wavelength of 420 nm and Transmittance Curve)

Figure 2:
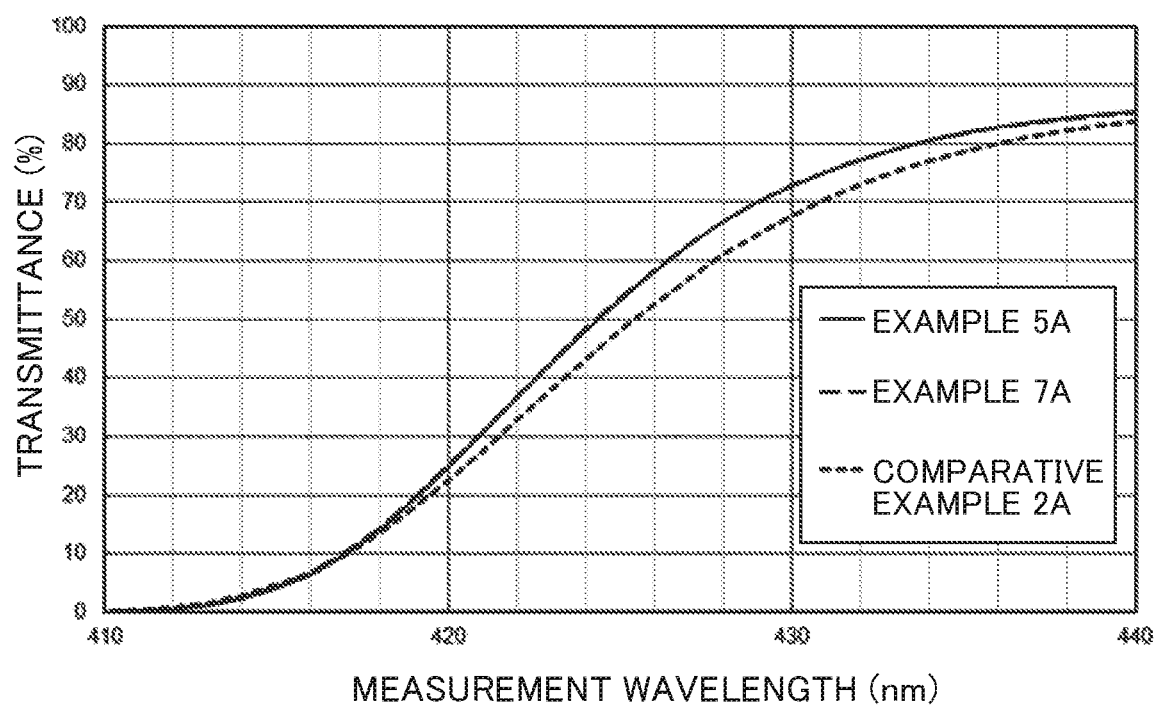
FIG. 2 is a graph showing transmittance curves of resin compositions in Example 5A, Example 7A, and Comparative Example 2A.
Figure 3:
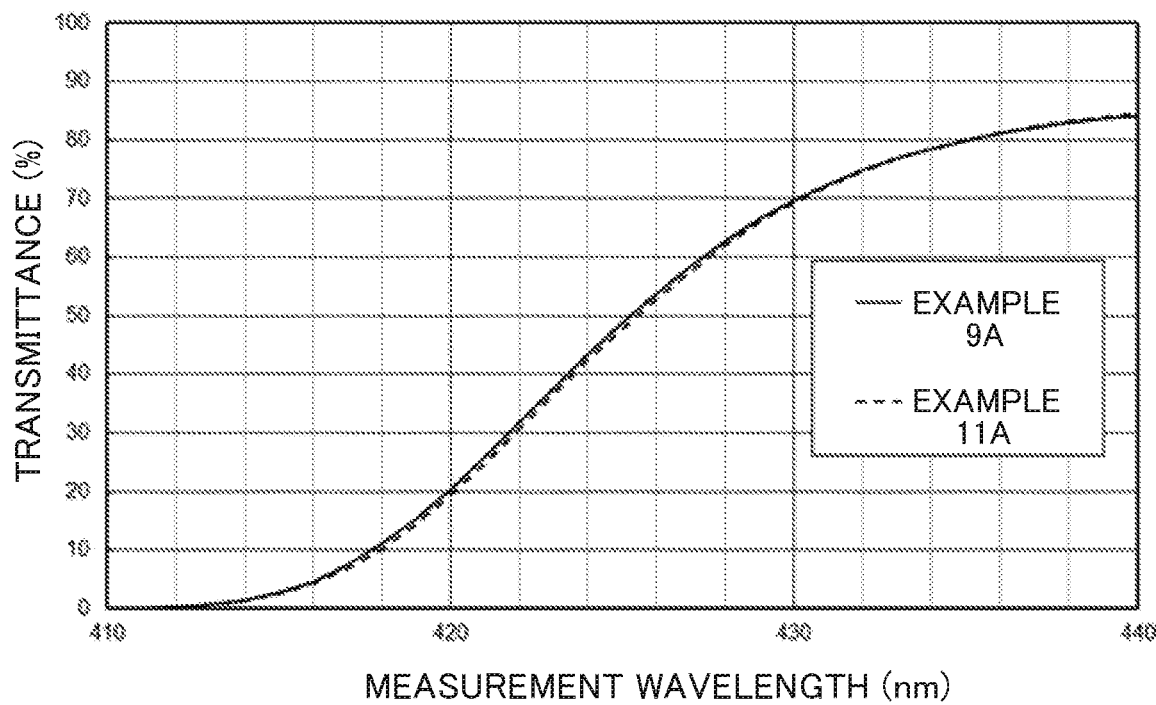
FIG. 3 is a graph showing transmittance curves of resin compositions in Example 9A and Example 11A.

For the molded bodies according to Examples 1A to 12A, Comparative Example 1A, and Comparative Example 2A, the transmittance at a wavelength of 420 nm and the transmittance curve were measured using a Shimadzu Spectrophotometer UV-1600 (manufactured by Shimadzu Corporation) as a measuring device and a 2 mm thick flat plate lens. Table 3 shows the transmittance at a wavelength of 420 nm. The transmittance curves are shown in FIG. 1 for Example 1A, Example 3A, and Comparative Example 1A, in FIG. 2 for Example 5A, Example 7A, and Comparative Example 2A, and in FIG. 3 for Example 9A and Example 11A.

(Measurement of Yellowness (YI) and L*, a*, b*)

Using a spectrophotometer (CM-5 manufactured by Konica Minolta, Inc.), the yellowness (YI) at a 9 mm thick flat plate lens and a* and b* in the CIE 1976 (L*, a*, b*) color system were measured and used as an index of hue.

The results are shown in Table 3.

In Examples, it was possible to obtain a shielding property against light having a wavelength of 420 nm with a small amount of light absorber.

Comparative Example 1A required a large amount of light absorber in order to obtain a transmittance equivalent to that of Example 1A and Example 3A.

TABLE 3

|  |  | Example 1A | Example 2A | Example 3A | Example 4A | Example 5A | Example 6A | Example 7A | Example 8A |
|---|---|---|---|---|---|---|---|---|---|
| Light absorber | Compound name | Compound (101) | Compound (101) | Compound (58) | Compound (58) | Compound (101) | Compound (101) | Compound (58) | Compound (58) |
|  | Added amount [ppm] | 2000 | 2000 | 2000 | 2000 | 1000 | 1000 | 1000 | 1000 |
|  | Compound name | — | VIOSORB 583 | — | VIOSORB 583 | — | VIOSORB 583 | — | VIOSORB 583 |
|  | Added amount [ppm] | — | 1000 | — | 1000 | — | 1000 | — | 1000 |
| Transmittance at 420 nm (%, 2 mm thickness) |  | 19.0 | 19.1 | 17.8 | 18.6 | 24.8 | 24.3 | 25.1 | 23.4 |
| Hue (9 mm thickness) | YI | 18.6 | 17.6 | 18.8 | 18.4 | 18.7 | 18.6 | 19.1 | 19.2 |
|  | a* | −7.1 | −6.8 | −7.2 | −7.0 | −7.0 | −7.0 | −7.1 | −7.2 |
|  | b* | 12.9 | 12.2 | 13.1 | 12.7 | 12.8 | 12.8 | 13.1 | 13.2 |

|  |  | Example 9A | Example 10A | Example 11A | Example 12A | Comparative Example 1A | Comparative Example 2A |
|---|---|---|---|---|---|---|---|
| Light absorber | Compound name | Compound (101) | Compound (101) | Compound (58) | Compound (58) | TINUVIN326 | TINUVIN326 |
|  | Added amount [ppm] | 1200 | 1200 | 1200 | 1200 | 10000 | 5000 |
|  | Compound name | — | VIOSORB 583 | — | VIOSORB 583 | — | — |
|  | Added amount [ppm] | — | 1000 | — | 1000 | — | — |
| Transmittance at 420 nm (%, 2 mm thickness) |  | 20.3 | 19.2 | 19.4 | 19.7 | 17.6 | 22.7 |
| Hue (9 mm thickness) | YI | 19.8 | 19.9 | 20.3 | 20.5 | 20.4 | 20.4 |
|  | a* | −7.3 | −7.4 | −7.5 | −7.6 | −7.8 | −7.6 |
|  | b* | 13.7 | 13.7 | 14.0 | 14.2 | 14.2 | 14.2 |

As shown in Table 3, for Example 1A, Example 3A, and Comparative Example 1A in which the molded body was molded using the same resin, Example 1A and Example 3A showed a transmittance equivalent to that of Comparative Example 1A even though the amount of the light absorber added was smaller than that of Comparative Example 1A.

For Example 5A to Example 8A and Comparative Example 2A in which the molded body was molded using the same resin, Example 5A to Example 8A showed a transmittance equivalent to that of Comparative Example 2A even though the amount of the light absorber added was smaller than that of Comparative Example 2A.

Example 13A to Example 22A

A resin composition was produced in the same manner as in Example 1A except that the kind and the amount of the light absorber added were changed to the kinds of light absorber shown in Table 4 and the amounts shown in Table 4, and a flat plate molded body having the same outer shape as in Example 1A was formed.

For the molded bodies obtained in Example 13A and Example 14A, the above-described (Measurement of Transmittance at A Wavelength of 420 nm and Transmittance Curve) and (Measurement of Yellowness (YI) and L*, a*, b*) were evaluated.

Figure 4:
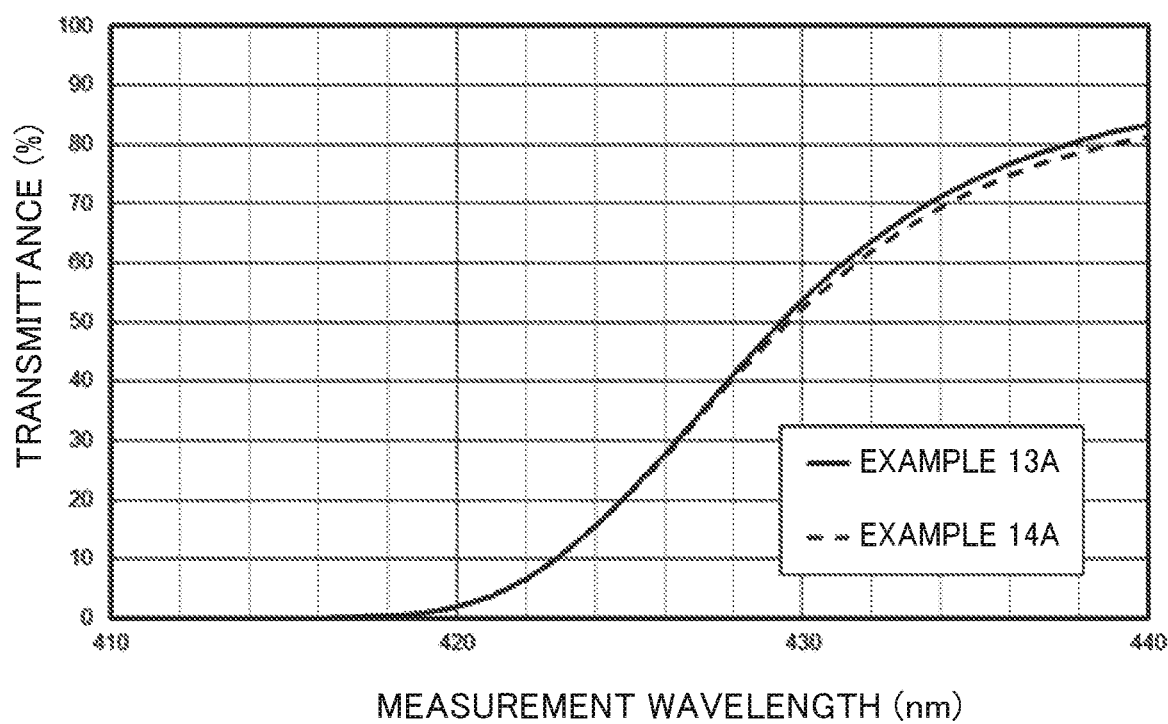
FIG. 4 is a graph showing transmittance curves of resin compositions in Example 13A and Example 14A.

The transmittance curves of Example 13A and Example 14A are shown in FIG. 4.

The results are shown in Table 4.

TABLE 4

|  |  | Example 13A | Example 14A | Example 15A | Example 16A | Example 17A | Example 18A |
|---|---|---|---|---|---|---|---|
| Light absorber | Compound name | Compound (101) | Compound (58) | Compound (112) | Compound (112) | Compound (112) | Compound (112) |
|  | Added amount [ppm] | 5000 | 5000 | 1000 | 3000 | 5000 | 3000 |

TABLE 4-continued

|  |  |  |  |  |  |  |  |
|---|---|---|---|---|---|---|---|
|  | Compound name | — | — | — | — | — | VIOSORB 583 |
|  | Added amount [ppm] | — | — | — | — | — | 1000 |
| Transmittance at 420 nm (%, 2 mm thickness) |  | 2.0 | 2.0 | 51.0 | 17.4 | 6.1 | 16.0 |
| Hue (9 mm thickness) | YI | 26.2 | 26.5 | 13.1 | 21.7 | 27.1 | 22.3 |
|  | a* | −7.9 | −8.0 | −4.6 | −6.9 | −8.1 | −7.1 |
|  | b* | 17.9 | 18.2 | 8.9 | 15.0 | 19.0 | 15.4 |

|  |  |  | Example 19A | Example 20A | Example 21A | Example 22A |
|---|---|---|---|---|---|---|
|  | Light absorber | Compound name | Compound (113) | Compound (113) | Compound (113) | Compound (113) |
|  |  | Added amount [ppm] | 1000 | 3000 | 5000 | 3000 |
|  |  | Compound name | — | — | — | VIOSORB 583 |
|  |  | Added amount [ppm] | — | — | — | 1000 |
|  | Transmittance at 420 nm (%, 2 mm thickness) |  | 39.2 | 9.1 | 1.8 | 7.1 |
|  | Hue (9 mm thickness) | YI | 13.9 | 20.8 | 24.6 | 21.6 |
|  |  | a* | −5.3 | −7.8 | −9.1 | −8.0 |
|  |  | b* | 9.5 | 14.5 | 17.3 | 15.1 |

As shown in Table 4, for Example 13A, Example 14A, and Comparative Example 2A in which the molded body was molded using the same resin, Example 13A and Example 14A in which the amount of the light absorber added was the same as that of Comparative Example 2A was able to significantly suppress the transmittance as compared with Comparative Example 2A.

Example 1B

A polycarbonate resin (PANLITE L-1225WP manufactured by TEIJIN LIMITED) and Compound (101) as a light absorber were mixed by a tumbler for 20 minutes in an amount such that the concentration of Compound (101) as a light absorber was 3400 ppm. After that, the obtained material was melted and kneaded using a single screw extruder under the conditions of a cylinder set temperature of 280° C. and a screw rotation speed of 56 rpm (revolutions per minute) to produce pellets (resin composition).

Using the produced pellets as a raw material, a flat plate molded body with an outer diameter of 150 mm×300 mm and a thickness of 2 mm was formed using an injection molding machine under the conditions of a cylinder temperature of 280° C., a mold temperature of 80° C., and a molding cycle of 60 seconds.

Example 2B to Example 4B

A resin composition was produced in the same manner as in Example 1B except that the kind of the light absorber was changed to the kinds as shown in Table 5 and the light absorbers were added in an amount having the concentration shown in Table 5, and a flat plate molded body having the same outer shape and thickness as Example 1A was formed.

—Evaluation—

For Example 1B to Example 4B, the transmittance at a wavelength of 420 nm and the transmittance curve were evaluated by the same method as described above.

The evaluation was made by the same method as described above except that the spectrophotometer (CM-5 manufactured by Konica Minolta, Ltd.) was changed to a spectrophotometer (COH-770 manufactured by NIPPON DENSHOKU INDUSTRIES, CO., LTD) for the yellowness (YI) and L*, a*, b*.

TABLE 5

|  |  | Example 1B | Example 2B | Example 3B | Example 4B |
|---|---|---|---|---|---|
| Light absorber | Compound name | Compound (101) | Compound (58) | Compound (111) | Compound (111) |
|  | Added amount [ppm] | 3400 | 3400 | 100 | 200 |
| Transmittance at 420 nm (%, 2 mm thickness) |  | 14.1 | 16.4 | 26.8 | 10.6 |
| Hue (9 mm thickness) | YI | 12.6 | 12.6 | 13.9 | 18.1 |
|  | a* | −3.6 | −3.7 | −4.1 | −5.3 |
|  | b* | 8.4 | 8.4 | 9.3 | 12.3 |

Even in a case in which a polycarbonate resin was used as the resin in Example 1B to Example 4B, the resin composition using the benzotriazole compound of the first embodiment as the light absorber was able to obtain a shielding property against light having a wavelength of 420 nm.

In particular, in Example 3B and Example 4B in which Compound (111) was used as the light absorber, the shielding property against light having a wavelength of 420 nm was able to be obtained with a very small amount of the light absorber.

Example According to the Second Embodiment

In Examples according to the second embodiment, the maximum absorption wavelength and the gram absorption coefficient of the benzotriazole compound were measured using a Shimadzu Spectrophotometer UV-1600 manufactured by Shimadzu Corporation at an optical path length of 10 mm using a toluene solution having a concentration of 0.002 g/L.

Example 1C (Production of Compound D1)

Under a nitrogen atmosphere, 23.7 g of 2-(5-chloro-2-benzotriazol)-6-tert-butyl-p-cresol (TINUVIN326, manufactured by BASF Japan Ltd.), 6.8 g of 3,6-dioxa-1,8-octanethiol, and 9.3 g of t-butoxypotassium were charged in 230 g of DMF (N,N-dimethylformamide), and the mixture was stirred at a temperature of from 80° C. to 90° C. for 5 hours. To the reaction mixture, 200 g of toluene and 200 g of water were added, and extraction and washing with water were repeated to neutralize the reaction mixture. The obtained toluene solution was concentrated and purified by silica gel column chromatography (eluent: toluene) to obtain 13.1 g of a pale yellow powder of Compound D1 represented by the following formula as a benzotriazole compound.

It was confirmed from the following analysis results that the obtained compound was an intended compound.

ESI-Mass: 741(M+H)$^+$

The toluene solution of the compound thus obtained showed the maximum absorption at 368.5 nm, and had a gram absorption coefficient of $5.92 \times 10^4$ mL/g·cm.

Example 3C (Production of Compound D3)

Under a nitrogen atmosphere, 41.1 g of 2-(5-chloro-2-benzotriazol)-6-tert-butyl-p-cresol (TINUVIN326), 15.2 g of 2-mercaptoethanol, and 16.8 g of t-butoxypotassium as an alkaline agent were charged in 120 g of DMI, and the mixture was stirred at 145° C. for 4 hours. After the reaction mixture was cooled to 70° C., 100 g of toluene and 100 g of water were added, and extraction and washing with water were repeated to neutralize the reaction mixture. The obtained toluene solution was concentrated, the precipitate was collected by filtration and dried to obtain 30.1 g of a pale yellow powder of Intermediate A represented by the following structural formula.

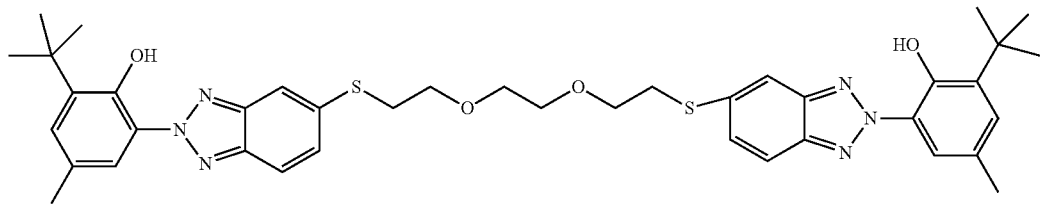

D1

Example 2C (Production of Compound D2)

In a nitrogen atmosphere, 28.4 g of 2-(5-chloro-2-benzotriazol)-6-tert-butyl-p-cresol (TINUVIN326), 6.2 g of bis(2-mercaptoethyl)ether, and 11.1 g of t-butoxypotassium were charged in 230 g of DMF, and the mixture was stirred at a temperature of from 80° C. to 90° C. for 5 hours. To the reaction mixture, 230 g of toluene and 230 g of water were added, and extraction and washing with water were repeated to neutralize the reaction mixture. The obtained toluene solution was concentrated and purified by silica gel column chromatography (eluent: toluene) to obtain 16.3 g of a pale yellow powder of Compound D2 represented by the following formula as a benzotriazole compound.

It was confirmed from the following analysis results that the obtained compound was an intended compound.

ESI-Mass: 697(M+H)$^+$

The toluene solution of the compound thus obtained showed the maximum absorption at 368.0 nm, and had a gram absorption coefficient of $6.35 \times 10^4$ mL/g·cm.

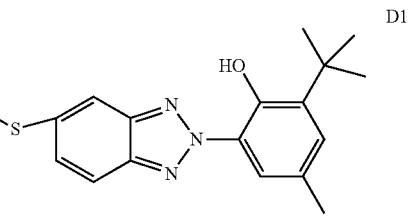

Intermediate A

Next, a mixture in which 10.5 g of 1,3,5-benzenetricarboxylic acid and 0.3 g of DMF was added in 60 g of dichloroethane was heated to 70° C., and 19.0 g of thionyl chloride was added dropwise over 3 hours. The obtained mixture was aged for another 3 hours. Thereafter, the mixture was cooled to room temperature, and the precipitate was collected by filtration and dried under reduced pressure to obtain 13.4 g of a white powder of 1,3,5-benzenetricarboxylic acid chloride (Intermediate B).

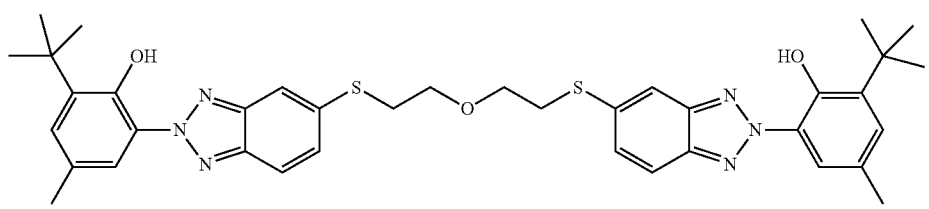

D2

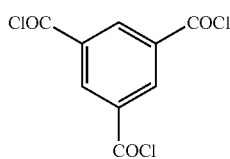

Intermediate B

Next, under a nitrogen atmosphere, 26.8 g of Intermediate A and 6.9 g of pyridine were charged in 100 g of toluene, and 7.4 g of Intermediate B was added at 50° C. over 2 hours, and the obtained material was aged for another 1 hour. To the reaction mixture, 60 g of water was added, and extraction and washing with water were repeated to neutralize the reaction mixture.

The obtained toluene solution was concentrated and recrystallized with methyl isobutyl ketone, and the precipitate was collected by filtration and dried to obtain 24.1 g of a pale yellow powder of Compound D3 represented by the following formula as a benzotriazole compound.

It was confirmed from the following analysis results that the obtained compound was an intended compound.

ESI-Mass: 1229(M+H)$^+$

The toluene solution of the compound thus obtained showed the maximum absorption at 364.5 nm, and had a gram absorption coefficient of 6.20×10$^4$ mL/g·cm.

(Measurement of Transmittance Curve)

The benzotriazole compound obtained in each Example or Comparative Example was measured using a Shimadzu Spectrophotometer UV-1600 manufactured by Shimadzu Corporation at an optical path length of 10 mm using a toluene solution having a concentration of 0.002 g/L. The obtained transmittance curve is shown in FIG. 5.

Figure 5:
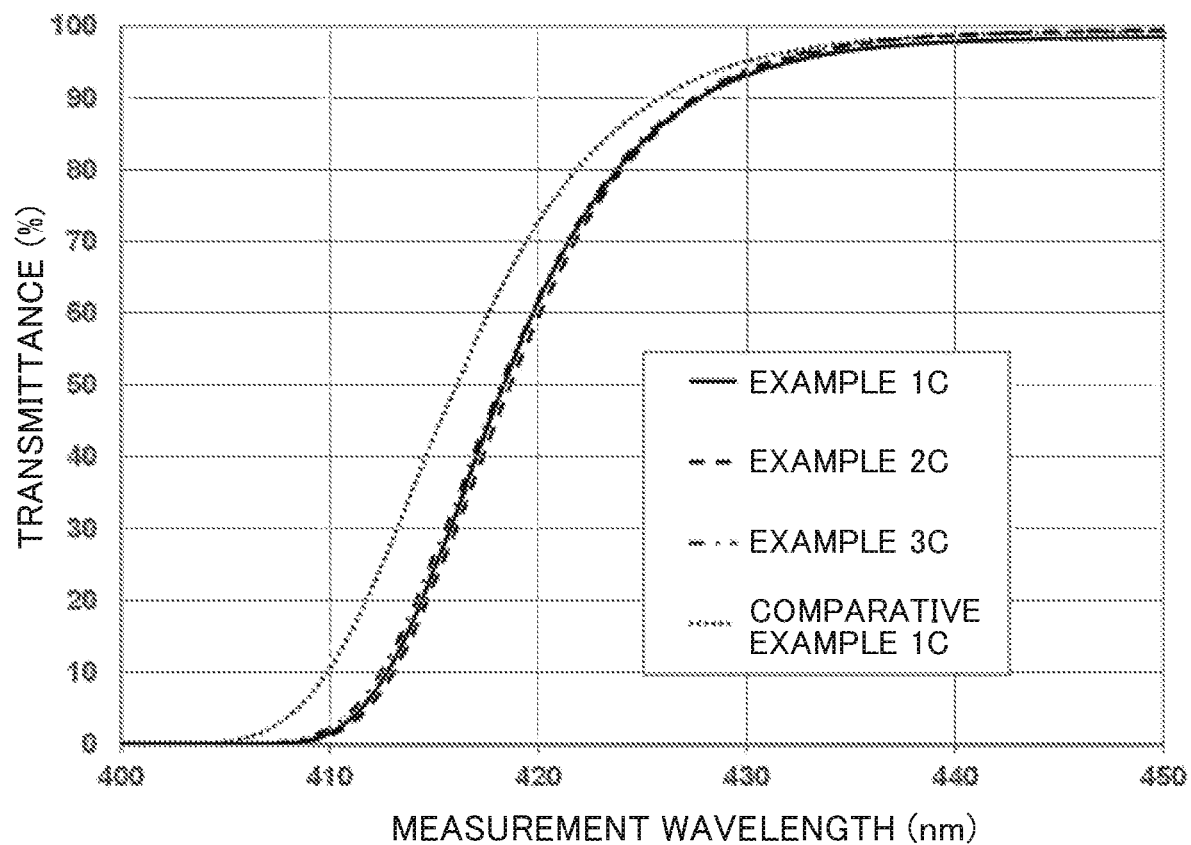
FIG. 5 is a graph showing transmittance curves of benzotriazole compounds in Example 1C to Example 3C and Comparative Example 1C.

As shown in FIG. 5, the benzotriazole compound according to each Example had a lower transmittance in the range of from 405 nm to 435 nm than the benzotriazole compound according to each Comparative Example. That is, it was suggested that the benzotriazole compound according to each Example can reduce the transmittance of blue light.

(Heat Resistance)

The decomposition temperature of the benzotriazole compound obtained in each Example and Comparative Example was measured by the following method.

Using a thermal analyzer Rigaku ThermoPlus Evo TG8120, the TG5% decomposition temperature (T-5% by mass) was measured under a nitrogen atmosphere at a heating rate of 10° C./min and a temperature range of from room temperature to 500° C. The results are shown in Table 6.

The higher the T-5% by mass, the higher the heat resistance.

(Solubility)

The solubility of the benzotriazole compound obtained in each Example and Comparative Example was measured by the following method.

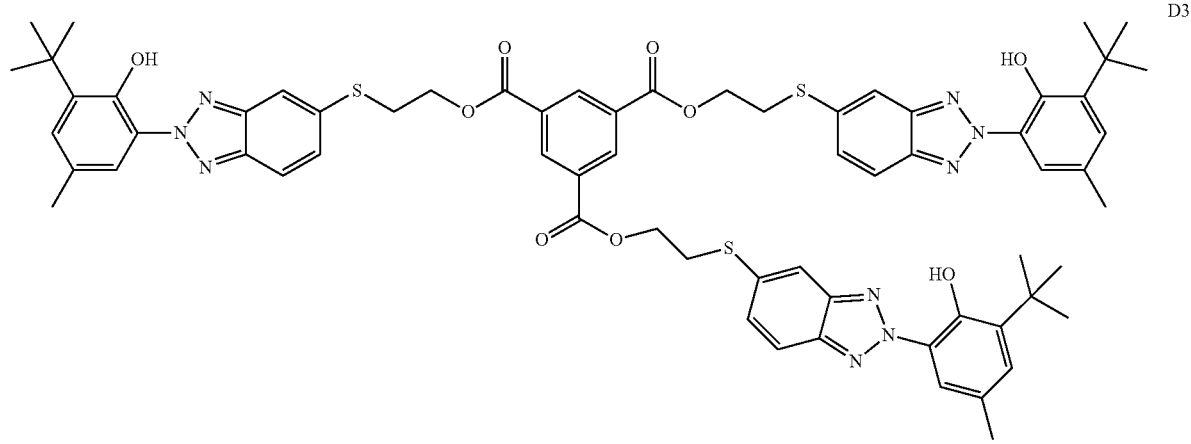 [SMILES: Cc1cc(-n2nc3ccc(SCCOC(=O)c4cc(C(=O)OCCSc5ccc6nn(-c7cc(C)cc(C(C)(C)C)c7O)nc6c5)cc(C(=O)OCCSc5ccc6nn(-c7cc(C)cc(C(C)(C)C)c7O)nc6c5)c4)cc3n2)c(O)c(C(C)(C)C)c1]

D3

—Evaluation—

The benzotriazole compound obtained in each Example were evaluated as follows.

As Comparative Example 1C, the same evaluation was made using TINUVIN326 (manufactured by BASF Japan Ltd.) represented by the following Formula (TI).

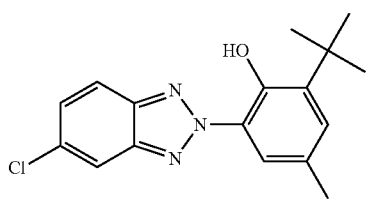

(TI)

To 0.5 g of the benzotriazole compound, the various organic solvents shown in Table 6 were added such that the total mass was about 10 g, the mixture was irradiated with ultrasonic waves for about 30 minutes, and thereafter stirred at room temperature for 2 hours to prepare a dispersion of about 10% by mass.

The dispersion was filtered through a membrane filter (0.2 μm), and the obtained residue was dried in a dryer at 60° C. for 1 hour, and then the mass of the residue was measured.

The solubility of the benzotriazole compound to the solvent was expressed by the following formula.

Solubility (% by mass)=($W0-W1$)/$W0$

W0 is the mass of the benzotriazole compound before the treatment, and W1 is the mass of the residue after drying (that is, the dissolution residue of the benzotriazole compound). In a case in which no residue remained on the filter, the solubility was determined as 5% by mass or more. The results are shown in Table 6.

TABLE 6

| | Compound | Decomposition temperature (Tg-5% by mass) (° C.) | Solubility (% by mass) | | | | |
|---|---|---|---|---|---|---|---|
| | | | Toluene | MMA | PGMEA | MEK | EA |
| Example 1C | D1 | 331.7 | 3≤ | ≤2 | ≤1 | ≤1 | ≤1 |
| Example 2C | D2 | 322.2 | 3≤ | 3≤ | From 1 to 2 | 3≤ | From 1 to 2 |
| Example 3C | D3 | 335.1 | 1.5≤ | ≤0.5 | ≤1 | ≤0.5 | ≤1 |
| Comparative Example 1C | TINUVIN326 | 219.2 | 5≤ | 5 | 1 | 3 | 3 |

The details of each term in Table 6 are as follows.
MMA: methyl methacrylate
PGMEA: propylene glycol monomethyl ether
MEK: methyl ethyl ketone
EA: ethyl acetate As shown in Table 6, the decomposition temperatures of Compounds D1 to D3 according to Examples were high. That is, they were excellent in heat resistance.

The decomposition temperature of the compound according to Comparative Example 1C was lower than that of Examples.

(Production of Resin Composition)

Example 4C

Dibutyltin(II) dichloride in an amount of 0.035 parts by mass, 0.1 parts by mass of an internal mold release agent for MR manufactured by Mitsui Chemicals, Inc., 0.5 parts by mass of Compound D2 (concentration 5000 ppm), and 50.6 parts by mass of a mixture of 2,5-bis(isocyanatomethyl)bicyclo-[2.2.1]-heptane and 2,6-bis(isocyanatomethyl)bicyclo-[2.2.1]-heptane were mixed to produce a mixed solution.

After the mixed solution was stirred at 25° C. for 1 hour to completely dissolve each component, 25.5 parts by mass of 4-mercaptomethyl-1,8-dimercapto-3,6-dithiaoctane and 23.9 parts by mass of pentaerythritol tetrakis(3-mercaptopropionate) were charged and stirred at 25° C. for 30 minutes to obtain a uniform solution. The uniform solution was defoamed at 400 Pa for 1 hour, filtered through a 1 μm PTFE filter, and then poured into a flat glass mold having a center thickness of 2 mm and a diameter of 77 mm. Then, the temperature of the glass mold was raised from 25° C. to 120° C. over 16 hours. After that, the glass mold was cooled to room temperature, and a flat lens was removed from the glass mold. The obtained flat plate lens was further annealed at 120° C. for 2 hours to obtain a flat plate lens.

Example 5C

A flat lens was obtained in the same manner as in Example 4C except that the amount of Compound D2 added was changed from 0.5 parts by mass (concentration 5000 ppm) to 0.1 parts by mass (concentration 1000 ppm).

Example 6C

A polycarbonate resin (product name: PANLITE L-1225WP, manufactured by TEIJIN LIMITED) in an amount of 99 parts by mass and 1.0 part by mass (concentration of 10000 ppm) of Compound D1 were supplied to a vented twin screw extruder (TEM-35 manufactured by Toshiba Machine Co., Ltd., cylinder set temperature 280° C.) using a quantitative feeder. After foreign matters were filtered through a filter, the obtained material was discharged from the die in a strand shape (discharge amount: 10 kg/hr), then water-cooled and solidified. After that, the obtained material was pelletized using a rotary cutter to obtain a polycarbonate resin composition.

After that, the polycarbonate resin composition was dried in a clean oven at 120° C. for 5 hours, then injection molding was performed on the polycarbonate resin composition using an injection molding machine (SE-180DU manufactured by Sumitomo Heavy Industries, Ltd.) at a resin temperature of 280° C. and at a mold temperature of 110° C. to obtain a flat plate lens having a diameter of 75 mm and a thickness of 2 mm.

Example 7C

A lens was obtained in the same manner as in Example 6C except that Compound D1 was changed to Compound D2.

Example 8C

A lens was obtained in the same manner as in Example 6C except that Compound D1 was changed to Compound D3.
—Evaluation—

The following evaluations were made for Example 4C to Example 8C.
(Transmittance)

Figure 6:
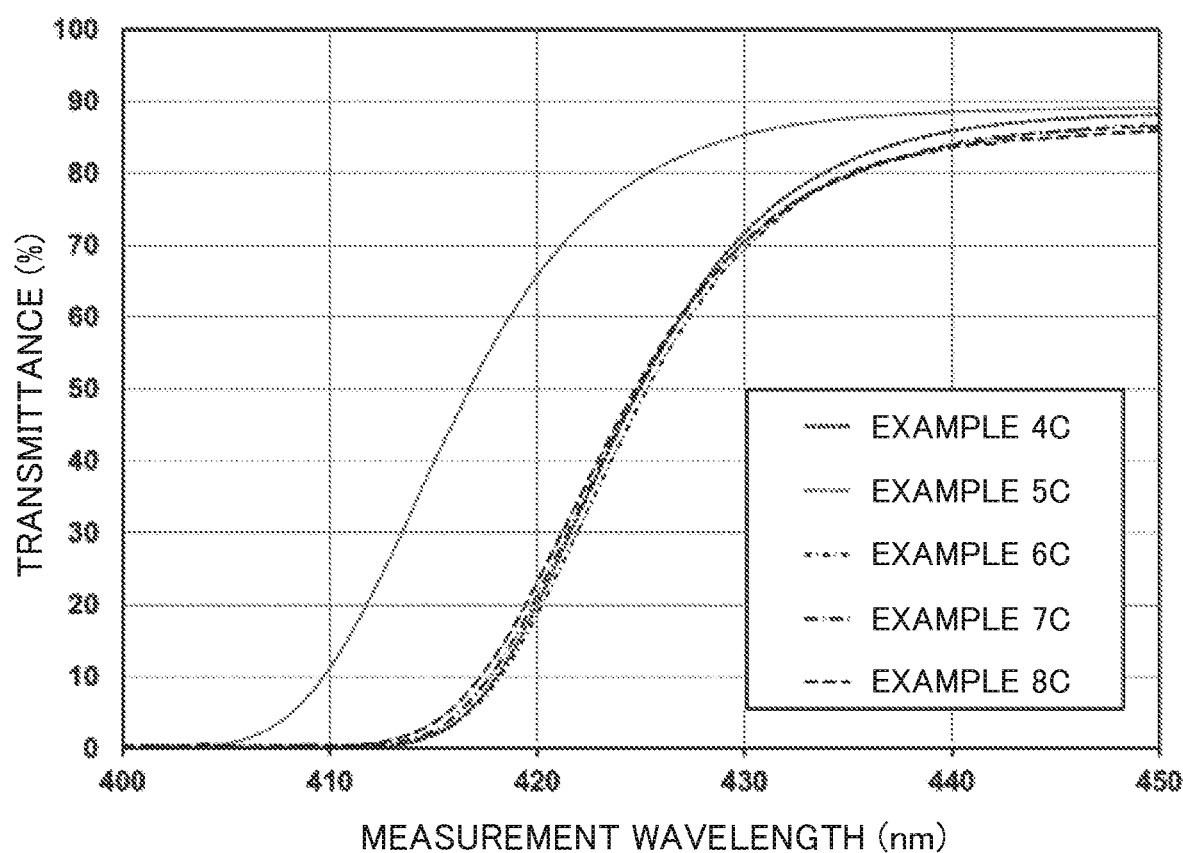
FIG. 6 is a graph showing transmittance curves of flat plate lenses in Example 4C to Example 8C.

For Examples 4C to 8C, the transmittance curve including the transmittance at a wavelength of 400 nm and the transmittance at a wavelength of 420 nm in each Example was measured using a Shimadzu Spectrophotometer UV-1600 (manufactured by Shimadzu Corporation) as a measuring device and a 2 mm thick flat plate lens. The results are shown in Table 7. The obtained transmittance curve is shown in FIG. 6.
(Measurement of Yellowness (YI) and L*, a*, b*)

The yellowness (YI) at a 2 mm thick flat plate lens and L*, a*, and b* in the CIE 1976 (L*, a*, b*) color system were measured using a spectrophotometer (CM-5 manufactured by Konica Minolta, Ltd.) for Examples 4C and 5C and using a spectrophotometer (COH-770 manufactured by NIPPON DENSHOKU INDUSTRIES, CO., LTD) for Examples 6C to 8C, and used as an index of hue. The results are shown in Table 7.

TABLE 7

| | Example 4C | Example 5C | Example 6C | Example 7C | Example 8C |
|---|---|---|---|---|---|
| Compound | D2 | D2 | D1 | D2 | D3 |
| Content [% by mass] | 0.5 | 0.1 | 1.0 | 1.0 | 1.0 |

TABLE 7-continued

|  | Example 4C | Example 5C | Example 6C | Example 7C | Example 8C |
|---|---|---|---|---|---|
| L* (2 mm) | 96.2 | 96.2 | 95.4 | 95.4 | 95.5 |
| a* (2 mm) | −3.7 | −1.6 | −3.6 | −3.6 | −3.4 |
| b* (2 mm) | 6.5 | 2.9 | 8.7 | 8.7 | 7.9 |
| YI (2 mm) | 9.7 | 4.3 | 13.2 | 13.2 | 11.9 |
| Transmittance [%] (400 nm) | 0.0 | 0.0 | 0.4 | 0.3 | 0.4 |
| Transmittance [%] (420 nm) | 20.2 | 65.9 | 18.9 | 17.9 | 25.6 |

As shown in Table 7, the resin compositions containing the compounds of Example 4C to Example 8C had excellent hues and were able to favorably shield light of from 400 nm to 420 nm.

Example 9C to Example 11C

A uniform solution was produced in the same manner as in Example 4C except that
- 0.5 parts by mass (concentration 5000 ppm) of Compound D2 was changed to the compounds and addition amounts shown in Table 8,
- the amount of the dibutyltin(II) dichloride added was changed from 0.035 parts by mass to 0.015 parts by mass,
- 50.6 parts by mass of the mixture of 2,5-bis(isocyanatomethyl)bicyclo-[2.2.1]-heptane and 2,6-bis(isocyanatomethyl)bicyclo-[2.2.1]-heptane was changed to 52 parts by mass of m-xylylene diisocyanate, and
- 25.5 parts by mass of 4-mercaptomethyl-1,8-dimercapto-3,6-dithiaoctane and 23.9 parts by mass of pentaerythritol tetrakis(3-mercaptopropionate) were changed to 48 parts by mass of 4-mercaptomethyl-1,8-dimercapto-3,6-dithiaoctane, and a flat lens having the same outer shape and thickness as in Example 4C was formed.

Example 12C to Example 14C

A uniform solution was produced in the same manner as in Example 4C except that
- 0.5 parts by mass (concentration 5000 ppm) of Compound D2 was changed to the compounds and addition amounts shown in Table 8,
- the amount of the dibutyltin(II) dichloride added was changed from 0.035 parts by mass to 0.008 parts by mass,
- 50.6 parts by mass of the mixture of 2,5-bis(isocyanatomethyl)bicyclo-[2.2.1]-heptane and 2,6-bis(isocyanatomethyl)bicyclo-[2.2.1]-heptane was changed to 50.7 parts by mass of m-xylylene diisocyanate, and
- 25.5 parts by mass of 4-mercaptomethyl-1,8-dimercapto-3,6-dithiaoctane and 23.9 parts by mass of pentaerythritol tetrakis(3-mercaptopropionate) were changed to 49.3 parts by mass of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and a flat lens having the same outer shape and thickness as in Example 4C was formed.

Example 15C and Example 16C

N,N-dimethylcyclohexylamine in an amount of 0.012 parts by mass, 0.092 parts by mass of N,N-dicyclohexylmethylamine, 1 part by mass of UV absorber TinuvinPS (manufactured by BASF Japan Ltd.), 90.92 parts by mass of bis(2,3-epithiopropyl)disulfide, 9.08 parts by mass of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and Compound D2 in the amount shown in Table 8 was charged and stirred at 25° C. for 30 minutes under a nitrogen atmosphere to produce a mixed solution.

The above mixed solution was defoamed at 400 Pa for 1 hour, filtered through a 1 μm PTFE filter, and then poured into a flat glass mold having a center thickness of 2 mm and a diameter of 77 mm. Then, the temperature of the glass mold was raised from 25° C. to 120° C. over 20 hours. After that, the glass mold was cooled to room temperature, and a flat lens was removed from the glass mold. The obtained flat plate lens was further annealed at 120° C. for 2 hours to obtain a flat plate lens.

—Evaluation—

Evaluations of (Transmittance) and (Measurement of Yellowness (YI) and L*, a*, b*) of Example 9C to Example 16C were made in the same manner as in the case of Example 4C to Example 8C.

The results are shown in Table 2.

Figure 7:
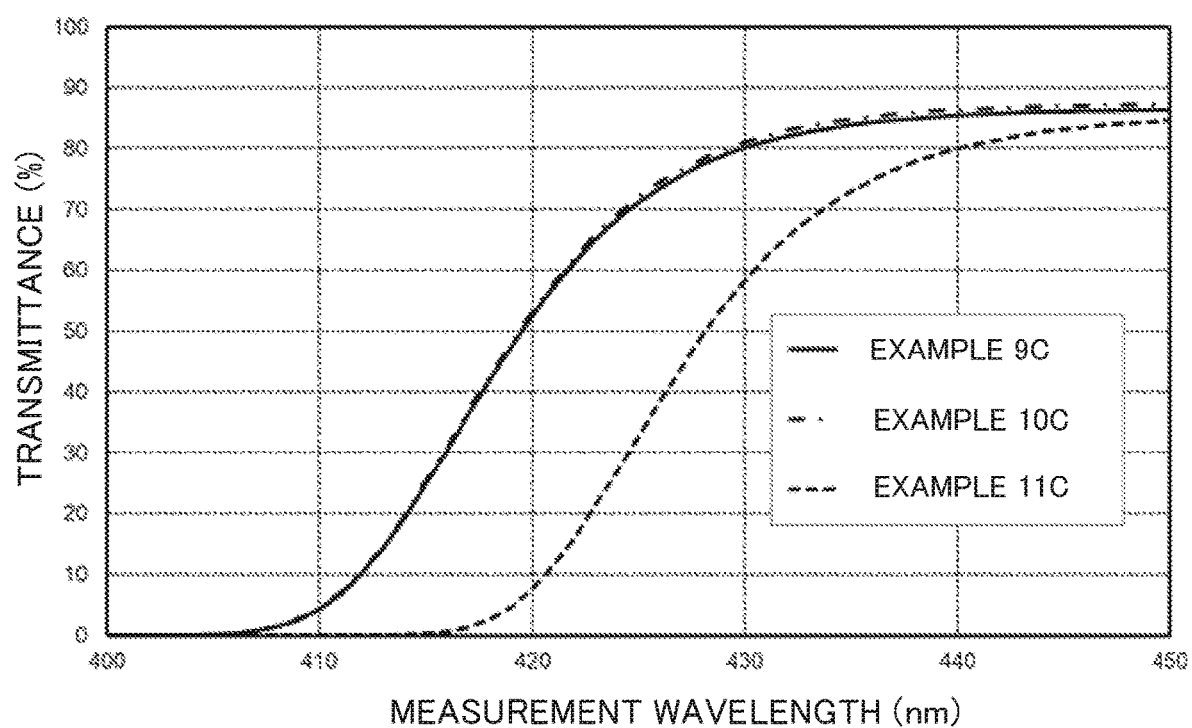
FIG. 7 is a graph showing transmittance curves of flat plate lenses in Example 9C to Example 11C.
Figure 8:
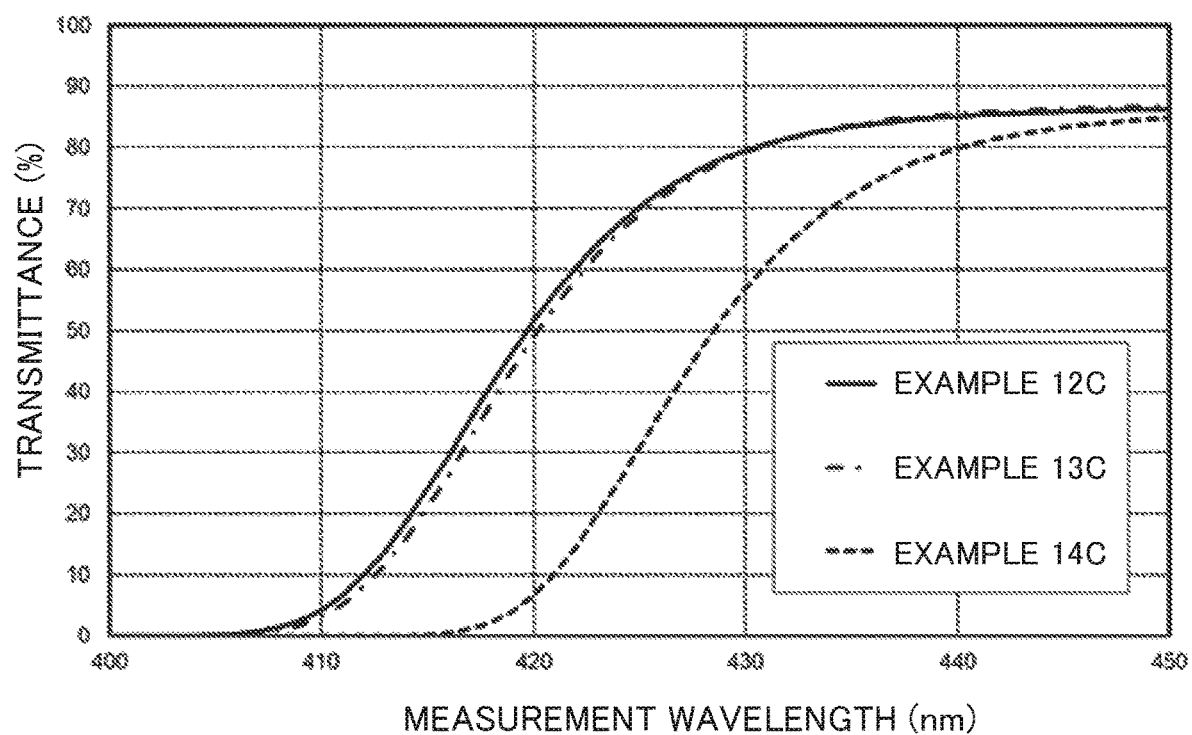
FIG. 8 is a graph showing transmittance curves of flat plate lenses in Example 12C to Example 14C.
Figure 9:
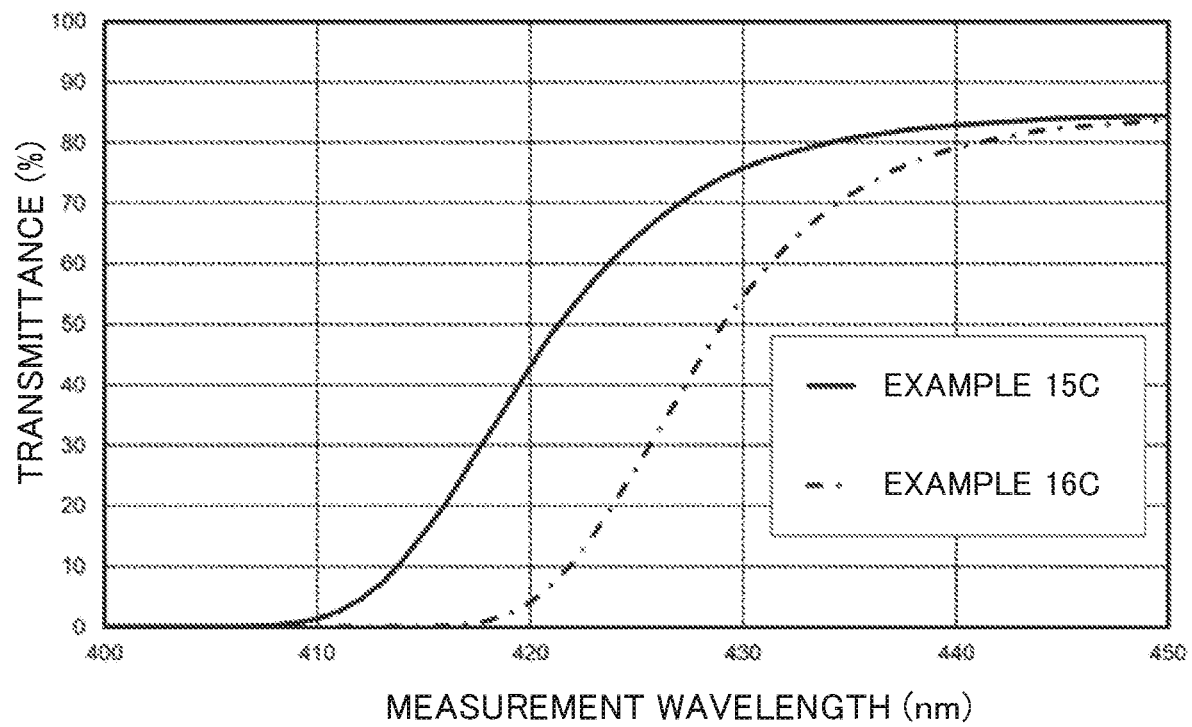
FIG. 9 is a graph showing transmittance curves of flat plate lenses in Example 15C and Example 16C.

The obtained transmittance curves are shown in FIG. 7 for Example 9C to Example 11C, in FIG. 8 for Example 12C to Example 14C, and in FIG. 9 for Example 15C and Example 16C.

TABLE 8

|  | Example 9C | Example 10C | Example 11C | Example 12C | Example 13C | Example 14C | Example 15C | Example 16C |
|---|---|---|---|---|---|---|---|---|
| Compound | D1 | D2 | D2 | D1 | D2 | D2 | D2 | D2 |
| Content [% by mass] | 0.1 | 0.1 | 0.5 | 0.1 | 0.1 | 0.5 | 0.1 | 0.5 |
| L* (2 mm) | 95.4 | 95.4 | 94.6 | 95.3 | 95.3 | 95.3 | 94.6 | 94.6 |
| a* (2 mm) | −2.1 | −2.1 | −5.1 | −2.3 | −2.4 | −5.2 | −2.7 | −5.2 |
| b* (2 mm) | 3.9 | 3.9 | 9.3 | 4.1 | 4.3 | 9.4 | 5.0 | 9.5 |

TABLE 8-continued

|  | Example 9C | Example 10C | Example 11C | Example 12C | Example 13C | Example 14C | Example 15C | Example 16C |
|---|---|---|---|---|---|---|---|---|
| YI (2 mm) | 5.8 | 5.8 | 13.7 | 6.2 | 6.5 | 13.9 | 7.6 | 14.1 |
| Transmittance [%] (400 nm) | 0.0 | 0.0 | 0.0 | 0.0 | 0.0 | 0.0 | 0.0 | 0.0 |
| Transmittance [%] (420 nm) | 52.5 | 53.1 | 7.6 | 51.6 | 49.7 | 6.6 | 43.0 | 4.0 |

As shown in Table 8, the resin compositions containing the compounds of Example 9C to Example 16C had excellent hues and were able to favorably shield light of from 400 nm to 420 nm.

The disclosures of Japanese Patent Application No. 2019-169402 filed on Sep. 18, 2019 and Japanese Patent Application No. 2019-169403 filed on Sep. 18, 2019 are incorporated herein by reference in their entirety.

All publications, patent applications, and technical standards mentioned in this specification are incorporated herein by reference to the same extent as if each individual publication, patent application, or technical standard was specifically and individually indicated to be incorporated by reference.

INDUSTRIAL APPLICABILITY

The benzotriazole compounds of the present disclosure can be used for optical articles such as spectacle lenses, sun visors, helmet shields, coatings or films for display devices of information equipment. The benzotriazole compound of the disclosure can also be used for the purpose of improving the life of image display devices such as liquid crystal display devices and organic EL displays, and of improving the contrast in a bright room.

The invention claimed is:

1. A benzotriazole compound represented by the following Formula (1):

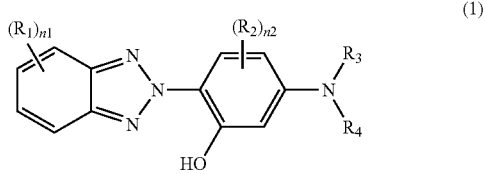

(1)

wherein, in Formula (1), each $R_1$ independently represents an unsubstituted alkyl group, a substituted or unsubstituted alkylthio group, a substituted or unsubstituted arylthio group, or a structure represented by Formula (2), wherein the unsubstituted alkyl group is selected from the group consisting of an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, a 1-methylpentyl group, a 4-methyl-2-pentyl group, a 2-ethylbutyl group, an n-heptyl group, a 1-methylhexyl group, an n-octyl group, 1-methylheptyl group, and a 2-ethylhexyl group;

wherein, in Formula (1), each $R_2$ independently represents a halogen atom, a cyano group, a hydroxyl group, a sulfone group, a substituted or unsubstituted alkenyl group, a substituted or unsubstituted alkynyl group, a substituted or unsubstituted aralkyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, a substituted or unsubstituted amino group, a substituted or unsubstituted alkylcarbonyl group, a substituted or unsubstituted arylcarbonyl group, a carboxylic acid ester group, a sulfonic acid ester group, or a structure represented by the following Formula (2);

wherein, in Formula (1), in a case in which a plurality of $R_1$ is present, each of the plurality of $R_1$ may be the same or different, or may be bonded to each other to form a ring;

wherein, in Formula (1), in a case in which a plurality of $R_2$ is present, each of the plurality of $R_2$ may be the same or different, or may be bonded to each other to form a ring;

wherein, in Formula (1), each $R_3$ independently represents a hydrogen atom, a substituted or unsubstituted aryl group, or a substituted or unsubstituted arylcarbonyl group; and $R_4$ independently represents a substituted or unsubstituted alkyl group a substituted or unsubstituted aryl group, a substituted or unsubstituted alkylcarbonyl group, or a substituted or unsubstituted arylcarbonyl group, and $R_3$ and $R_4$ may be bonded to each other to form ring; and wherein, in Formula (1), $R_1$ is contained in at least one of the 5-position or 6-position of the benzotriazole ring; and wherein, in Formula (1), n1 represents an integer from 1 to 4, and n2 represents an integer from 0 to 3: and;

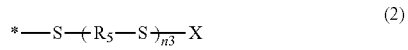

(2)

wherein, in Formula (2), $R_5$ represents a linear or branched alkylene group, an arylene group, or a divalent group in which an alkylene group and an arylene group are bonded to each other, and the alkylene group, the arylene group, and the divalent group in which an alkylene group and an arylene group are bonded to each other may contain an oxygen atom;

wherein, in Formula (2), * represents a binding position, and n3 represents an integer from 0 to 3; and wherein, in Formula (2), X represents a structure represented by the following Formula (X1) or a structure represented by the following Formula (X2):

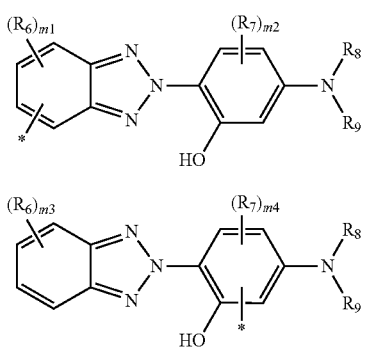

(X1)

(X2)

wherein, in Formula (X1) and Formula (X2), each of $R_6$ and $R_7$ independently represents a halogen atom, a cyano group, a hydroxyl group, a sulfone group, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, a substituted or unsubstituted amino group, a substituted or unsubstituted alkylcarbonyl group, a substituted or unsubstituted arylcarbonyl group, a carboxylic acid ester group, or a sulfonic acid ester group;

wherein, in Formula (X1) and Formula (X2), in a case in which a plurality of $R_6$ is present, each of the plurality of $R_6$ may be the same or different, or may be bonded to each other to form a ring;

wherein, in Formula (X1) and Formula (X2), in a case in which a plurality of $R_7$ is present, each of the plurality of $R_7$ may be the same or different, or may be bonded to each other to form a ring;

wherein, in Formula (X1) and Formula (X2), each of $R_8$ and $R_9$ independently represents a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, a substituted or unsubstituted alkylcarbonyl group, a substituted or unsubstituted arylcarbonyl group, or a substituted or unsubstituted carbamoyl group, and $R_8$ and $R_9$ may be bonded to each other to form a ring, where * represents a binding position;

wherein, in Formula (X1), m1 represents an integer from 0 to 3, and m2 represents an integer from 0 to 3; and wherein, in Formula (X2), m3 represents an integer from 0 to 4, and m4 represents an integer from 0 to 2.

2. The benzotriazole compound according to claim 1, wherein $R_4$ is a substituted or unsubstituted alkylcarbonyl group, or a substituted or unsubstituted arylcarbonyl group.

3. The benzotriazole compound according to claim 1, wherein $R_3$ is a hydrogen atom and $R_4$ is a substituted or unsubstituted alkylcarbonyl group.

4. The benzotriazole compound according to claim 1, wherein $R_1$ is a substituted or unsubstituted alkylthio group, a substituted or unsubstituted arylthio group, or a structure represented by Formula (2).

5. The benzotriazole compound according to claim 1, having a maximum absorption wavelength of from 330 nm to 430 nm.

6. A light absorber containing the benzotriazole compound according to claim 1.

7. A resin composition, comprising:
(A) a thermoplastic resin or a thermosetting resin; and
(B) the benzotriazole compound according to claim 1.

8. The resin composition according to claim 7, wherein a content of the benzotriazole compound is from 500 ppm to 9000 ppm with respect to a total mass of the resin composition.

9. The resin composition according to claim 7, wherein a* is from −9 to 1 and b* is from −1 to 19 in a CIE 1976 (L*, a*, b*) color space in a case in which the resin composition is measured at a thickness of 2 mm.

10. The resin composition according to claim 7, wherein:
the thermoplastic resin is at least one selected from a polycarbonate resin, a polyamide resin, an acrylic resin, or a polyester resin, and
the thermosetting resin is at least one selected from a polyurethane resin, a polythiourethane resin, or an allyldiglycol carbonate resin.

11. The benzotriazole according to claim 1, wherein $Ri_1$ is a substituted or unsubstituted arylthio group, $R_3$ is a hydrogen atom, and $R_4$ is a substituted or unsubstituted alkylcarbonyl group.

* * * * *